US009021589B2

(12) United States Patent
Anderson et al.

(10) Patent No.: US 9,021,589 B2
(45) Date of Patent: Apr. 28, 2015

(54) INTEGRATING MULTIPLE DATA SOURCES FOR MALWARE CLASSIFICATION

(71) Applicants: Blake Harrell Anderson, Albuquerque, NM (US); Curtis B. Storlie, Jemez Springs, NM (US); Terran Lane, Somerville, MA (US)

(72) Inventors: Blake Harrell Anderson, Albuquerque, NM (US); Curtis B. Storlie, Jemez Springs, NM (US); Terran Lane, Somerville, MA (US)

(73) Assignee: Los Alamos National Security, LLC, Los Alamos, NM (US)

( * ) Notice: Subject to any disclaimer, the term of this patent is extended or adjusted under 35 U.S.C. 154(b) by 0 days.

(21) Appl. No.: 13/909,985

(22) Filed: Jun. 4, 2013

(65) Prior Publication Data

US 2013/0326625 A1    Dec. 5, 2013

Related U.S. Application Data

(60) Provisional application No. 61/655,978, filed on Jun. 5, 2012, provisional application No. 61/655,971, filed on Jun. 5, 2012, provisional application No. 61/655,979, filed on Jun. 5, 2012.

(51) Int. Cl.
  *G06F 21/00* (2013.01)
  *G06F 21/56* (2013.01)
(52) U.S. Cl.
  CPC .............. *G06F 21/56* (2013.01); *G06F 21/566* (2013.01)
(58) Field of Classification Search
  USPC ................................................ 726/23, 24, 25
  See application file for complete search history.

(56) References Cited

U.S. PATENT DOCUMENTS

2011/0185422 A1*  7/2011  Khayam et al. ................. 726/23
2012/0151585 A1*  6/2012  Lamastra et al. ............... 726/24

OTHER PUBLICATIONS

Improving malware classification: bridging the static/dynamic gap; anderson et al; Proceeding AlSec '12 Proceedings of the 5th ACM workshop on Security and artificial intelligence; pp. 3-14; ACM New York, NY, USA © 2012 ISBN: 978-1-4503-1664-4.*
Classification of malware using structured control flow; Cesare et al; Proceedings of the Eighth Australasian Symposium on parallel and distributed computing, 2010, 10 pages, Australia.*
Bach et al., "Multiple Kernel Learning, Conic Duality, and the SMO Algorithm," In *Proceedings of the Twenty-First International Conference on Machine Learning*, ICML '04, 8 pages, New York, NY, USA, 2004. ACM.
Christodorescu et al., "Static Analysis of Executables to Detect Malicious Pattern," in *In Proceedings of the 12th USENIX Security Symposium*, pp. 169-186, 2003.
Dai et al., "Efficient Virus Detection Using Dynamic Instruction Sequences," *Journal of Computers*, 4(5): 405-414, 2009.
Kolter et al., "Learning to Detect and Classify Malicious Executables in the Wild," *The Journal of Machine Learning Research*, 7: 2721-2744, 2006.

(Continued)

*Primary Examiner* — Jason Lee
(74) *Attorney, Agent, or Firm* — Klarquist Sparkman, LLP

(57) ABSTRACT

Disclosed herein are representative embodiments of tools and techniques for classifying programs. According to one exemplary technique, at least one graph representation of at least one dynamic data source of at least one program is generated. Also, at least one graph representation of at least one static data source of the at least one program is generated. Additionally, at least using the at least one graph representation of the at least one dynamic data source and the at least one graph representation of the at least one static data source, the at least one program is classified.

19 Claims, 49 Drawing Sheets

(56) References Cited

OTHER PUBLICATIONS

Reddy et al., "New Malicious Code Detection Using Variable Length n-grams," In *Information Systems Security*, vol. 4332 of Lecture Notes in Computer Science, pp. 276-288. Springer Berlin / Heidelberg, 2006.

Shafiq et al., "Embedded Malware Detection Using Markov n-grams," In *Detection of Intrusions and Malware, and Vulnerability Assessment*, vol. 5137 of Lecture Notes in Computer Science, pp. 88-107. Springer Berlin / Heidelberg, 2008.

Sonnenburg et al., "A General and *Efficient* Multiple Kernel Learning Algorithm," 8 pages, 2006.

Anderson et al., "Integrating Multiple Data Sources for Improved Malware Classification," *USENIX Security*, pp. 1-15, 2012.

Anderson et al., "Graph-Based Malware Detection Using Dynamic Analysis," *Journal in Computer Virology*, 7(4): 247-258, Jun. 8, 2011.

Hu et al., "Large-Scale Malware Indexing Using Function-Call Graphs," In *Proceedings of the 16th ACM Conference on Computer and Communications Security*, CCS '09, pp. 611-620, New York, NY, USA, 2009. ACM.

Kolter et al., "Learning to Detect Malicious Executables in the Wild," In KDD '04: *Proceedings of the tenth ACM SIGKDD international conference on Knowledge discovery and data mining*, pp. 470-478, New York, NY, USA, 2004. ACM.

Kruegel et al., "Polymorphic Worm Detection Using Structural Information of Executables". In *Alfonso Valdes and Diego Zamboni*, editors, Recent Advances in Intrusion Detection, vol. 3858 of Lecture Notes in Computer Science, pp. 207-226. Springer Berlin / Heidelberg, 2006.

Reddy et al., "N-Gram Analysis for Computer Virus Detection," *Journal in Computer Virology*, 2: 231-239, 2006.

Shankarapani et al., "Malware Detection Using Assembly and API Call Sequences," *Journal in Computer Virology*, 10: 1-13, 2010.

Wagner et al., "Malware Analysis with Graph Kernels and Support Vector Machines," In *Malicious and Unwanted Software (Malware)*, 2009 4th International Conference on, pp. 63-68, 2009.

Kirda et al., "Dynamic Analysis of Malicious Code," *Journal in Computer Virology*, 2: 67-77, 2006.

Bilar, "Opcodes as Predictor for Malware," *Int. J. Electron. Secur. Digit. Forensic*, 1: 156-168, 2007.

Hamrock et al., "Using Entropy Analysis to Find Encrypted and Packed Malware," *Security Privacy, IEEE*, 5(2): 40-45, 2007.

Moser et al., "Limits of Static Analysis for Malware Detection," *Computer Security Applications Conference, Annual*, pp. 421-430, 2007.

King et al., "Logistic Regression in Rare Events Data," *Political Analysis* 9(2): 137-163, 2001.

Meinshausen, "Relaxed lasso," *Computational Statistics and Data Analysis*, 52(1): 374-393, 2007.

Tibshirani, "Regression Shrinkage and Selection via the Lasso," *Journal of the Royal Statistical Society*, 58: 267-288, 1996.

Zou, "The Adaptive Lasso and Its Oracle Properties," *Journal of the American Statistical Association*, 101: 1418-1429, 2006.

Zou et al., "Regularization and Variable Selection via the Elastic Net," *Journal of the Royal Statistical Society: Series B (Statistical Methodology)*, 67(2): 301-320, 2005.

\* cited by examiner (a) Binary SE (b) File Info SE (c) CFG 4-graphlet SE (d) Dynamic Instruction SE (e) Static Instruction SE (f) System Call SE (a) Full ROC Image (b) Zoomed ROC Image (a) Binary SE (b) File Info SE (c) CFG 4-graphlet (d) Dynamic Instruction SE (e) Static Instruction SE (f) System Call SE (a) Dynamic trace from a malicious program (b) Dynamic trace from a benign program

INTEGRATING MULTIPLE DATA SOURCES FOR MALWARE CLASSIFICATION

CROSS REFERENCE TO RELATED APPLICATION

This application claims priority to U.S. Provisional Application No. 61/655,971, filed Jun. 5, 2012, entitled "GRAPH-BASED MALWARE ANALYSIS"; U.S. Provisional Application No. 61/655,978, filed Jun. 5, 2012, entitled "INTEGRATING MULTIPLE DATA SOURCES FOR MALWARE CLASSIFICATION"; and U.S. Provisional Application No. 61/655,979, filed Jun. 5, 2012, entitled "STOCHASTIC IDENTIFICATION AND CLUSTERING OF MALWARE WITH DYNAMIC INSTRUCTION TRACES"; all of which are incorporated by reference herein in their entirety.

ACKNOWLEDGMENT OF GOVERNMENT SUPPORT

This invention was made with government support under Contract No. DE-AC52-06NA25396 awarded by the U.S. Department of Energy. The government has certain rights in the invention.

FIELD

The present application relates to malware classification and, in particular, to malware classification based on multiple data sources.

BACKGROUND

As malware has continued to proliferate, various virus detection tools have been developed such as tools built on signature-based approaches. Although traditional tools have been used to detect malware, these traditional tools are limited.

SUMMARY

Among other innovations described herein, this disclosure presents various tools and techniques for classifying programs as malware or non-malware. In one exemplary technique described herein, at least one graph representation of at least one dynamic data source of at least one program is generated. Also, at least one graph representation of at least one static data source of the at least one program is generated. Additionally, at least using the at least one graph representation of the at least one dynamic data source and the at least one graph representation of the at least one static data source, the at least one program is classified.

According to an exemplary tool, at least one graph representation of at least one dynamic data source of at least one program is generated. Also, at least one graph representation of at least one static data source of the at least one program is generated. Additionally, at least using the at least one graph representation of the at least one dynamic data source and the at least one graph representation of the at least one static data source, the at least one program is classified.

The foregoing and other objects, features, and advantages of the invention will become more apparent from the following detailed description, which proceeds with reference to the accompanying figures.

DETAILED DESCRIPTION

Exemplary Overview

Figure 1:
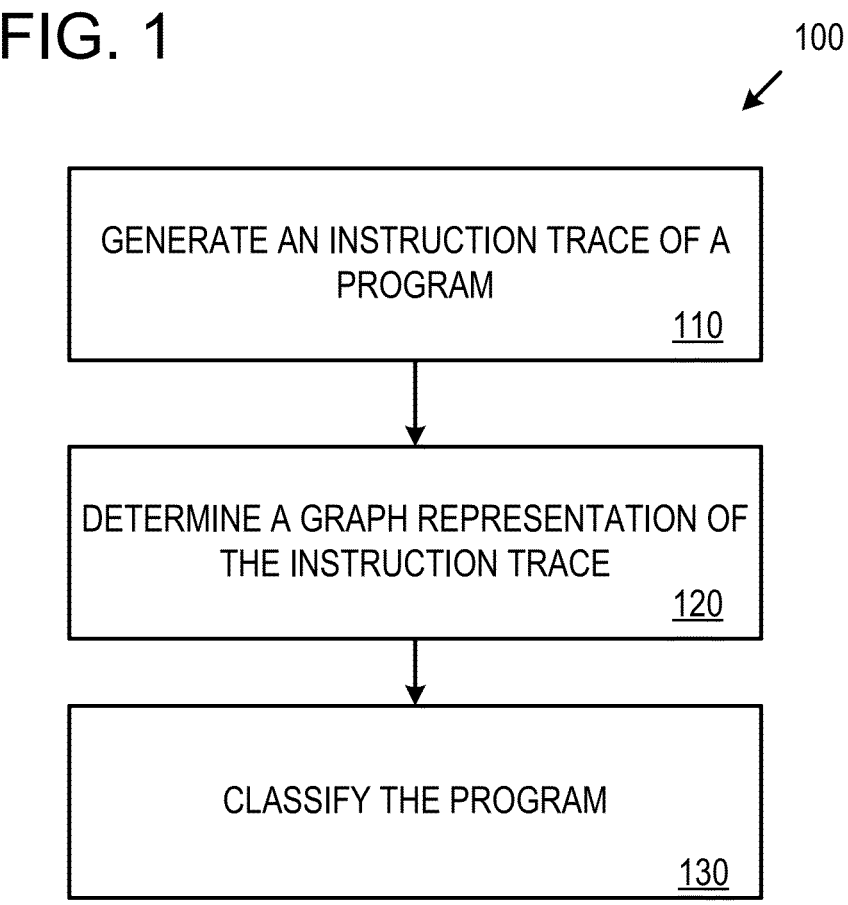
FIG. 1 is a flowchart of an exemplary method of classifying a program using a graph representation.

Among other innovations described herein, this disclosure presents various tools and techniques for classifying programs as malware or non-malware. Included herein are techniques and tools for classifying programs and for detecting malware based on the analysis of graphs constructed using dynamically collected instruction traces of executable programs. With the increasing proliferation of malware threats, new techniques to detect and contain malware can be desirable.

One technique that can be used to classify programs and detect malware is graph-based classification which can use graphs of dynamic instruction traces of programs. In some implementations, these graphs represent Markov chains, where the vertices represent the instructions and the transition probabilities are estimated by the data contained in the instruction trace. In some implementations, a combination of graph kernels is used to create a similarity matrix between the instruction trace graphs. The resulting graph kernel measures similarity between graphs on local and/or global levels. For example, kernel methods can be used that look at global and/or local similarity between graphs.

In some implementations, the kernels infer the global structure of a graph using spectral graph techniques. Additionally, in some implementations, the similarity matrix is sent to a kernel-based classification algorithm or process (e.g., a support vector machine, a Gaussian process, or the like) to perform classification. For example, one or more dynamic program traces are classified using the support vector machine. In some implementations, graph-based classification can use a data representation to perform classification in graph space. Also described is the performance of implementations of graph-based classification on two classification problems: benign software versus malware, and the Netbull virus with different packers versus other classes of viruses.

In some implementations, graph-based classification can extend the n-gram methodology by using 2-grams to condition the transition probabilities of a Markov chain, and then taking that Markov chain as a graph. In some implementations of graph-based classification, a hardware hypervisor can be used to look into a running program. For example, the lowered detectability, and the protections afforded to a Xen virtualized system, can be useful for data collection such as dynamic program traces.

In some implementations, the dynamic program traces include data that is derived at least from the dynamic execution of a program. A Markov chain representation of individual instructions derived from the execution of programs can be used to grant a finer level of resolution, and taking the Markov chain as a graph allows for the use of the machinery of graph kernels to construct a similarity matrix between instances in a training set. In some implementations, 2-grams can be used to condition transition probabilities for the Markov chain. In some implementations, a graph multiple kernel learning framework can be used in classification. In one implementation, two distinct measures of similarity can be used to construct a kernel matrix: a Gaussian kernel, which can measure local similarity between the graphs' edges, and a spectral kernel, which can measure global similarity between the graphs. Given a constructed kernel matrix, a kernel-based classification algorithm or process (e.g., a support vector machine, a Gaussian process, or the like) can be trained to perform classification on new testing points such as unclassified programs.

With the increasing prevalence of polymorphic and code-obfuscated malware, signature-based detection is quickly becoming outdated. Malware analysis using multiple data sources and machine learning algorithms can be applied to this problem. Machine learning methods can operate on a variety of data sources including the raw binary, the disassembled binary, dynamic traces (e.g., instruction traces and/or system call traces), control flow graphs, and/or other data sources.

In some implementations of malware classification using multiple data sources, multiple kernel learning can be used to combine and/or learn using one or more of the data sources in a unified framework. Combining data sources, in some implementations, can increase the performance of a classification system while lowering the number of false positives. In some implementations, such as for a resource constrained environment, some data source combinations used in malware classification can achieve high performance in a short amount of time. To collect data for data sources, in some implementations, a dynamic tracing tool can be used that is capable of evading detection from the malware to obtain a representative sample of how the malware behaves.

Also, included herein are techniques and tools for stochastic classification and clustering of a program, such as malware or non-malware, based in part on analysis of instruction traces that can be collected dynamically from a program in question. In some implementations, stochastic classification can be applied on-line in a sandbox environment, and can be implemented in a host-based use, provided that a sampling of instructions executed by a given process can be obtained.

In some implementations of stochastic classification of malware, a dynamic instruction trace can be represented using a Markov-chain structure in which a transition matrix, P, has respective rows modeled as Dirichlet vectors. In stochastic classification, a program classification (e.g., malicious, benign, or the like) can be modeled using logistic regression with variable selection on the elements of a transition matrix, which can be observed with error.

In some implementations of stochastic classification, a clustering of programs within a malware classification can be done based on a probabilistic change similarity measure. In some implementations, clustering of malware can be used to identify previously examined malware which is similar to a newly identified (e.g., classified) instance of malware, which can aid in reverse engineering.

Exemplary Method for Graph-Based Classification

FIG. 1 is a flowchart 100 of an exemplary method of classifying a program using a graph representation. In FIG. 1, an instruction trace of a program is generated at 110. For example, a program can be executed and a dynamic trace of the executed instructions can be generated. In some implementations, the instruction trace includes an ordering of the instructions in the order the instructions were executed. In some implementations, the instruction trace can include addresses associated with the instructions that can be gathered during the dynamic trace of the program. In some implementations, an instruction trace of a program that has been created can be received for use in classifying a program.

At 120, a graph representation of the instruction trace is determined. For example, a graph representation based on a Markov chain can be generated using the instruction trace. For example, the Markov chain can include vertices that represent the instructions listed in the instruction trace. Also for example, the Markov chain can include transition probabilities between vertices that are estimated by the data contained in the instruction trace. In one implementation, the graph representation can include an adjacency matrix.

At 130, the program is classified. For example, the program can be classified using a kernel-based classification algorithm. For example, a kernel-based classification algorithm can include a support vector machine, a Gaussian process, or the like. In some implementations, one or more kernels also known as graph kernels (e.g., a Gaussian kernel, a spectral kernel, a combination thereof, and/or other kernel) can be generated based on one or more graph representations generated from instruction traces of programs with classifications. The one or more kernels can be used to train a kernel-based classification algorithm via any of the techniques described herein, and the graph representation of the instruction trace of the program can be classified using the kernel-based classification algorithm.

In some implementations, a graph kernel or combination of kernels is used to create a similarity matrix between the graph representations of the instruction traces. In some implementations, the program is classified as non-malware or malware. In other implementations, the program is classified as a type of malware. In yet other implementations, the program is classified as another classification.

Exemplary Data Collection

In some implementations of data collection for generating one or more instruction traces, an Ether Malware Analysis framework (Ether) can be used to extract data from a computing system that uses an operating system such as a Windows XP-based system, or other operating system. Some implementations, the Ether system can provide some level of protection against traditional hardware based virtual machine detection. Some malware mechanisms of protection can include debugger detection, virtual machine detection, timing attacks, and/or host system modifications.

In some implementations, a modified version of the Ether Malware Analysis framework (Ether) can be used to perform data collection. Ether can include a set of extensions on top of a virtual machine (e.g., the Xen virtual machine). Malware frequently can use self-protection measures in an attempt to thwart debugging and analysis. In one implementation, Ether can use a tactic of zero modification to be able to track and analyze a running system. For example, zero modifications can preserve the sterility of an infected system, and can reduce the methods that malware authors can use in malware to detect if the malware is being analyzed. In some implementations, increasing the complexity of detection can make a robust analysis system. Such modifications can be used to allow for deeper introspection of an application programming interface (API) and import internals.

In one implementation, instead of the n and L representation that can be used in a signature based approach, data can be modeled as a graph representation such as a Markov chain represented at least using a weighted and/or directed graph. For example, the instructions of a program can be represented in the directed graph as vertices, and/or the weights of the edges of the graph can be the transition probabilities of the Markov chain, which can be estimated using a collected program trace or instruction trace. In some implementations of graph-based classification, a similarity matrix which is also known as a kernel matrix or kernel can be constructed using a plurality of Markov chain graphs and this kernel matrix can be used to perform classification such as classification of programs or portions of programs that were traced. Among other measures of similarity that can be used, two measures of similarity that can be used to construct a kernel matrix can include a local measure comparing corresponding edges in respective graphs and/or a global measure that can compare aspects of the respective graphs' topologies. Using such measures of similarity can allow for the comparison of the directed graphs, representing instruction traces, using different criteria and/or within a unified framework. In some implementations of graph-based classification, once a kernel matrix is constructed from a set of graphs representing programs or instruction traces of programs, one or more classifiers such as one or more kernel-based classification algorithms (e.g., support vector machines, Gaussian processes, or the like) can be used to perform classification of the programs.

In one exemplary implementation of graph-based classification, a dataset of samples of one or more malware and/or one or more benign software can be used. For example, 1615 samples of malware and 615 samples of benign software can be used as a dataset of samples. In some implementations of graph-based classification, graph-based classification can discriminate between instances of the Netbull virus and other families of viruses, and can be used in classifying different examples of viruses.

Exemplary Advantages of an Ether Malware Analysis Framework

Among other factors, there are three traditional detection techniques that can justify the use of the Ether analysis framework. The first detection technique is based on the presence of a debugger. In some implementations of malware, the attacker malware can read a debugging flag from a process execution block of a running program. For example, the Windows API IsDebuggerPresent flag indicates whether or not a debugger is watching the execution. Such a debugger detection technique can be used to detect the use of some traditional instrumentation systems. A second detection technique can be the Red Pill class of instructions. In one implementation, Red Pill comprises a system that can detect the presence of a dynamically translated virtual machine such as VMWare or Virtual PC. In each of these virtual machines, the SIDT, store interrupt descriptor table, an instruction can have a value that differs from a virtualized system and real hardware. Timing attacks, implemented with the read time step counter instruction (RDTSC) can provide a third protection. These timing attacks can measure the time before and after a series of instructions. The difference between these times can give the attacker a useful tool for determining if any monitoring is taking place.

In some implementations of an analysis system such as Ether, modifications made to the analysis system can be modifications that cannot be easily discovered. For example, one method can be associated with the "sterility" of the infected system, such that if there are differences between a typical analysis system and, for example, a normal Windows system, the differences can be detected by the malware and/or malware author. In one implementation, the Ether system implements an instruction tracing mechanism that allows for the tracking of the runtime execution of processes (e.g., any process) on the instrumented system. To find a process of interest, Ether can parse and keep track of a process list such as an internal Windows kernel process list. When the process to be traced is scheduled by an operating system such as the Windows operating system, Ether can make note of the contents of a register such as a CR3 register, a unique identification that corresponds to the current process's page directory entry.

Ether can also use one or more techniques to track individual instruction executions. In one exemplary technique, a trap flag can be set in a register such as an EFLAG register. This can cause a single-step trap to be raised to an operating system. Ether can intercept the single-step trap at a hypervisor level, can clear a single-step bit such as the EFLAG single-step bit, and then can mark a memory page for the code region invalid. Marking the memory page as invalid can cause another trap to be generated, which can also be intercepted. A register such as the EFLAG register can then be reset, and the page error can be cleared. This can create a back-and-forth operation that can allow for single-stepping. In some implementations, detection by a monitored process can be avoided in part by intercepting instructions that access the EFLAGS. In some implementations, the end result of instruction tracing can be an instruction trace that comprises a list of the executed instructions listed in the order the instructions were executed (e.g., a list of in-order executed instructions). Such an instruction trace or instruction list can include a list of instructions and/or the list of instructions listed along with the corresponding addresses.

In some implementations of data analysis, executable code of a software such as of malware, non-malware, or other software can be copied to an analysis system such as the Ether analysis system. Also, an instantiation of an operating system virtual machine, such as a Windows virtual machine, can be started, and upon successful boot, the file can be copied. Additionally, the Ether portion of Xen can be invoked and the malware or other software can be started in part to generate an instruction trace for the sample of software; the sample of software can be run for a threshold amount of time such as a threshold number of minutes (e.g., 5 minutes), less than the threshold number of minutes, or other amount of time.

Exemplary Graph Representation

This section describes exemplary implementations of data representations for use in any of the examples of graph-based classification described herein. In some implementations, given an instruction trace P, a new representation, P', can be found such that unified comparisons in graph space can be made while still capturing the sequential nature of the data. This can be achieved in one implementation in part by transforming the dynamic trace data into a representation such as a Markov chain which can be represented as a weighted, directed graph. In one implementation of a graph representation, a graph, $G=\langle V,E \rangle$, can be composed of two sets, V and E. The elements of V can be called vertices and the elements of E can be called edges. In some implementations of a graph representation, the edge weight, $e_{ij}$, between vertices i and j corresponds to the transition probability from state i to state j in a Markov chain; hence, the edge weights for edges originating at $v_i$ can sum to 1, $\Sigma_{i \rightsquigarrow j} e_{ij}=1$. In some implementations of a graph representation, an n×n (n=|V|) adjacency matrix can be used to represent the graph, where entries in the matrix, $a_{ij}=e_{ij}$.

In some implementations of generating graph representations of instruction traces, a set of unique or grouped instructions can be collected. For example, a total number of unique instructions across the one or more traces done can be found, such as 160 instructions found in one implementation or other number of instructions found in other implementations. These instructions can be represented as the vertices of Markov chains.

In some implementations, the instructions can be represented irrespective of the operands used with those instructions (e.g., one or more operands are omitted from the representation). By ignoring operands, sensitivity to register allocation and other compiler artifacts can be removed or reduced.

In some implementations, an adjacency matrix of an instruction trace graph or graph representation can contain one or more rows of zeros when the instruction trace it represents does not include an instruction in the collected set of instructions. Incorporating unused instructions in a model can allow for the maintenance of a consistent vertex set between instruction trace graphs, granting the ability to make uniform comparisons in graph space.

In some implementations, to find the edges of a graph of an instruction trace, the instruction trace can be scanned while keeping counts for each pair of successive instructions. In some implementations, after filling in an adjacency matrix with these count values for successive pairs of instructions, the matrix can be normalized such that the entries of respective non-zero rows sum to one. This process of estimating the transition probabilities can provide a well-formed Markov chain.

In some implementations, a Markov chain graph (e.g., a graph representation) can be summarized as G=(V, E), where V is the vertex set such as a vertex set composed of unique instructions or grouped instructions, and E is the edge set where the transition probabilities are estimated from the instruction trace data. Constructed graphs can approximate the pathways of execution of the program, and by using graph kernels also known as kernels or kernel matrices, the local and/or global structure of these pathways can be exploited. Also, unlike n-gram methods where the top-L n-grams are chosen for use, doing comparisons in graph space allows for making implicit use of the information contained in the instruction trace.

In some implementations of generating a graph representation, a more expressive vertex set can be used. In an exemplary implementation, the arguments to the instructions are not discarded but rather vertices are constructed in a form where the operator (e.g., an argument) is the instruction, and the operands are either null, or one of three types: register, memory, or dereference. In some implementations, this can result in graphs with large vertex sets such as a vertex set of roughly 3,000 instructions.

Exemplary Method for Graph-Based Classification Using Kernels

Figure 2:
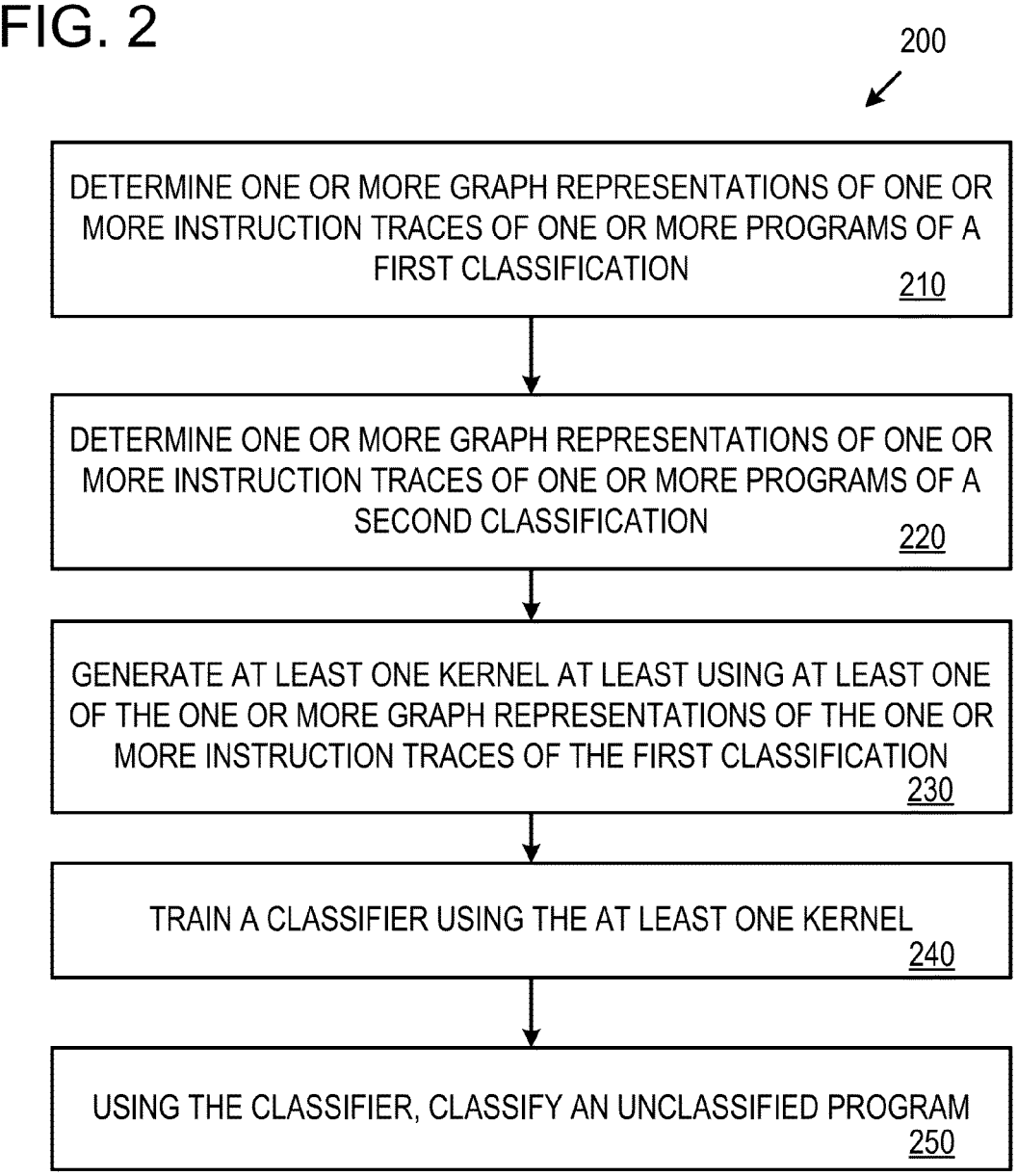
FIG. 2 is a flowchart of an exemplary method of classifying a program using kernels.

FIG. 2 is a flowchart of an exemplary method of classifying a program using kernels. In FIG. 2, one or more graph representations of one or more instruction traces of one or more programs of a first classification are determined at 210. For example, one or more programs in a data set of classified programs can be identified as and labeled as a first classification such as malware or other classification. Also, respective graph representations can be made of respective instruction traces of the one or more programs of the first classification.

At 220, one or more graph representations of one or more instruction traces of one or more programs of a second classification are determined. For example, one or more programs in a data set of programs can be identified as and labeled as a second classification such as non-malware, a benign program, or other classification. Also, respective graph representations can be made of respective instruction traces of the one or more programs of the second classification.

At 230, at least one kernel is generated at least using at least one of the one or more graph representations of the one or more instruction traces of the first classification. For example, one or more kernels also known as kernel matrices can be generated using one or more kernel functions and one or more of the graph representations.

At 240, a classifier is trained using the at least one kernel. For example a kernel-based classification algorithm (e.g., a support vector machine, a Gaussian process, or the like) can be trained using the at least one kernel generated. In some implementations, a kernel-based classification algorithm can be used for classification. In some implementations, a kernel-based classification algorithm can use one or more kernels in a training process and/or in classification.

At 250, using the classifier, an unclassified program is classified. For example, a program not in the data set of classified programs (e.g., an unclassified program) used to train the classifier can be classified using the classifier. If desired, the classifier can classify the unclassified program as the first classification or the second classification.

In one implementation of graph-based classification, dynamic trace data such as instruction traces can be used to perform classification. In some implementations, graph-based classification can include transforming dynamic trace data such as an instruction trace into a graph representation such as a Markov chain representation and can also include using graph kernel machinery to construct a similarity matrix between instances of graphs of instruction traces (e.g., instruction trace graphs). In some implementations of graph-based classification, instruction trace data is converted into one or more graph representations, kernel matrices are constructed between these graphs, and the instruction traces are classified using the kernel matrices.

Exemplary Kernel Generation

This section describes exemplary implementations of graph kernels and the generation of graph kernels that can be used in any of the examples herein. In some implementations, graph kernels, also known as similarity matrices, can be used to make meaningful comparisons between the instruction trace graphs. A kernel, $K(x, x')$, can be a generalized inner product and can be thought of as a measure of similarity between two objects. Using kernels the inner product between two objects can be computed in a higher dimensional feature space, without explicitly constructing the feature space. In one implementation, a kernel, $K: X \times X \to \mathbb{R}$, can be as shown in Equation A.1. Equation A.1 is as follows:

$$K(x,x') = \langle \phi(x), \phi(x') \rangle \quad (A.1)$$

In Equation A.1, the $\langle \cdot, \cdot \rangle$ can be the dot product and $\phi(\cdot)$ can be the projection of the input object into feature space. A well-defined kernel can satisfy two properties: it can be symmetric (for all x and $y \in X$: $K(x, y) = K(y, x)$) and positive-semidefinite (for any $x_1, \ldots, x_n \in X$ and $c \in \mathbb{R}^n$: $\Sigma_{i=1}^n \Sigma_{j=1}^n c_i c_j K(x_i, x_j) \geq 0$). In a classification setting that uses kernels such as graph-based classification, the kernel trick which in part replaces inner products with kernel evaluations can be used. In some implementations, the kernel trick uses a kernel function to perform a non-linear projection of the data into a higher dimensional space, where linear classification in this higher dimensional space represents non-linear classification in the original input space.

In some implementations of graph-based classification, various types of kernels and kernel functions can be used. For example, a Gaussian kernel and a spectral kernel can be used. In one example of a Gaussian kernel, the Gaussian kernel can be as shown in Equation A.2. Equation A.2 is as follows:

$$K_G(x, x') = \sigma^2 e^{-\frac{1}{2\lambda^2} \sum_{i,j} (x_{ij} - x'_{ij})^2} \quad (A.2)$$

In Equation A.2, x and x' can be the weighted adjacency matrices of the Markov chains, $\sigma$ and $\lambda$ can be the hyperparameters of the kernel function and $\Sigma_{i,j}$ sums the squared distance between corresponding edges in the weighted adjacency matrices. In some implementations, the hyperparameters of a kernel function such as the kernel function shown in Equation A.2 can be estimated through cross-validation, or determined using some other technique. The Gaussian kernel of Equation A.2 can search for local similarities between the adjacency matrices. Using this Gaussian kernel, two different classes (e.g., classifications) of programs (e.g., non-malware and malware), that have different pathways of execution, can result in a low similarity score.

In some implementations of graph-based classification, a kernel used can be based on spectral techniques (e.g., a spectral kernel). For example, these spectral techniques or methods can use the eigenvectors of a graph Laplacian to infer global properties about a graph. In an exemplary implementation of a graph Laplacian, the weighted graph Laplacian is a $|V| \times |V|$ matrix $\mathcal{L}$ as shown in Equation A.3. Equation A.3 is as follows:

$$L = \begin{cases} 1 - \dfrac{e_{vv}}{d_v} & \text{if } u = v, \text{ and } d_v \neq 0, \\ -\dfrac{e_{uv}}{\sqrt{d_u d_v}} & \text{if } u \text{ and } v \text{ are adjacent,} \\ 0 & \text{otherwise} \end{cases} \quad (A.3)$$

In Equation A.3, $e_{uv}$ is the weight between vertices u and v, and $d_v$ is the degree of v. In one implementations, the eigenvectors associated with non-zero eigenvalues of $\mathcal{L}$, $\phi(\mathcal{L})$, can be used as a new set of features. In some implementations, these eigenvectors, $\phi(\mathcal{L})$, encode global information about the graph such as graph smoothness, diameter, number of components, stationary distribution and/or other information. Using this information, a spectral kernel can be constructed by using a Gaussian kernel function on the eigenvectors as show by Equation A.4. Equation A.4 is as follows:

$$K_S(x, x') = \sigma^2 e^{-\frac{1}{2\lambda^2} \sum_k (\phi_k(L(x)) - \phi_k(L(x')))^2} \quad (A.4)$$

In Equation A.4, $\phi_k(\mathcal{L}(x))$ and $\phi_k(\mathcal{L}(x'))$ are the eigenvectors associated with weighted Laplacian of the adjacency matrices, $\mathcal{L}(x)$ and $\mathcal{L}(x')$. In some implementations, computing the eigenvectors for Equation A.4 can be done using a singular value decomposition. In some implementations, computing the eigenvectors for Equation A.4 can be done using Hotelling's power method to find the top-k eigenvectors, where k<<n.

In exemplary implementations, given two valid kernels, $K_1$ and $K_2$, it can be that $K = K_1 + K_2$ is also a valid kernel. This algebra on kernels allows for the combining of kernels that measure different aspects of the input data. In one implementation, another kernel can be a weighted combination of $K_G$ (e.g., a Gaussian kernel) and $K_s$ (e.g., a spectral kernel) as shown in Equation A.5. Equation A.5 is as follows:

$$K_C = \mu K_G + (1-\mu) K_S \quad (A.5)$$

In Equation A.5, $0 \leq \mu \leq 1$. In some implementations, $\mu$ can be found using a cross-validation search where candidate $\mu$'s are restricted to be in a range such as the range [0.05, 0.95] with a step size of 0.05. In other implementations, $\mu$ can be found using other techniques of searching for parameters of multiple kernel learning.

Exemplary Program Classification

In some implementations of graph-based classification, a kernel-based classification algorithm such as a support vector machine (SVM) can be used to perform classification of one or more programs. In some implementations, a kernel-based classification algorithm, such as a support vector machine, can search for a hyperplane in the feature space that separates the points of two classes (e.g., classifications) with a maximal margin. In one example, the hyperplane that is found by a SVM is a linear combination of data instances, $x_i$, with weights, $\alpha_i$. In some implementations of a hyperplane, found by a SVM, some or only points close to the hyperplane will have non-zero $\alpha$'s. These points can be called support vectors. Therefore, a goal in one or more kernel-based classification algorithms, such as one or more support vector machines, can be to find the weight vector, $\alpha$, describing each data instance's contribution to the hyperplane. Using quadratic programming, the following optimization problem shown in Equation A.6 can be used to find $\alpha$. Equation A.6 is as follows:

$$\max_\alpha \left( \sum_{i=1}^n \alpha_i - \frac{1}{2} \sum_{i=1}^n \sum_{j=1}^n \alpha_i \alpha_j y_i y_j \langle x_i, x_j \rangle \right) \quad (A.6)$$

Equation A.6 can be subject to the constraints shown in Equation A.7 and Equation A.8 which are as follows:

$$\sum_{i=1}^n \alpha_i y_i = 0 \quad (A.7)$$

$$0 \leq \alpha_i \leq C \quad (A.8)$$

In the examples of Equation A.6 and Equation A.7, $y_i$, can be the class label of instance $x_i$, and $\langle \bullet, \bullet \rangle$ can be the Euclidean dot product. Equation A.7 constrains the hyperplane to go through the origin. Equation A.8 constrains the $\alpha$'s to be non-negative and less than some constant C. In some implementations, C allows for soft-margins, such that some of the examples may fall between the margins. The use of constant C can help to prevent over-fitting the training data and allows for better generalization accuracy. In some implementations, the weight vector for the hyperplane can be as shown in Equation A.9. Equation A.9 is as follows:

$$w = \sum_i \alpha_i y_i x_i \quad (A.9)$$

With this setup, only linear hyperplanes are afforded in the d-dimensional space defined by the feature vectors of x. Using the kernel trick, the data instances can be projected into a higher dimensional space and a linear hyperplane can be found in that space, which would be representative of a non-linear hyperplane in the original d-dimensional space. An optimization problem can be as shown in Equation A.10:

$$\max_\alpha \left( \sum_{i=1}^n \alpha_i - \frac{1}{2} \sum_{i=1}^n \sum_{j=1}^n \alpha_i \alpha_j y_i y_j k(x_i, x_j) \right) \quad (A.10)$$

As shown, Equation A.6 and Equation A.10 can be similar with an exception that the dot product, $\langle \bullet, \bullet \rangle$, of Equation A.6, has been replaced with the kernel function, $k(\bullet, \bullet)$, in Equation A.10.

Given $\alpha$ found in Equation A.10, the following decision function as shown in Equation A.11 can be had. Equation A.11 is as follows:

$$f(x) = \text{sgn}\left( \sum_i^n \alpha_i y_i k(xi, xj) \right) \quad (A.11)$$

The decision function of Equation A.11 returns a first class +1 if the summation is $\geq 0$, and a second class $-1$ if the summation is <0. The number of kernel computations in Equation A.11 is decreased because many of the $\alpha$'s are zero.

In some implementations, the computation of the kernel matrices can be done manually. Also in some implementations, the PyML library can be used to perform the kernel-based classification algorithm (e.g., a support vector machine) training and classification. In other implementations, other tools can be used to perform the kernel-based classification algorithm training and classification and the computation of the kernel matrices. In some implementations, the free parameter C in Equation A.8 can be estimated through cross-validation where the candidate values include [0.1, 1.0, 10.0, 100.0, 1000.0].

In some implementations of graph-based classification, the main kernel computation and the kernel-based support vector machine optimization to find α can be done offline and supplied to and can be received by users for use in classification. In some implementations, the graph-based classification can include two components: an offline component that constructs the kernel matrix and finds the support vectors of the system, and an online component that classifies new program traces as being either malicious or benign. In some implementations, several alternative SVM approaches can be used. For example, a reduced support vector machine can be used in the computing of weights of support vectors.

Exemplary System for Graph-Based Classification

Figure 3:
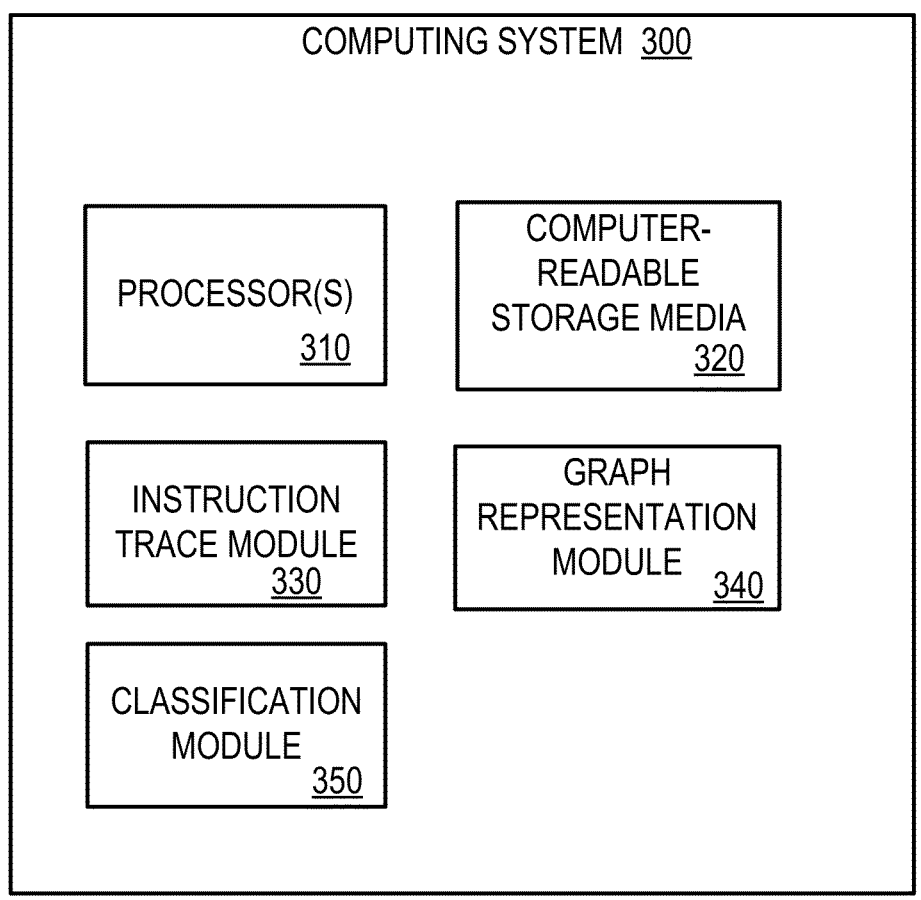
FIG. 3 is a schematic diagram of an exemplary system for classifying a program using graph-based classification.

FIG. 3 is a schematic diagram of an exemplary system 300 for classifying a program using graph-based classification. In FIG. 3, the computing system 300 includes one or more processors 310 and computer-readable storage media 320. The computing system 300 also includes an instruction trace module 330 for generating one or more instruction traces of one or more programs. The computing system 300 further includes a graph representation module 340 for generating one or more graph representations of one or more instruction traces of one or more programs. Additionally, the computing system 300 includes a classification module 350 for training a classifier and/or classifying a program using the classifier.

Exemplary Implementation Variations

A. A method, implemented at least in part by one or more computing devices, the method comprising:
generating an instruction trace of a program;
determining a graph representation of the instruction trace; and
at least using the graph representation of the instruction trace, classifying the program.

B. The method of A, wherein the graph representation comprises an adjacency matrix generated based on a Markov chain.

C. The method of A wherein the classifying the program comprises classifying the instruction trace of the program.

D. The method of A further comprising using the graph representation, generating a kernel.

E. The method of A further comprising training a kernel-based classification algorithm and wherein the classifying the program comprises using the kernel-based classification algorithm.

F. The method of A, wherein the classifying the program comprises using one or more kernels comprising one or more similarity matrices.

G. The method of F, wherein the one or more kernels comprise a Gaussian kernel or a spectral kernel.

H. The method of F, wherein the one or more kernels comprises a combination of a Gaussian kernel and a spectral kernel.

I. The method of H, wherein the Gaussian kernel and the spectral kernel are weighted in the combination.

J. The method of E, wherein the kernel-based classification algorithm comprises support vector machine or a Gaussian process.

K. The method of A wherein the classifying the program comprises classifying the program as malware or non-malware.

L. The method of A, wherein the classifying the program comprises classifying the program as malware of a first classification or as malware of a second classification, wherein the first and second classifications are different.

M. The method of A, wherein the graph representation comprises a Markov chain represented as a graph comprising:
at least one edge weighted using at least one transition probability; and
at least one vertex that represents one or more instructions of the program.

N. The method of M, wherein the one or more instructions of the program are represented irrespective of operands of the one or more instructions of the program.

O. The method of A, wherein the generating the instruction trace of the program comprises:
executing the program; and
generating a list of one or more instructions executed during the executing of the program.

P. The method of O, wherein the list of the one or more instructions lists the one or more instructions of the program in an order the one or more instructions were executed during the executing of the program; and
wherein the list of the one or more instructions omits operands of the one or more instructions.

Q. The method of A, wherein the determining the graph representation of the instruction trace of the program comprises:
generating an adjacency matrix, the generating an adjacency matrix comprising counting pairs of successive instructions of the instruction trace; and
normalizing the adjacency matrix such that the entries of respective non-zero rows of the adjacency matrix sum to 1.

R. A method of classifying malware, implemented at least in part by one or more computing devices, the method comprising:
generating an instruction trace of a program, wherein the generating the instruction trace of the program comprises:
executing the program; and
generating a list of one or more instructions executed during the executing of the program, wherein the list of the one or more instructions lists the one or more instructions of the program in an order the one or more instructions were executed during the executing of the program;
determining a graph representation of the instruction trace, wherein the graph representation of the instruction trace comprises an adjacency matrix representing a Markov chain graph, the Markov chain graph comprising:
at least one edge weighted using at least one transition probability, wherein the at least one transition probability; and
at least one vertex that represents one or more instructions of the program;
wherein the adjacency matrix is generated at least by entering values of counts of pairs of successive instructions of the instruction trace, and normalizing the adjacency matrix; and
at least using the graph representation of the instruction trace, classifying the program as within a malware classification, wherein the classifying the program comprises, using the support vector machine and the graph representation of the instruction trace, determining that the program is within the malware classification.

S. The method of R, wherein classifying the program further comprises:
generating one or more combined kernels using graph representations of instruction traces from at least one instruction trace of a program within the malware classification and at least one instruction trace of a program within a non-malware classification, the one or more combined kernels comprising at least one similarity matrix generated from a weighted combination of a plurality of kernels; and training a kernel-based classification algorithm using the one or more combined kernels.

T. One or more computer readable storage media storing computer executable instructions for performing a method, the method comprising:

generating an instruction trace of a program;

determining a graph representation of the instruction trace; and at least using the graph representation of the instruction trace, classifying the program.

U. A computing system comprising one or more processors and one or more computer-readable media storing computer executable instructions that cause the computing system to perform a method, the method comprising:

generating an instruction trace of a program;

determining a graph representation of the instruction trace; and at least using the graph representation of the instruction trace, classifying the program.

V. A method, implemented at least in part by one or more computing devices, the method comprising:

determining one or more graph representations of one or more instruction traces of one or more programs of a first classification;

determining one or more graph representations of one or more instruction traces of one or more programs of a second classification;

generating at least one kernel at least using at least one of the one or more graph representations of the one or more instruction traces of the first classification; and training a classifier using the at least one kernel; and using the classifier, classifying an unclassified program.

Exemplary Selecting of Eigenvectors

In some implementations of kernel generation, to find the appropriate k, which is the number of eigenvectors that are used to classify the program traces such as shown in Equation A.4, a series of tests can be performed on an independent dataset of malware program traces and benign program traces (e.g., a dataset of 50 malware program traces and 10 benign traces, or other dataset) where k is adjusted using values in a range (e.g., a range of 1 to 30, or other range). Using a multiple kernel learning framework allows for freedom in choosing the k parameter as the kernels work together to smooth each other. In one example, to ease computation, the smallest possible k which still maintains discriminatory power can be chosen. In some implementations, a near-optimal k can be chosen. Also, in some implementations, k can be selected using cross-validation on a validation dataset.

Exemplary Results of Choosing k Averaged Over 10 Runs

This section describes the results of an implementation of choosing k averaged over 10 runs with error bars showing one standard deviation. In one implementation, using these results as a prior, k was set as k=9 for experiments run.

Figure 4:
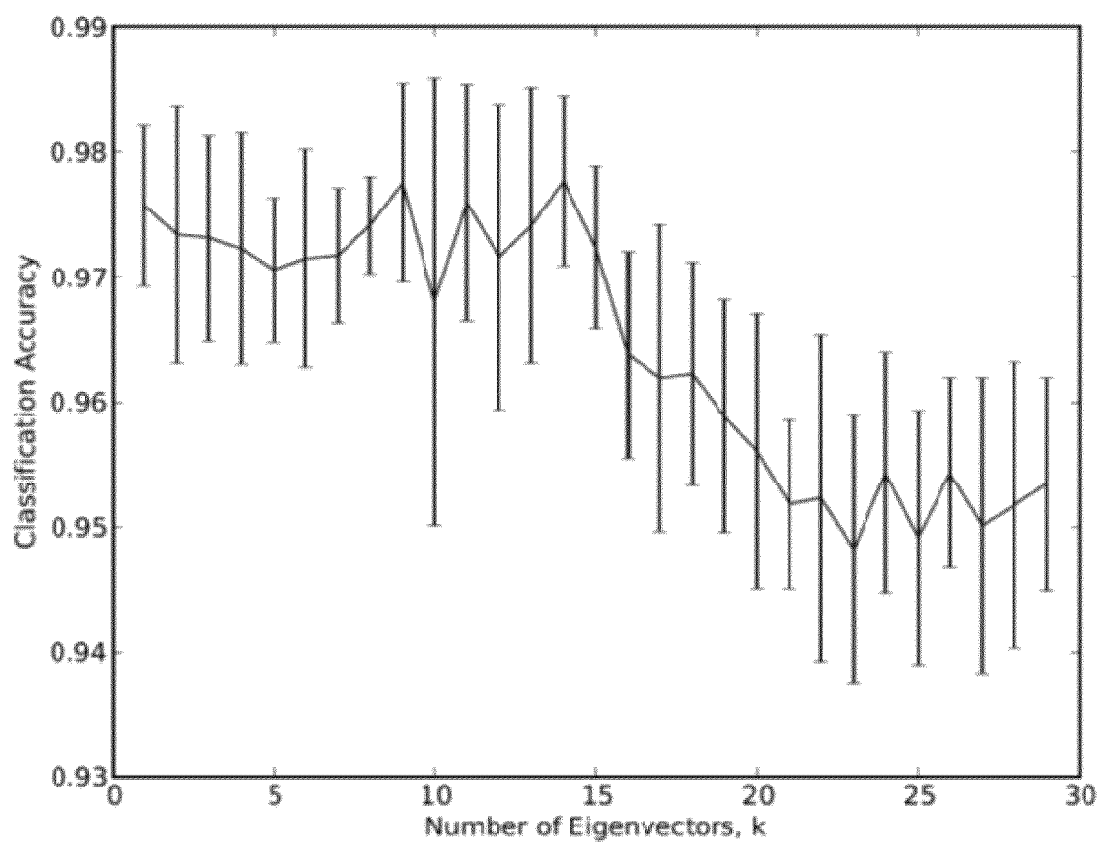
FIG. 4 is a graph that shows a classification accuracy of instances of malware versus instances of benign software as the number of eigenvectors of an implementation of a spectral kernel is varied.

The graph shown in FIG. 4 shows the classification accuracy of 50 instances of malware versus 10 instances of benign software as the number of eigenvectors, k, of an implementation of a spectral kernel is varied. Results are averaged over 10 runs with the error bars being one standard deviation.

Exemplary Results of Comparing Graph-Based Classification to Traditional Virus Detection Methods This section describes exemplary results showing a graph-based classification method (e.g., a multiple kernel learning method) as an alternative to n-gram and signature-based virus detection methods. Table 1 below presents results of classification using three different kernels for graph-based classification and classification for n-gram methods using 10-fold cross-validation. The classification results for the top-5 performing antivirus programs are also presented. As shown, the best results for the n-grams were achieved when n=4, L=1000 and a support vector machine with a second order polynomial kernel was used.

TABLE 1

| Method | Accuracy (%) | FPs | FNs | AUC |
|---|---|---|---|---|
| Gaussian Kernel | 95.70% | 44 | 52 | .9845 |
| Spectral Kernel | 90.99% | 80 | 121 | .9524 |
| Combined Kernel | 96.41% | 47 | 33 | .9874 |
| n-gram (n = 3, L = 2500, SVM = 3-poly) | 82.15% | 300 | 98 | .9212 |
| n-gram (n = 4, L = 2000, SVM = 3-poly) | 81.17% | 327 | 93 | .9018 |
| n-gram (n = 2, L = 1000, 4-NN) | 80.63% | 325 | 107 | .8922 |
| n-gram (n = 2, L = 1500, SVM = 2-poly) | 79.82% | 339 | 111 | .8889 |
| n-gram (n = 4, L = 1500, SVM = Gauss) | 79.42% | 354 | 105 | .8991 |
| AV0 | 73.32% | 0 | 595 | N/A |
| AV1 | 53.86% | 1 | 1028 | N/A |
| AV2 | 49.60% | 0 | 1196 | N/A |
| AV3 | 43.27% | 1 | 1264 | N/A |
| AV4 | 42.96% | 1 | 1271 | N/A |

As shown in Table 1, both machine learning approaches, graph-based classification using kernels and n-grams, were able to out-perform the standard antivirus programs. Although the n-grams shown in Table 1 can out-perform some antivirus programs as shown in Table 1, the results of Table 1 reinforce that learning with the Markov chain graphs can improve accuracy over n-gram methods. Table 1 also illustrates that a combined kernel, which uses local and global structural information about the Markov chain graphs, can improve performance over some standalone kernels.

In the dataset used for the results shown in Table 1, the dataset included more examples of malware than benign software. Also, this data skew can in part be responsible for a portion of the false-positives shown in Table 1 in both the technique of graph-based classification using kernels and the n-gram methods. In some implementations such as in a production setting or other setting, a more diverse and extensive set of benign trace data can be used in graph-based classification.

Figure 5:
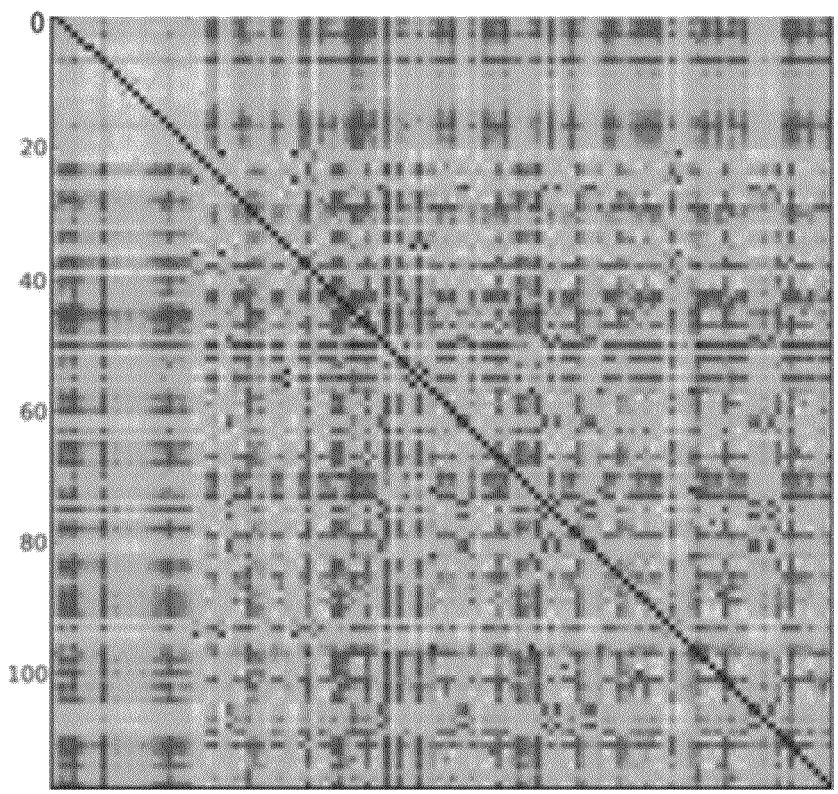
FIG. 5 shows a grayscale representation of a heat map for an implementation for a Gaussian kernel.
Figure 6:
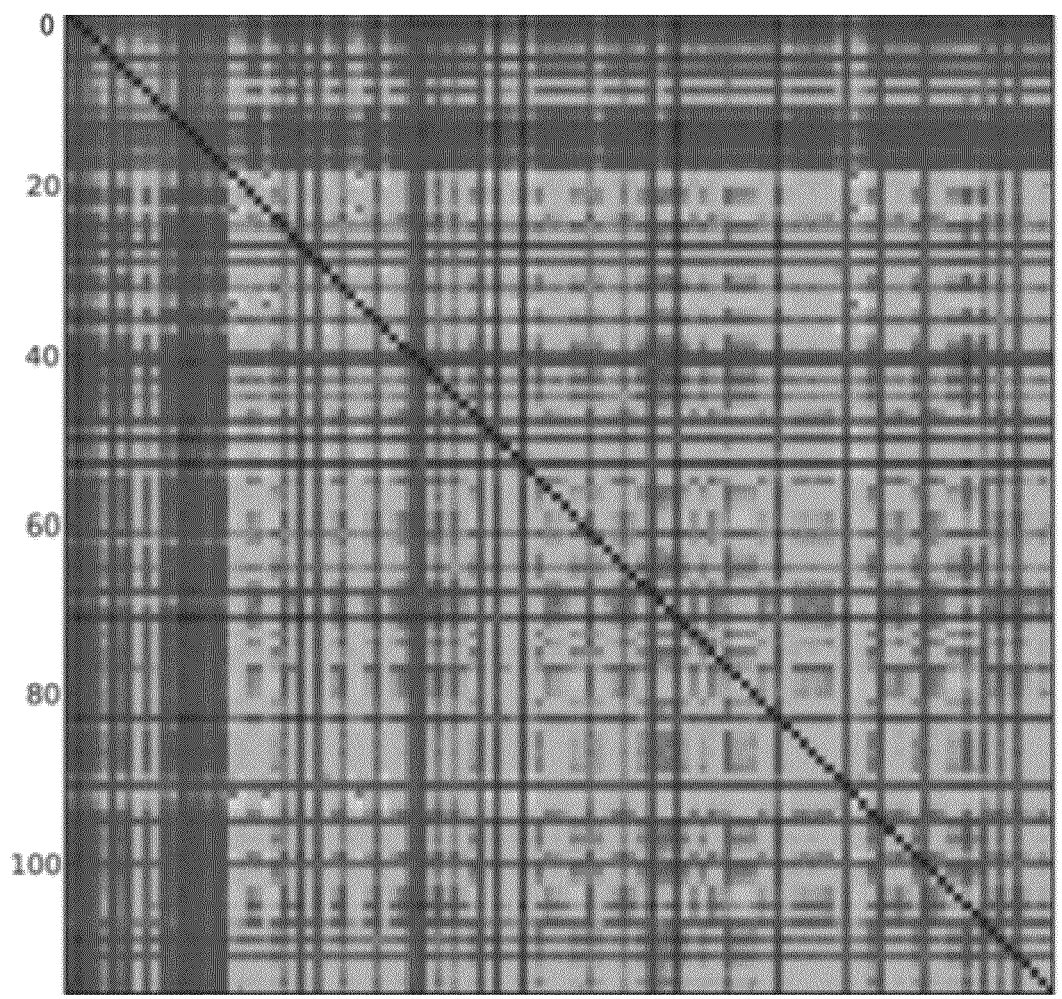
FIG. 6 shows a grayscale representation of a heat map for an implementation for a Spectral kernel.
Figure 7:
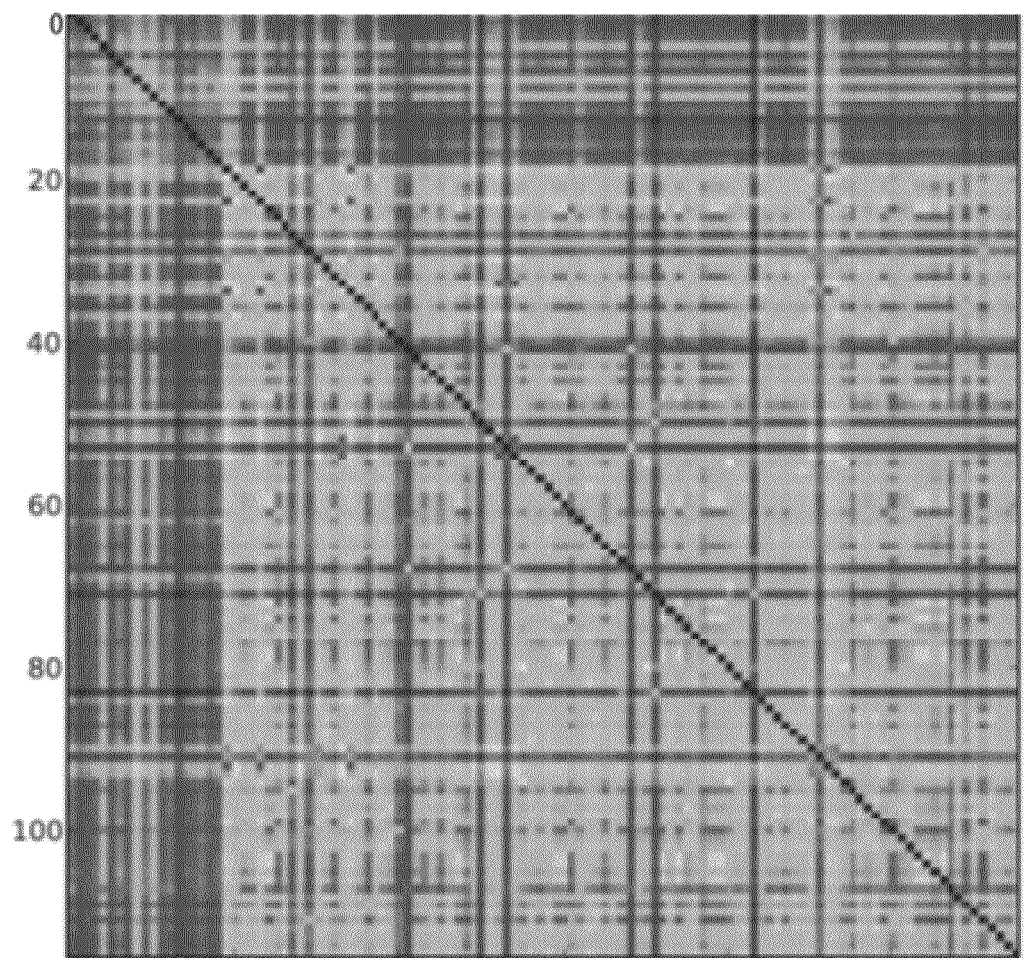
FIG. 7 shows a grayscale representation of a heat map for an implementation for a combined kernel.

FIG. 5, FIG. 6 and FIG. 7 show grayscale representations of respective heat maps (e.g., the values for the similarity matrix) for the 3 respective kernels tested against to generate the results shown in Table 1. For visual purposes, only kernel values for 19 benign samples and 97 malware samples are shown. The program traces that are more similar can have warmer colors in the heat maps. For example, warmer colors represent higher measures of similarity in the heat maps. The block structure seen in the heat maps indicates that these kernels can discriminate between two classes of software. The smaller block in the upper left of each heat map of FIG. 5, FIG. 6, and FIG. 7 represents the benign software and the larger lower right represents the malware. FIG. 5 shows a grayscale representation of a heat map for an implementation for the Gaussian Kernel used. FIG. 6 shows a grayscale representation of a heat map for an implementation for the Spectral Kernel used. FIG. 7 shows a grayscale representation of a heat map for an implementation for the Combined Kernel used.

Exemplary Classification of Malware

In some implementations, graph-based classification can be used to differentiate different types of malware. For example, in some implementations, graph-based classification of different types of malware can be done using a data set that includes a number of instances of the Netbull virus (e.g., 13 instances of the Netbull virus or other number of instances) with different packers and a sample (e.g., random sample) of instances of malicious code (e.g., 97 instances of malicious code).

Table 2 shows results of one set of experiments that evaluated the performance of algorithms with respect to their ability to differentiate between different types of malware. This is a direction that can be pursued if the graph-based classification methodology is to be transferred to a clustering/phylogenetics setting. In the set of experiments conducted, the dataset was composed of 13 instances of the Netbull virus with different packers and a random subsample of 97 instances of malicious code from a main malware dataset. In the data set, the number of other families of viruses were limited to 97 due to the effects of data skew. The results are summarized in Table 2.

TABLE 2

| Method | Accuracy (%) | FPs | FNs | AUC |
|---|---|---|---|---|
| Gaussian Kernel | 95.70% | 44 | 52 | .9845 |
| Spectral Kernel | 90.99% | 80 | 121 | .9524 |
| Combined Kernel | 96.41% | 47 | 33 | .9874 |
| n-gram (n = 3, L = 2500, SVM = 3-poly) | 82.15% | 300 | 98 | .9212 |
| n-gram (n = 4, L = 2000, SVM = 3-poly) | 81.17% | 327 | 93 | .9018 |
| n-gram (n = 2, L = 1000, 4-NN) | 80.63% | 325 | 107 | .8922 |
| n-gram (n = 2, L = 1500, SVM = 2-poly) | 79.82% | 339 | 111 | .8889 |
| n-gram (n = 4, L = 1500, SVM = Gauss) | 79.42% | 354 | 105 | .8991 |
| AV0 | 73.32% | 0 | 595 | N/A |
| AV1 | 53.86% | 1 | 1028 | N/A |
| AV2 | 49.60% | 0 | 1196 | N/A |
| AV3 | 43.27% | 1 | 1264 | N/A |
| AV4 | 42.96% | 1 | 1271 | N/A |

Figure 8:
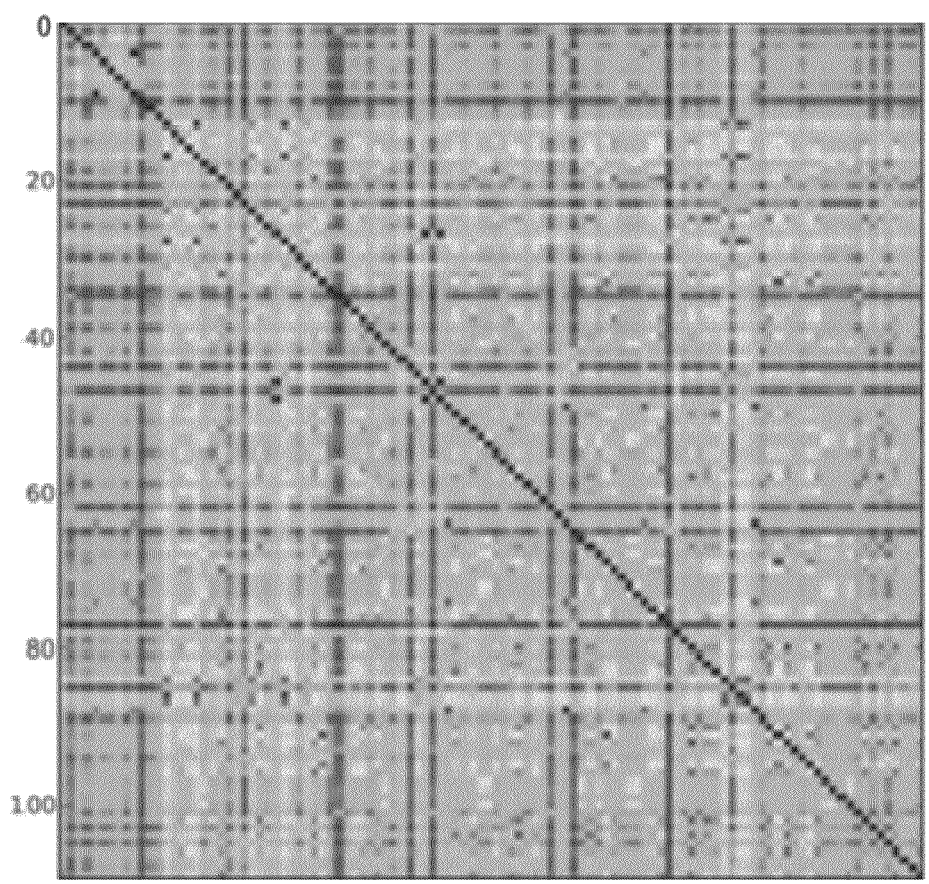
FIG. 8 shows a grayscale representation of a heat map of an implementation of a Gaussian kernel matrix of the Netbull virus with different packers versus malware.
Figure 9:
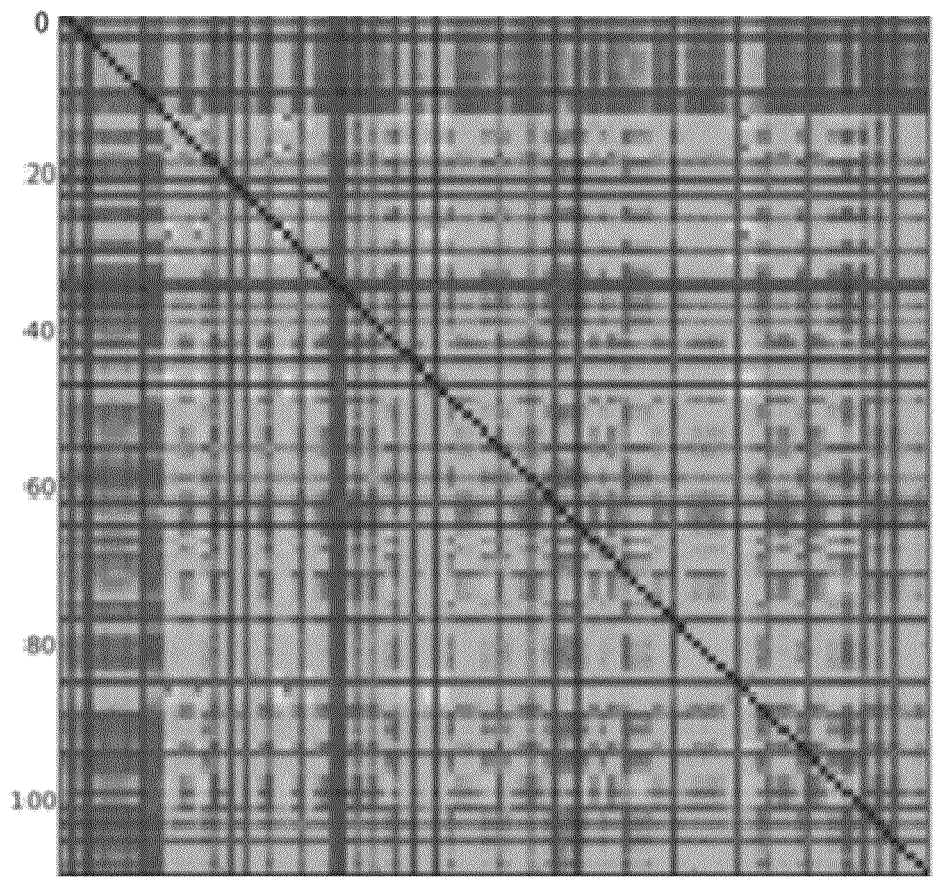
FIG. 9 show a grayscale representation of a heat map of an implementation of a spectral kernel matrix of the Netbull virus with different packers versus malware.
Figure 10:
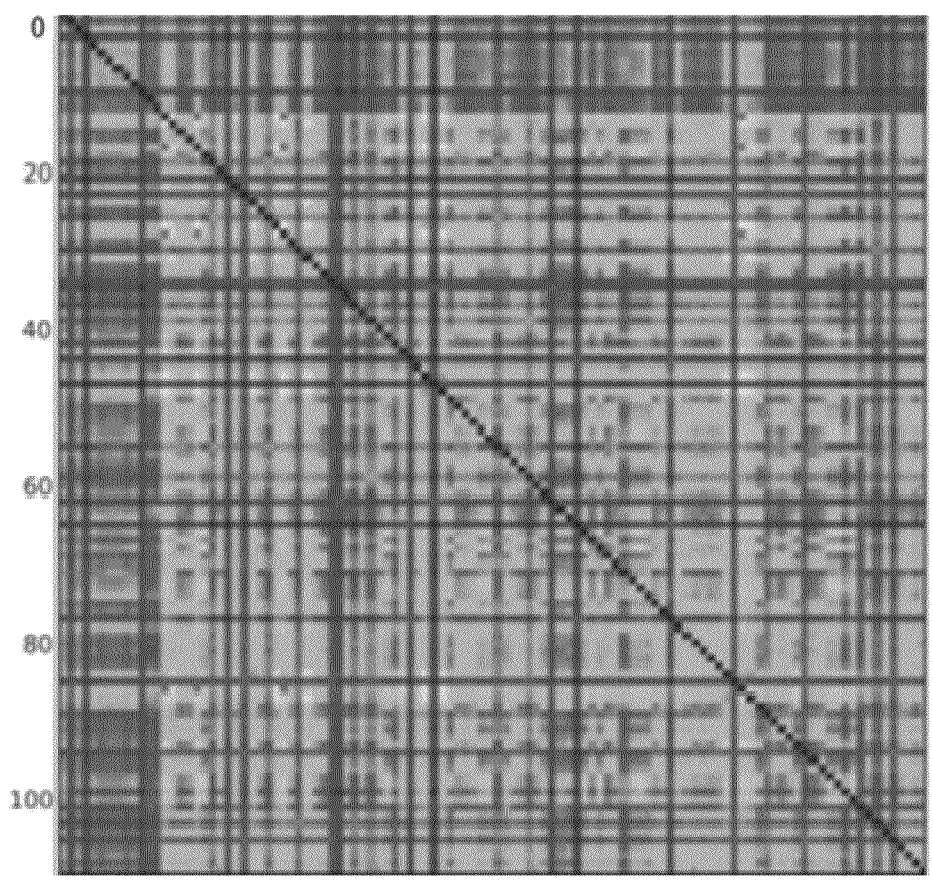
FIG. 10 shows a grayscale representation of a heat map of an implementation of a combined kernel matrix of the Netbull virus with different packers versus malware.

These results show that the combined kernel can correctly classify instances of the Netbull virus despite a skewed dataset. The n-gram methods tested had a more difficult time correctly classifying the instances of the Netbull virus given the data skew. For the n-gram methods, after the top-3 parameter choices for the n-grams, these models quickly devolved into predicting the majority class for all instances. Respective heat maps for the respective kernels used in the experiments that produced the results shown in Table 2 are displayed in respective of FIG. 8, FIG. 9 and FIG. 10 and have a similar block structure to the previous heat maps shown. This can validate the graph-based classification approach's ability to distinguish between somewhat similar pieces of malware. These results can also validate using the data representation and associated kernels in a kernel-based clustering environment. FIG. 8 shows a grayscale representation of a heat map of the used implementation of the Gaussian kernel matrix of the Netbull virus with different packers versus malware. FIG. 9 show a grayscale representation of a heat map of the used implementation of the spectral kernel matrix of the Netbull virus with different packers versus malware. FIG. 10 shows a grayscale representation of a heat map of the used implementation of the combined kernel matrix of the Netbull virus with different packers versus malware.

Exemplary Timing Results

This section discusses computation times for exemplary implementations of graph-based classification. As stated previously, graph-based classification can include two components; computing the graph kernels and performing the support vector machine optimization (e.g., Equations A.5 and A.10), which can be done offline, and the classification of a new instance or unclassified instance (e.g., Equation A.11), which can be done online. The dataset that was used to gather the results shown in Table 3 composed of 1,615 samples of programs labeled as malicious and 615 samples of programs labeled as benign. As the example shown in Table 3 illustrates, the majority of the time used in the implementation was spent computing the kernel matrices. It took 698.45 seconds to compute the full kernel matrices. Since this portion can be done offline, it can be used in a production system. For the implementation, the online component of classifying a new instance took 0.54 seconds as shown in Table 3. In this example, the majority of this time is spent in computing the kernel values between the new instance and the labeled training data as described in Equation A.11 above.

In the experiments of the results shown, the number of kernel computations is decreased due to the support vector machine finding a sparse set of support vectors. The PyML implementation of the SVM used in the example reported in Table 3 typically found ~350 support vectors. There are other forms of support vector machines that can search for sparser solutions, which can help to speed up an online component by reducing the number of support vectors thereby reducing the number of kernel computations.

TABLE 3

| Component | Time |
|---|---|
| Gaussian Kernel | 147.91 ± 9.54 |
| Spectral Kernel | 550.55 ± 32.90 |
| SVM Optimization | 0.16 ± 0.05 |
| Classifying New Instance | 0.54 ± 0.07 |
| Total Offline | 698.45 ± 57.44 |
| Total Online | 0.54 ± 0.07 |

Exemplary Data Environment

In one implementation of graph-based classification, one or more instances of malware can be collected, and one or more instances of benign software (e.g., non-malware) can be collected. For example, in one implementation 1615 instances of programs labeled as malware can be collected and 615 instances of programs labeled as benign software can be collected. In other implementations, different numbers of instances of malware and benign software can be collected.

In some implementations of classification of malware, a number of instances of an identified malware with different packers can be used and compared against a sample (e.g., a random sample, chosen sample, or other sample) of instances of malware. For example, 13 instances of the Netbull virus with different packers (e.g., UPX, ASprotect, and/or other packers) can be used and compared against a random sample of 97 instances of malware. In this example, using 13 different packers can provide polymorphic versions of the same Netbull virus.

Exemplary Architecture of an Ether Integration

Figure 11:
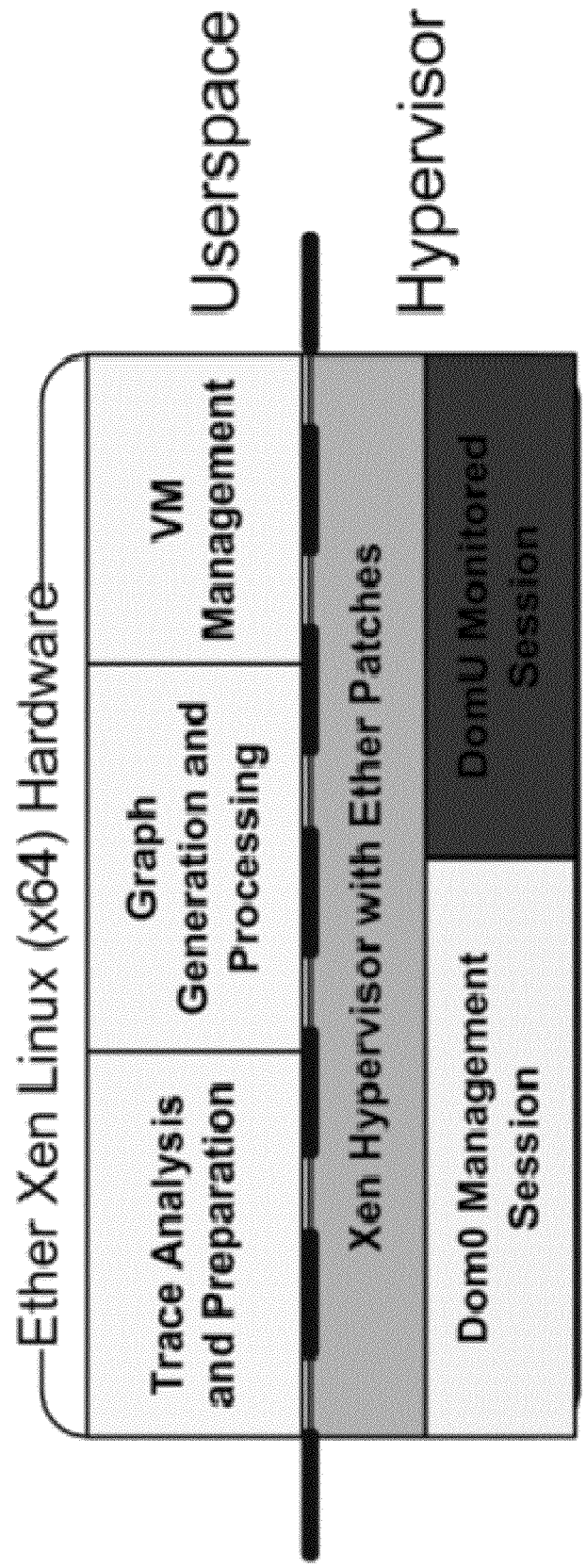
FIG. 11 illustrates an exemplary implementation of an architectural layout of the Ether integration.

FIG. 11 illustrates an exemplary implementation of an architectural layout of the Ether integration.

Exemplary Instruction Trace Data and Resulting Graph

This section describes an example implementation of a portion of instruction trace data and a resulting fragment of an exemplary instruction trace graph. The exemplary portion of the instruction trace data is shown in Table 4.

TABLE 4

| | |
|---|---|
| call | [ebp + 0x8] |
| push | 0x70 |
| push | 0x010012F8 |
| call | 0x01006170 |
| push | 0x010061C0 |
| mov | eax, fs: [0x00000000] |
| push | eax |
| mov | fs: [ ], esp |
| mov | eax, [esp + 0x10] |
| mov | [esp + 0x30], ebp |
| lea | ebp, [esp + 0x10] |
| sub | esp, eax |
| ... | ... |

Figure 12:
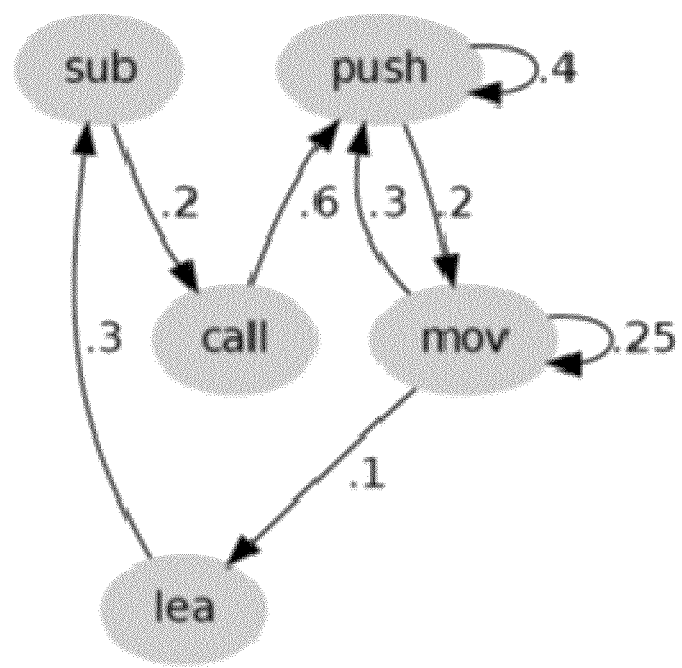
FIG. 12 shows a graph representing a fragment of a Markov chain.

A resulting graph representing a fragment of a Markov chain is shown in FIG. 12. In some implementations of a Markov chain graph, the out-going edges can sum to 1. FIG. 12 shows the resulting graph representing the fragment of a Markov.

Exemplary Eigenstructures of Markov Chain Graphs

Figure 13:
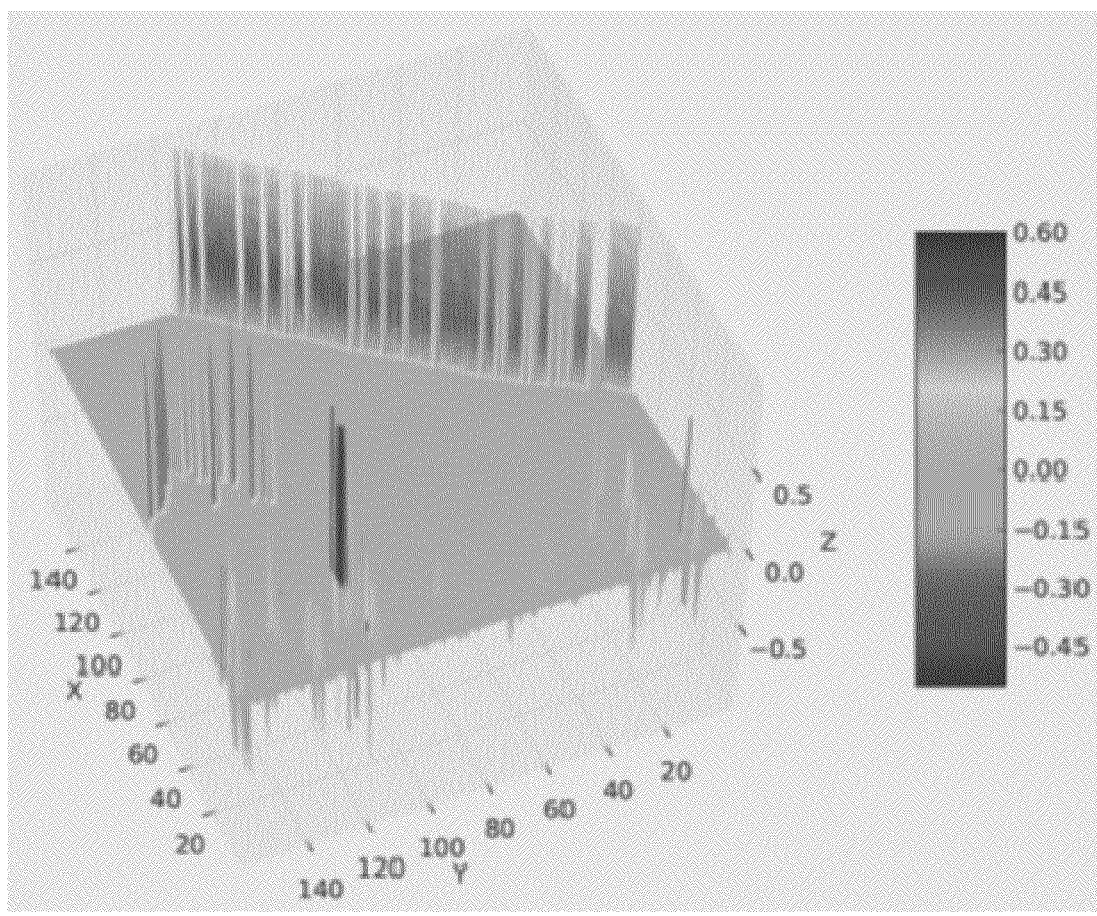
FIG. 13 shows an exemplary plot of eigenvectors showing an eigenstructure of an implementation of a Markov chain graph for an implementation of benign software.

To give some intuition behind a spectral kernel, this section describes exemplary implementations of plots of the eigenvectors of the graph Laplacian for an example of benign software and an example of malware. The diagonal ridges in the respective plots shown in FIG. 12 and FIG. 13 represent all of the unused instructions in the trace, which are disconnected components in the graph. In some implementations, to construct $K_s$ we only use the top-k eigenvectors and this ridge information is discarded. In the graph, the actual program flow contained in the largest connected component is found in the spikes and valleys at the bottom of the respective plots. In some implementations, the eigenvectors of the Laplacian can be thought of as a Fourier basis for the graph. In some implementations, comparing these harmonic oscillations, encoded by the eigenvectors, between different types of software can provide discrimination between structural features of respective graphs such as strongly connected components and cycles.

FIG. 13 shows an exemplary plot of eigenvectors showing an eigenstructure of an implementation of a Markov chain graph for an implementation of benign software.

Figure 14:
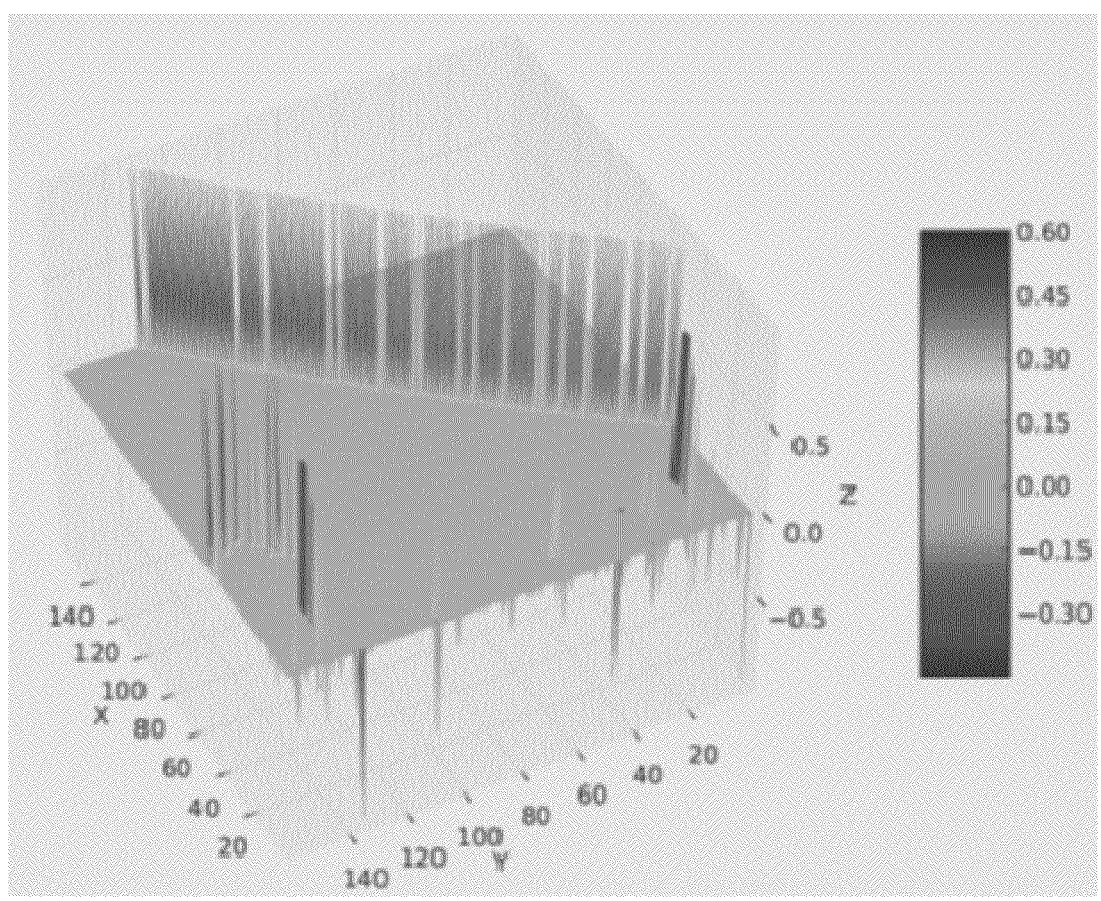
FIG. 14 shows an exemplary plot of eigenvectors showing an eigenstructure of an implementation of a Markov chain graph for an implementation of malware.

FIG. 14 shows an exemplary plot of eigenvectors showing an eigenstructure of an implementation of a Markov chain graph for an implementation of malware.

Exemplary Alternatives

This section describes alternative implementations of graph-based classification.

Graph-based classification in some implementations can include various components such as an offline component that constructs the kernel matrix and finds the support vectors of the system, and an online component that classifies new program traces as being either malicious or benign.

In some implementations, the worst-case computational complexity for solving the optimization problem as shown in Equation A.10 is $O(n^3)$ where n is the number of support vectors. Although this can be done offline, there are several alternative SVM approaches, such as the reduced support vector machine, that can help to increase the speed of computing the weights of the support vectors.

In some implementations, computing the eigenvectors for Equation A.4 can be done using a singular value decomposition. This operation is $O(n^3)$ and can compute all of the eigenvectors, however in some implementations only the top-k can be used. In some implementations, Hotelling's power method can be used to find the top-k eigenvectors, where k<<n. In some implementations, this method runs in $O(kn^2)$ and can help to increase the speed of both an offline complete kernel computation, and online computations as shown in Equation A.11.

A multiple kernel learning framework can give a logical way to measure different aspects of the program trace data collected. An interesting direction can be to incorporate different data sources, each with appropriate kernels, into a composite kernel. These data sources can include information based on the static analysis of the binary and the API sequence calls made by the program. Methods based on these data sources can possibly lead to more accurate results when combined in a multiple kernel learning framework.

In other implementations of graph-based classification, different types of kernels can be added or multiple data sources can be used. In some implementations, the multiple kernel learning can be embedded within an optimization problem of a kernel-based classification algorithm, such as a support vector machine's optimization problem, a semi-infinite linear program, which can allow for the simultaneous finding of the support vectors and the new parameter β. β can be the parameter that controls the contribution of each kernel with the constraint $\Sigma_{i=0}^{k} \beta_i = 1$.

In some implementations of clustering, given a kernel matrix, which can correctly classify the Netbull viruses against other types of viruses, spectral clustering can be used. With spectral clustering, the eigenstructure of the kernel matrix can be used to cluster the different data instances into different families.

Exemplary Method for Malware Classification Using Multiple Data Sources

Figure 15:
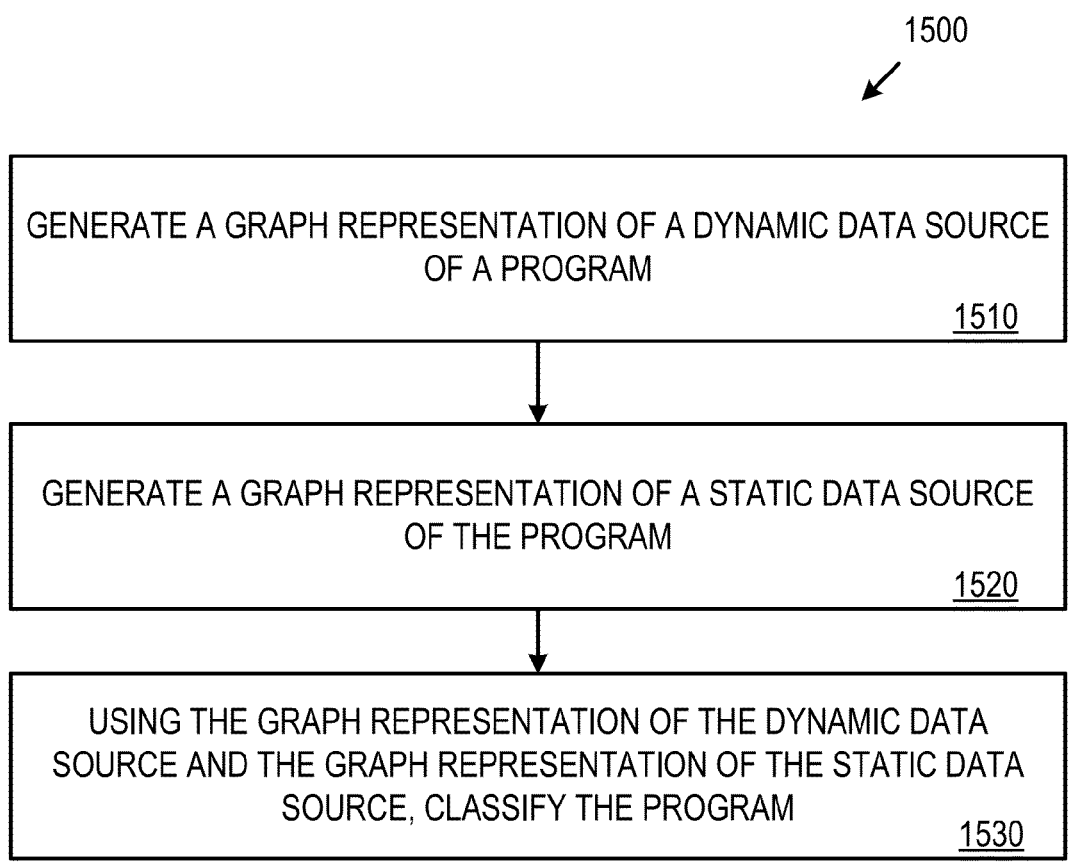
FIG. 15 is a flowchart of an exemplary method of classifying malware using multiple data sources.

FIG. 15 is a flowchart of an exemplary method 1500 of classifying malware using multiple data sources. In FIG. 15, at least one graph representation of at least one dynamic data source of at least one program is generated at 1510. For example, a Markov chain graph representation of a dynamic instruction trace or system call trace of a program can be generated.

At 1520, at least one graph representation of at least one static data source of the at least one program is generated. For example, a Markov chain graph representation of a static data source such as an executable binary and/or a disassembled binary of the program can be generated. In some implementations, a representation of a control flow graph can be generated from a static data source of the program such as a control flow graph of the program.

At 1530, at least using the at least one graph representation of the at least one dynamic data source and the at least one graph representation of the at least one static data source, the at least one program is classified. For example, the graph representations of the dynamic and static data sources can be used by a kernel-based classification algorithm or process (e.g., a support vector machine, a Gaussian process, or the like) to classify the program.

In some implementations, the classification of the program can include a classification of malware or non-malware. In some implementations, a classifier, such as a kernel-based classification algorithm (e.g., a support vector machine, a Gaussian process, or the like), is trained using kernels generated using one or more combinations of representations of dynamic, static, and/or file information data sources of programs from a data set of malware and non-malware programs.

Exemplary Data Sources

One or more of the exemplary data sources described herein can be used in any of the examples of malware classification described herein.

Instances of malware are often created through polymorphism and simple code obfuscation techniques, and thus can be similar to known malware; however, in some instances such malware cannot be detected by signature-based anti-virus programs. Malware classification using multiple data sources and machine learning techniques can be used to learn the general descriptions of malware and apply this knowledge to classify instances of malware.

In some implementations, machine learning techniques for malware classification can use a variety of data sources to learn to discriminate between benign (e.g., non-malware) and malicious software (e.g., malware). In some implementations, these data sources of a program include one or more binary files, one or more binary disassembled files, one or more entropy measures on a binary, one or more dynamic system call traces, one or more dynamic instruction traces, and/or one or more control flow graphs.

In some implementations of malware classification, different data sources can be combined using multiple kernel learning to arrive at a classification system that incorporates the information of the combined data sources in performing classification such that there can be an increased classification accuracy and lower false positives. In some implementations, a kernel can be a positive semi-definite matrix where each entry in the matrix is a measure of similarity between instances in the dataset, for each data source. Additionally, multiple kernel learning, in some implementations, can be used to find the weights of each kernel, and/or create a linear combination of the kernels. Also, in some implementations of malware classification, a kernel-based classification algorithm (e.g., a support vector machine (SVM), a Gaussian process, or the like) can be used to perform classification.

Using malware classification using multiple data sources can allow for analysts to sift through, for example, thousands of malware examples, and more closely analyze the samples that look the most similar to known malicious samples in a variety of ways. In some implementations of malware classification using multiple data sources, similarity is based on a combination of dynamic behavior and static analysis approaches to get a more holistic picture, which can make it more difficult for malware to evade detection.

In some implementations of malware classification, different types of data (e.g., six different types of data or otherwise) can be used in malware classification. Using one or more of these data sources can capture different views of a program in the hopes that, while an instance of a malicious executable can disguise itself in some views, disguising itself in every view while maintaining malicious intent can prove to be more difficult.

In some implementations, static data sources can be used in malware classification. For example, static data sources of a program can include one or more of binary files of the program, a disassembled binary of the program, and/or a control flow graph generated from the disassembled binary of the program.

Also, in some implementations of malware classification, dynamic data sources can be used. For example dynamic data sources for a program can include a dynamic instruction trace of the program and/or a dynamic system call trace of the program. Additionally, in some implementations of malware classification, a miscellaneous file information data source that contains a brief overview of collected information (e.g., the information collected or a subset of the information collected) can be used.

In one implementation of malware classification using multiple data sources, a binary data source can be used. For example, the raw byte information contained in the binary executable of a program can be used to construct a data source such as a binary data source. In some implementations of using the raw byte information for malware classification, 2-grams of consecutively appearing byte values can be used to condition a Markov chain and perform classification in graph space. For example, the byte values (e.g., 0-255 or otherwise) of the raw byte information can correspond to different vertices in the graph, and the transition probabilities can be estimated by the frequencies of the 2-grams of a particular transition observed in the binary data source.

In some implementations of malware classification using multiple data sources, a disassembled data source can be used. For example, the opcodes of a disassembled program can be used to generate one or more malware detection schemes. In some implementations, to generate the disassembled code, a disassembler utility (e.g., objdump or the like) can be used. In some implementations, using the disassembled code, a Markov chain can be built similarly to the way the Markov chain for the binary files is built. In some implementations, instead of the byte values being the vertices in the graph, the disassembled instructions are the vertices in the graph.

In some implementations, the transition probabilities can be estimated by the frequencies of 2-grams of the disassembled instructions. In some implementations, the number of unique instructions found in some disassembled files (e.g., ~1200 or other number of unique instructions) can give large Markov chains that can over fit data. This is in part due to the curse of dimensionality, where the feature space becomes too large and there is not enough data to sufficiently condition the model. To combat this, in some implementations, one or more categorizations of instructions can be used with each categorization having increasing complexity. For example, the roughest categorization can contain eight categories that include basic instruction categories (e.g., math, logic, privileged, branch, memory, stack, nop, and/or other categories). In other implementations, other categorizations can be used such as categorizations including 34, 68, 77, 86, 154, 172, or a different number of categories. In one implementation, a categorization with 86 categories can be used that has separate categories for most of the initial 8086/8088 instructions as well as categories for some extended instruction sets such as SSE and MMX. In other implementations, further categorizations that represent program behavior can be used.

In one implementation of malware classification using multiple data sources, a control flow graph data source can be used. For example, the use of control flow graphs can be used to perform malware classification. In some implementations, a control flow graph is a graph representation that models paths of execution (e.g., all or some of the paths of execution) that a program might take during its lifetime.

A control flow graph can be a graph where the vertices represent blocks of code of a program and the edges can represent jumps in control flow of the program. In some implementations, in the control flow graph, the vertices are the basic blocks (e.g., a block of code without any jumps or jump tar-gets) of the program, and the edges represent the jumps in control flow of the program. In some instances, this representation can make it more difficult for a virus to create a semantically similar version of itself while changing its control flow graph enough to avoid detection. To compute the similarity between different control flow graphs, in some implementations, a simplified kernel can be used where the simplified kernel is based on counting similarly shaped subgraphs of a specified size.

In addition to static analysis data sources, one or more dynamic sources of data can be used in malware classification. For example, dynamic data sources can include one or more instruction traces of a program and/or one or more system call traces of a program. In some implementations of malware classification using multiple data sources, a dynamic instruction trace data source can be used. For example, the instruction traces or system call traces can be collected over run or execution of the program (e.g., using the Xen virtual machine, the Intel Pin program). In some implementations, the execution of the program can be for an extended observation duration (e.g., at least 5 minutes or the like) during collection. In other implementations, instruction traces or system call traces can be collected using other techniques.

In some implementations, over a number of program traces, a number of unique instructions can be recorded. For example, in one implementation, over 1556 traces of programs, 237 unique instructions were recorded. In some implementations, Markov chains can be built for instruction traces a program in a similar fashion as the disassembled code. In some implementations, for an instruction trace, recorded instructions are mapped to the vertices of the Markov chain. For example, in one implementation where 237 unique instructions were recorded, each of the 237 instructions recoded can be mapped to 237 unique vertices. In some implementations, the transition probabilities can be estimated by the frequencies of 2-grams of the recorded instructions. In some implementations, categorization of instructions can also be used to generate a Markov chain graph of a dynamic instruction trace.

In one implementation of malware classification, dynamic system call trace data sources can be used. In some implementations, system calls of an executing program can be recorded in a system call trace. For example, in one implementation over 1556 traces of programs, 2460 unique system calls were recorded. In some implementations, a Markov chain graph representation of a system call trace can be generated and used. In some implementations, the recorded system calls can be mapped to the vertices of the Markov chain graph. In some implementations, the recorded system calls can be categorized and the categories can be used as vertices in the system call traces. For example, in one implementation, system calls can be grouped into categories (e.g., 94 categories or otherwise) where each category represents groups of system calls such as painting to the screen, writing to files, cryptographic functions, or other categories. In some implementations, the transition probabilities of the Markov chain graph can be estimated by the frequencies of 2-grams of the categories of the recorded system calls.

In some implementations of malware classification using multiple data sources, a file information data source can be used. For example, for a data source of miscellaneous file information, one or more pieces of information can be collected about one or more of the various data sources described previously and used as a feature of the file information data source. For example, pieces (e.g., seven or the like) of information can be collected about a program, and the pieces of information can be about one or more characteristics of the program and/or one or more characteristics of the various data sources of the program described previously.

A miscellaneous file information data source or file information data source can include one or more features. A feature of a file information data source can be statistics or information about a program and/or generated from other data sources created from the program. For example, features of a file information data source can include the entropy and/or the size of the binary file of the program, a packed status of the program, the total number of instructions in a dynamic instruction trace plus the number of system calls in a dynamic system call trace, the number of edges and/or the number of vertices in a control flow graph of the program, or other information generated from a program or data sources of a program. Table 5 summarizes file information statistics used in an exemplary implementation of malware classification using multiple data sources. Table 5 shows, for various categories of programs, the average entropy, the average size of the binary (in megabytes), the average number of vertices and edges in the control flow graph, the average number of instructions in the disassembled files, and the average number of instructions/system calls in the dynamic trace. Additionally, in Table 5, the percentage of files known to be packed is also given.

TABLE 5

Summary of File Information Statistics

| Statistic | Malware | Benign |
|---|---|---|
| Entropy | 7.52 | 6.34 |
| Binary Size | .799 | 2.678 |
| Packed | 47.56% | 19.59% |
| Num Vertices (CFG) | 5,829.69 | 10,938.85 |
| Num Edges (CFG) | 7,189.58 | 13,929.40 |
| Num Static Instructions | 50,982 | 72,845 |
| Num Dynamic Instructions | 7,814,452 | 2,936,335 |

In some implementations of a file information data source, the entropy and/or the size of the binary file of a program is used as a feature of the data source. In the implementation summarized in Table 5, the average entropy of benign files was found to be 6.34 and the average entropy of malicious files to be 7.52.

In some implementations of a file information data source, a packed status can be used as a feature of the data source. For example, a binary feature can be used to look at whether the binary executable has a recognizable packer such as UPX, Armadillo, or other packer. In an exemplary implementation, to determine a packed status of a file of a program that is to say to find whether a file is packed or not, the PEID program can be used.

In some implementations of a file information data source, for the disassembled binary feature, the number of instructions can be used as a feature of the data source. In some implementations of a file information data source, the number of edges and/or the number of vertices in the control flow graph can be used as a feature of the data source. In some implementations of a file information data source, the total number of dynamic instructions plus the number of dynamic system calls can be used as a feature of the data source.

Exemplary Malware Classification Using Data Sources

Included in this section are descriptions of exemplary implementations of transforming one or more data sources, such as the data sources (e.g., six data sources or otherwise) previously described, into more convenient representations. Additionally, included in this section are descriptions of implementations of generating kernels which can be similarity measures that are able to compare one or more data sources in the respective representations. Further included in this section are descriptions of exemplary methods of multiple kernel learning which can find a linear combination of kernels so that a combined kernel can be used in a kernel-based classification algorithm setting. This section includes the following subsections A, B, C, D and E.

A. Exemplary Method of Malware Classification Using Kernels

Figure 16:
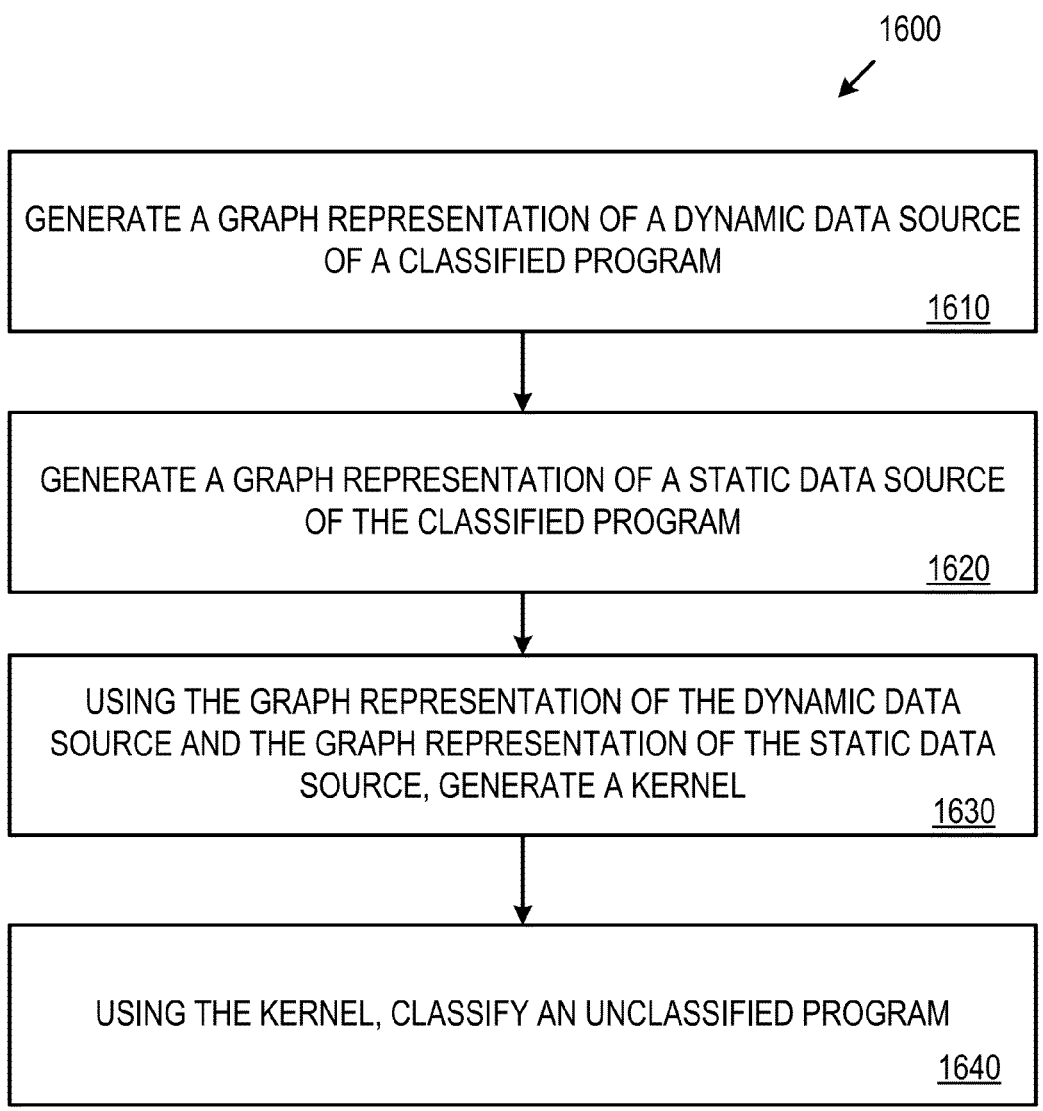
FIG. 16 is a flowchart of an exemplary method of classifying an unclassified program using a kernel and a plurality of data sources.

FIG. 16 is a flowchart of an exemplary method 1600 of classifying an input (e.g. to-be classified) program using a plurality of data sources and a kernel. In FIG. 16, at least one graph representation of at least one dynamic data source of at least one classified program is generated at 1610. For example, a program in a training set of programs can have a known classification such as its malware classification (e.g., malware or non-malware). Also, for example a Markov chain graph representation of a dynamic data source such as an instruction trace or system call trace of the classified program can be generated.

At 1620, at least one graph representation of at least one static data source of the at least one classified program is generated. For example, a program in a training set of programs can have a known classification such as malware or non-malware. Also for example, a Markov chain graph representation of a static data source such as an executable binary and/or a disassembled binary of the classified program can be generated. In some implementations, a representation of a control flow graph can be generated from a static data source such as a control flow graph of the classified program.

At 1630, at least using the at least one graph representation of the at least one dynamic data source and the at least one graph representation of the at least one static data source, at least one kernel is generated. For example, respective kernels can be generated using the graph representations of the dynamic and static data sources and the kernels can be used to generate a combined kernel.

At 1640, at least using the at least one kernel, an unclassified program is classified. For example, the kernel can be used to train a kernel-based classification algorithm (e.g., a support vector machine, a Gaussian process, or the like) and the kernel-based classification algorithm can be used to classify an unclassified program which was not part of the set of programs used to train the kernel-based classification algorithm. In some implementations, a kernel-based classification algorithm can be used in the classification of a program. In some implementations, a kernel-based classification algorithm can use one or more kernels in a training process and/or in classification.

B. Exemplary Data Representations

In any of the examples herein, data sources can be represented using data representations. In some implementations, the file information collected for a file information data source can be represented as a feature vector (e.g., a feature vector of length seven or other length) where the statistics for a feature of the data source corresponds to features of the feature vector. In some implementations, the control flow graphs of programs can be control flow graph representations of programs. In some implementations, the data sources such as the binary, disassembled instruction trace, dynamic instruction trace, and/or the dynamic system call trace, can be represented using a Markov chain representation that can also be called a Markov chain graph representation.

In some implementations, given some data source, such as the dynamic instruction trace P, a new representation, P', can be found such that unified comparisons can be made in graph space while still capturing the sequential nature of the data. For example, this can be achieved by transforming dynamic trace data into a Markov chain which can be represented as a weighted, directed graph. In one implementation, a graph, $G=(V, E)$, is composed of two sets, V and E. The elements of V are called vertices and the elements of E are called edges. In some implementations of a data representation, the edge weight, $e_{ij}$, between vertices i and j corresponds to the transition probability from state i to state j in a Markov chain, hence, the edge weights for edges originating at $v_i$ can be made to sum to 1, $\Sigma_{i \rightsquigarrow j} e_{ij}=1$. In some implementations, an n×n (n=|V|) adjacency matrix can be used to represent the graph (e.g., Markov chain graph), where each entry in the matrix, $a_{ij}=e_{ij}$.

In an exemplary implementation of dynamic instruction traces over a set of programs, 237 unique instructions were found across all of the traces collected. In some implementations, instructions found can be the vertices of the Markov chains. In some implementations, instructions found can be irrespective of the operands used with those instructions. By ignoring operands, sensitivity to register allocation and other compiler artifacts can be removed. In some implementations of a group of instruction traces, rarely did the instruction traces make use of all 237 unique instructions. In some implementations, the adjacency matrices of the instruction trace graphs contain some rows of zeros. Incorporating unused instructions in the model can allow for the maintenance of a consistent vertex set between instruction trace graphs, granting the ability to make uniform comparisons in graph space.

In some implementations, to find the edges of the graph, a scan of the instruction trace can be performed to keep counts for each pair of successive instructions. In some implantations, after filling in the adjacency matrix with these values, the matrix can be normalized such that all of the non-zero rows sum to one. This process of estimating the transition probabilities can generate a well formed Markov chain. In some implementations, a Markov chain graph can be summarized as $G=(V, E)$, where V can be the vertex set composed of a number of unique instructions found in program traces, E can be the edge set where the transition probabilities are estimated from the data.

C. Exemplary Kernels

In some implementations, a kernel, $K(x, x')$, can be a generalized inner product and can be thought of as a measure of similarity between two objects. The power of kernels can lie in their ability to compute the inner product between two objects in a possibly much higher dimensional feature space, without explicitly constructing this feature space. In any of the examples herein a kernel, $K: X \times X \rightarrow \mathbb{R}$, can be determined as shown in Equation C.1. Equation C.1 is as follows:

$$K(x,x')=\langle \phi(x),\phi(x') \rangle \quad (C.1)$$

In Equation C.1, $\langle \cdot, \cdot \rangle$ can be the dot product and $\phi(\cdot)$ can be the projection of the input object into feature space. In some implementations, a well-defined kernel can satisfy two properties: it can be symmetric (for all x and $y \in X: K(x,y)=K(y,x)$) and positive-semidefinite (for any $x_1, \ldots, x_n \in X$ and $c \in \mathbb{R}^n$: $\Sigma_{i=1}^n \Sigma_{j=1}^n c_i c_j K(x_i,x_j) \geq 0$). Kernels can be appealing in a classification setting due to the kernel trick, which in one implementation, replaces inner products with kernel evaluations. In some implementations, the kernel trick uses the kernel function to perform a non-linear projection of the data into a higher dimensional space, where linear classification in this higher dimensional space is equivalent to non-linear classification in the original input space. In some implementations, one or more kernels can include a graph kernel such as a random walk kernel, a shortest paths kernel, a spectral kernel, a graphlet kernel, a squared exponential kernel, or other kernel.

In some implementations, for generating a kernel using one or more Markov chain representations and/or the file information feature vector, a standard squared exponential kernel as shown in Equation C.2 can be used. Equation C.2 is as follows:

$$K_G(x, x') = \sigma^2 e^{-\frac{1}{2\lambda^2} \sum_k (x_i - x'_j)^2} \quad \text{(C.2)}$$

In Equation C.2, $x_i$ represents one of the seven features for the file information data source, and $x_i$ can represent an edge weight, or transition probability, for the Markov chain representations. In Equation C.2, $\sigma$ and $\lambda$ can be the hyperparameters of the kernel function and $\Sigma_{i,j}$ sums the squared distance between the corresponding features. In some implementations, the hyperparameters, $\sigma$ and $\lambda$, of the kernel function can be estimated through cross-validation.

In some implementations, a graphlet kernel can be generated using one or more control flow graph data sources. A graphlet kernel can be chosen for use due to its computational efficiency. In some implementations, a k-graphlet can be implemented as a subgraph with the number of nodes equal to k. If $f_G$ is the number of graphlets in a control flow graph G with a fixed k, the normalized probability vectors can be as shown in Equation C.3. Equation C.3 is as follows:

$$D_G = \frac{f_G}{\text{\# of all graphlets with } k \text{ nodes in } G} \quad \text{(C.3)}$$

As shown in Equation C.3, to determine a normalized probability vector $D_G$ for a control flow graph, the subgraphs in the control flow graph with k nodes can be enumerated. The frequency, in the control flow graph, of particularly shaped subgraphs with k nodes can be determined. For example, a count of the number of times a similarly shaped subgraph (e.g., evaluated based on similar edges) occurs in the control flow graph can be kept. The respective counts of the similarly shaped subgraphs can be normalized by dividing the counts by the total number of graphlets with k nodes in the control flow graph. These normalized counts can be included as entries in the normalized probability vector $D_G$.

Using normalized probability vectors using Equation C.3, a resulting graphlet kernel can be determined as shown in Equation C.4. Equation C.4 is as follows:

$$K_g(G, G') = D_G^T D_{G'} \quad \text{(C.4)}$$

In some implementations, graphlets of size k can be used such that $k \in \{3, 4, 5\}$ or k can be another size. In some implementations, the graphlet size k can be k=4, or other size.

In some implementations, if there is a set of valid kernels, $K_1, K_2, \ldots, K_n$, it can be that $$K = \sum_{1 \le i \le n} K_i \quad \text{(C.5)}$$

is also a valid kernel. This algebra on kernels can allow for the elegant combining of kernels that measure very different aspects of the input data, or even different views of the data, and is the object of study in multiple kernel learning.

D. Multiple Kernel Learning

In some implementations of kernel-based learning, such as with one or more kernel-based classification algorithms (e.g., a support vector machine, a Gaussian process, or the like), the weight vector, $\alpha$, describing each data instance's contribution to a hyperplane that separates the points of two classes, with a maximal margin can be found with the optimization problem shown in Equation C.6. Equation C.6 is as follows:

$$\min_\alpha \underbrace{\left( \frac{1}{2} \sum_{i=1}^{n} \sum_{j=1}^{n} \alpha_i \alpha_j y_i y_j k(x_i, x_j) - \sum_{i=1}^{n} \alpha_i \right)}_{S_k(\alpha)} \quad \text{(C.6)}$$

Equation C.6 can be subject to the constraints as shown in Equation C.7. Equation C.7 is as follows:

$$\sum_{i=1}^{n} \alpha_i y_i = 0 \quad \text{(C.7)}$$
$$0 \le \alpha_i \le C$$

In the examples of Equation C.6 and Equation C.7, $y_i$ can be the class label of instance $x_i$. Equation C.7 constrains the $\alpha$'s to be non-negative and less than some constant C. C can allow for soft-margins, such that some of the examples may fall between the margins. This can help to prevent over-fitting the training data and allows for better generalization accuracy.

In some implementations, given $\alpha$ found in Equation C.6, the following decision function as shown in Equation C.8 can be had. Equation C.8 is as follows:

$$f(x) = \text{sgn}\left( \sum_{i}^{n} \alpha_i y_i k(x_i, x) \right) \quad \text{(C.8)}$$

The decision function of Equation C.8, when evaluated, can return class +1 if the summation is $\ge 0$, and class −1 if the summation is <0. In some implementations, the decision function of Equation C.8 can be used to classify an unclassified program using representations of one or more data sources for the program. In some implementations, the class +1 can represent one classification of programs and class −1 can represent another classification of programs. Using the decision function, a program can be classified as within a classification. For example, if the decision function of Equation C.8 is evaluated using a graph representation of a program, the program can be classified within the classification represented by the classification result of the decision function.

In some implementations of multiple kernel learning, $\beta$ can be found, in addition to the $\alpha$ of a kernel-based classification algorithm (e.g., a support vector machine), such that $$k(x_i, x_j) = \sum_{k=1}^{K} \beta_k k_k(x_i, x_j) \quad \text{(C.9)}$$

In Equation C.9 above, the combined kernel, $k(x_i, x_j)$, can be a convex combination of K kernels with $\beta_k \ge 0$, where each kernel, $k_k$, uses a distinct set of features. The kernel of Equation C.9 can be used in the decision function of Equation C.8. In some implementations, each distinct set of features can be a different view of the data given by respective different data sources.

In some implementations, to solve for $\beta$, assuming a fixed set of support vectors ($\alpha$), the following semi-infinite linear program as shown in C.10 has been proposed:

$$\max \theta$$
$$w.r.t. \theta \in \mathbb{R}, \beta \in \mathbb{R}^K \quad \text{(C.10)}$$

subject to the constraints as shown in C.11:

$$0 \leq \beta \quad \text{(C.11)}$$
$$\sum_k \beta_k = 1$$
$$\sum_{k=1}^{K} \beta_k S_k(\alpha) \geq \theta$$

for all $\alpha \in \mathbb{R}^N$ with $0 \leq \alpha \leq 1C$ and $\Sigma_i y_i \alpha_i = 0$, and where $S_k(\alpha)$ is as defined in Equation C.6. In some implementations, this can be a semi-infinite linear program as the constraints in Equation C.11 are linear, and there are infinitely many of these constraints, one for each $\alpha \in \mathbb{R}^N$ satisfying $0 \leq \alpha \leq 1C$ and $\Sigma_i y_i \alpha_i = 0$. In some implementations, to find solutions for both $\alpha$ and $\beta$, an iterative algorithm can be used that first uses a standard support vector machine algorithm to find $\alpha$ (e.g., using Equation C.6), and then fixes $\alpha$ and solves Equation C.10 to find $\beta$. While this algorithm is known to converge, there convergence rates can be unknown. Therefore, the following stopping criterion as shown in C.12 can be used:

$$\epsilon^{t+1} \geq \epsilon^t := \left| 1 - \frac{\sum_{k=1}^{K} \beta_k^t S_k(\alpha^t)}{\theta^t} \right| \quad \text{(C.12)}$$

This method of multiple kernel learning can be efficient. In some implementations, solving for $\alpha$ and $\beta$ with as many as one million examples and twenty kernels can take just over an hour. In some implementations, for a set of data, this optimization problem can be solved once, as the support vectors ($\alpha$) and kernel weights ($\beta$) found can be used to classify newly collected data.

E. Exemplary System for Classifying Programs Using Multiple Data Sources

Figure 17:
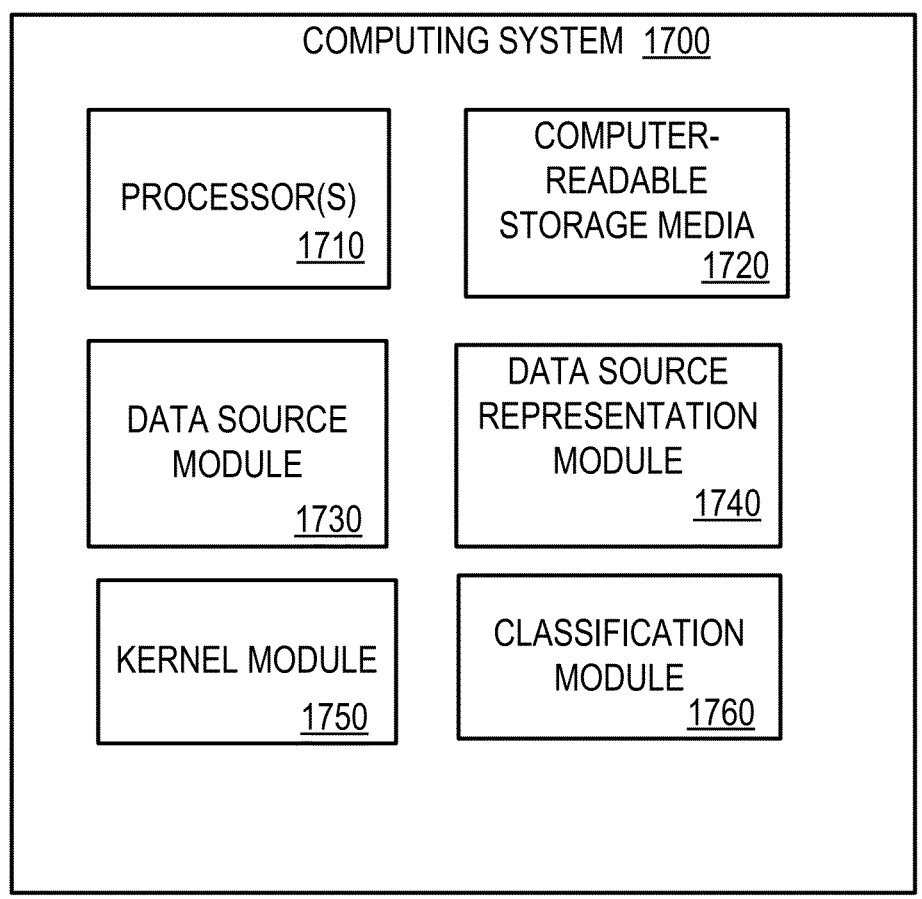
FIG. 17 is a schematic diagram of an exemplary computing system for classifying programs using multiple data sources.
Figure 18:
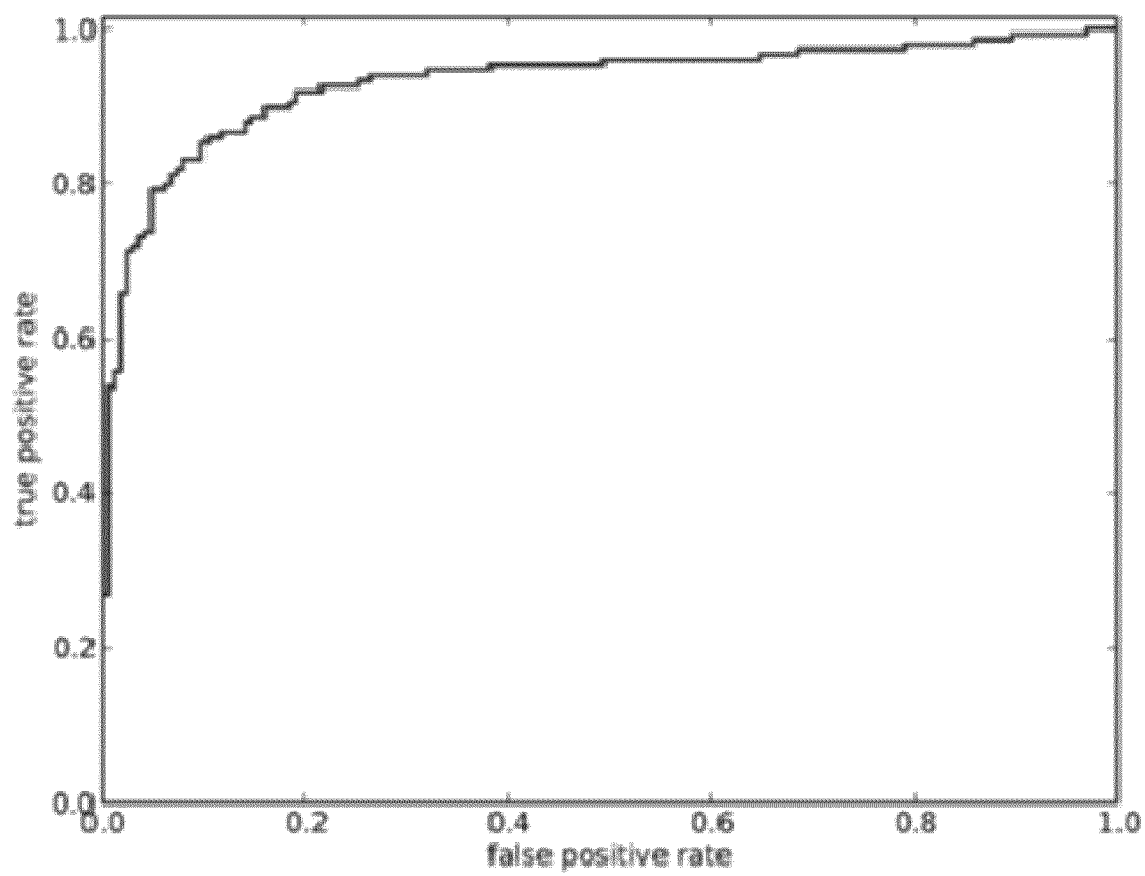
FIG. 18 shows a plot of a ROC curve for a kernel based on a binary data source.
Figure 19:
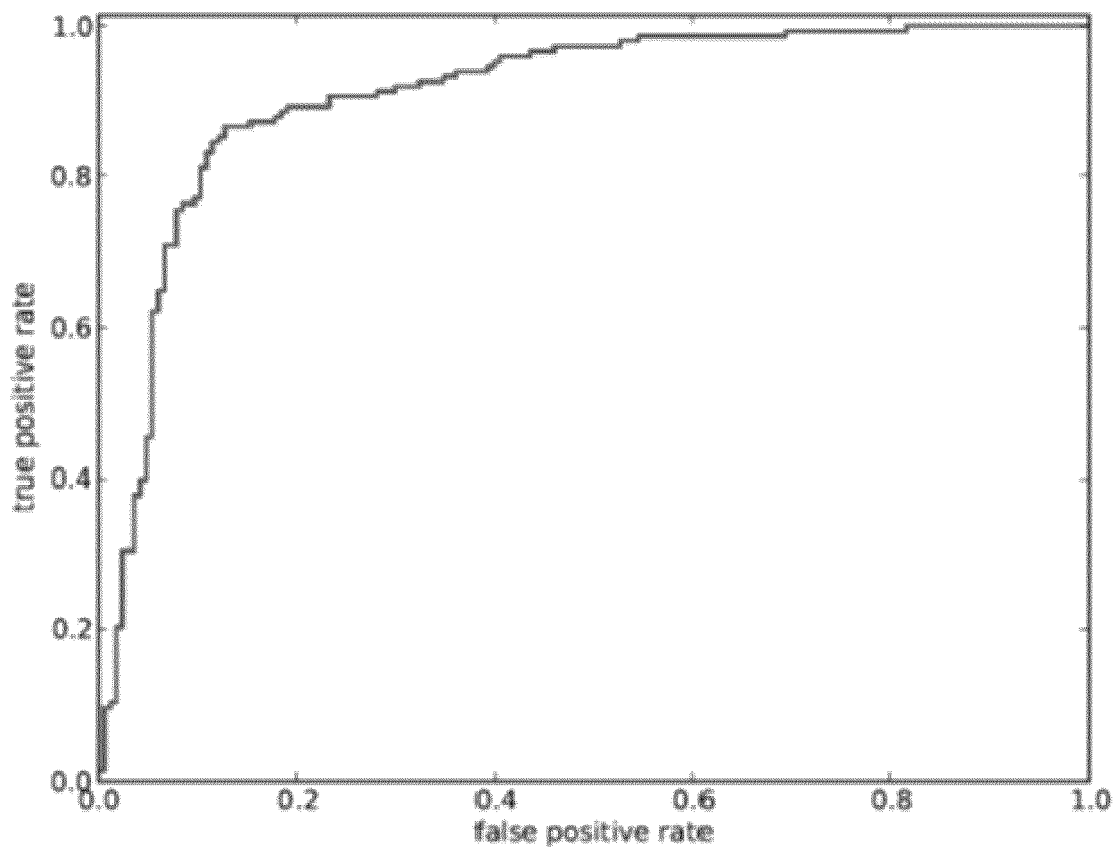
FIG. 19 shows a plot of a ROC curve for a kernel based on a file information data source.
Figure 20:
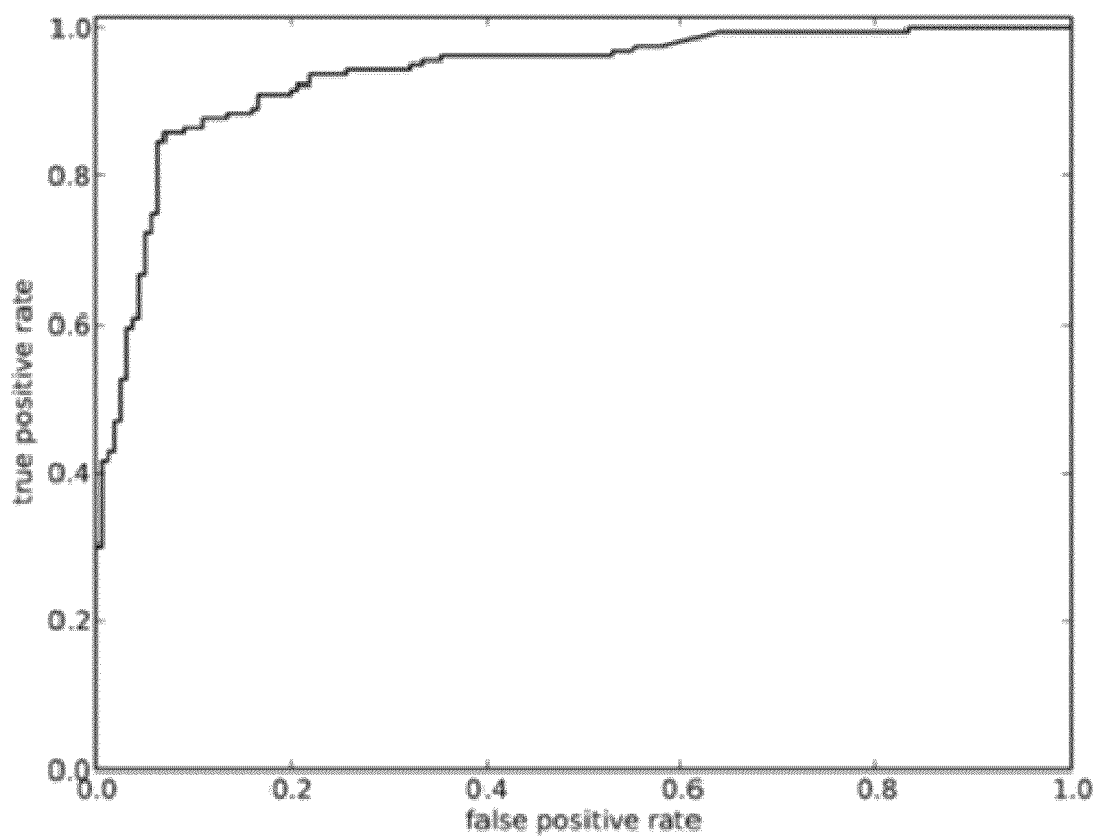
FIG. 20 shows a plot of a ROC curve for a kernel based on a control flow graph data source.
Figure 21:
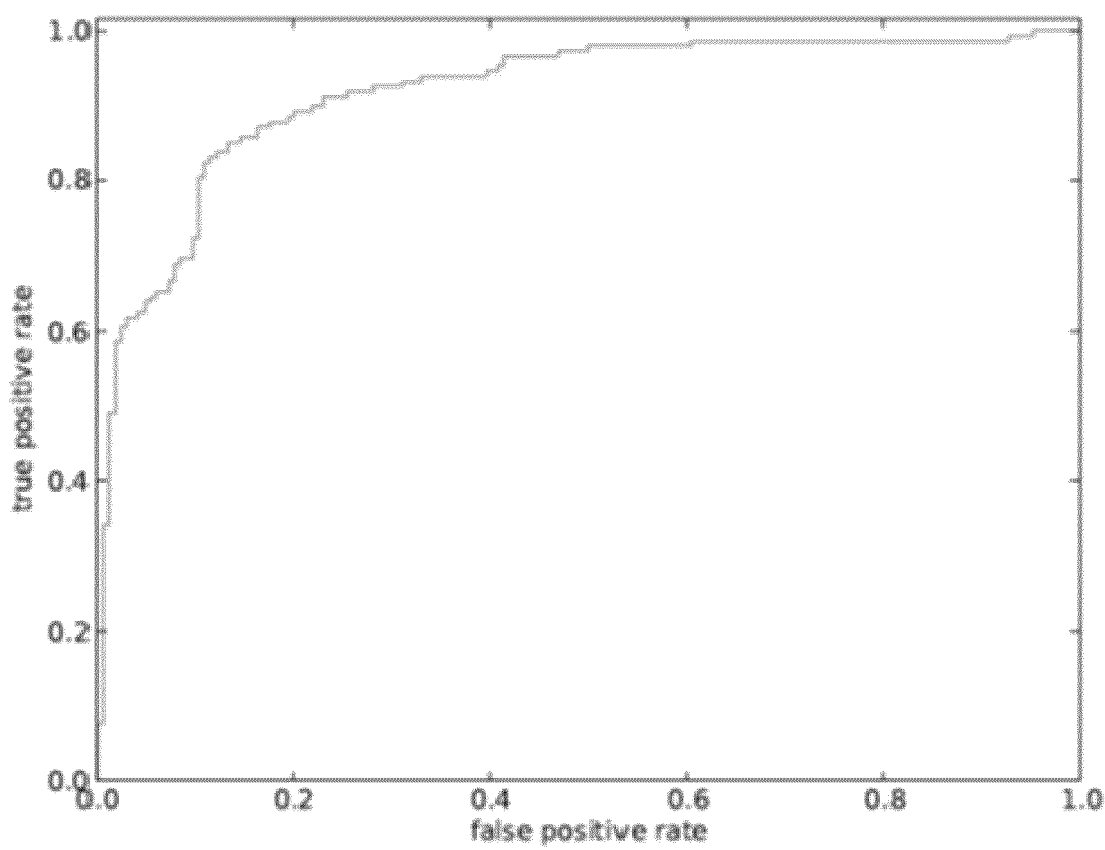
FIG. 21 shows a plot of a ROC curve for a kernel based on a dynamic instruction data source.
Figure 22:
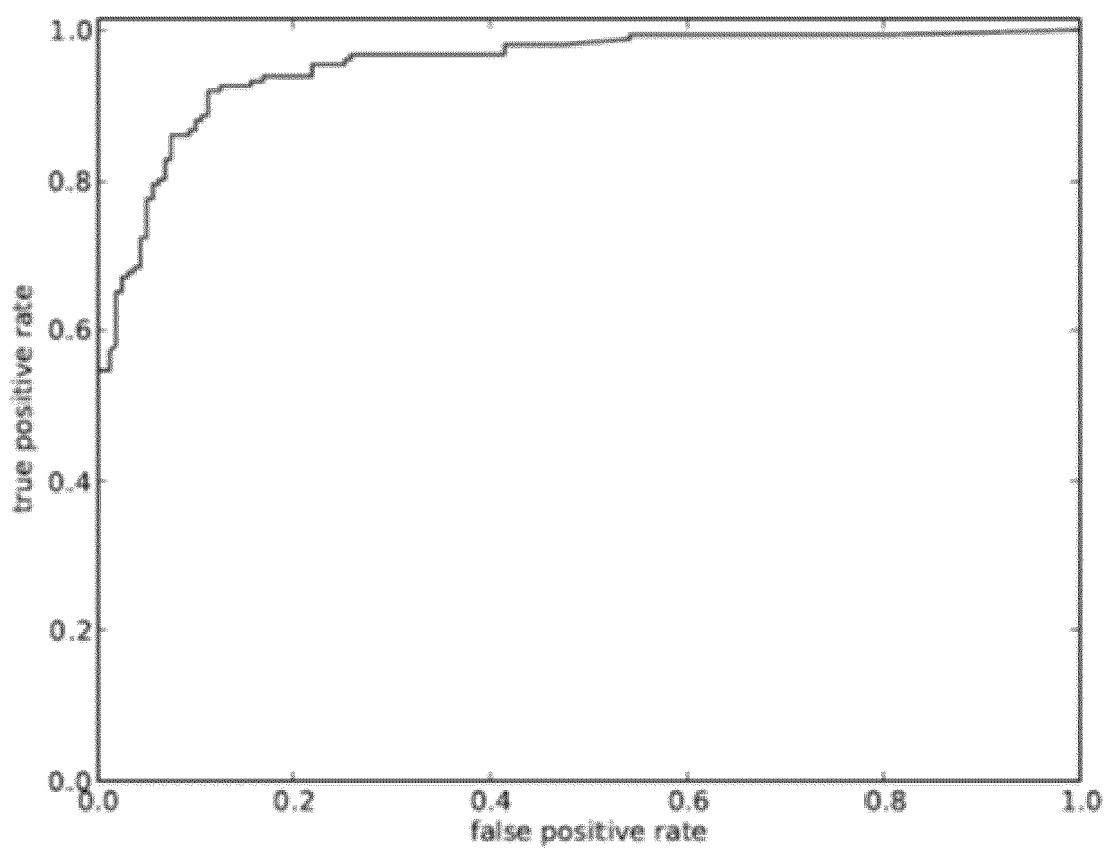
FIG. 22 shows a plot of a ROC curve for a kernel based on a static instruction data source.
Figure 23:
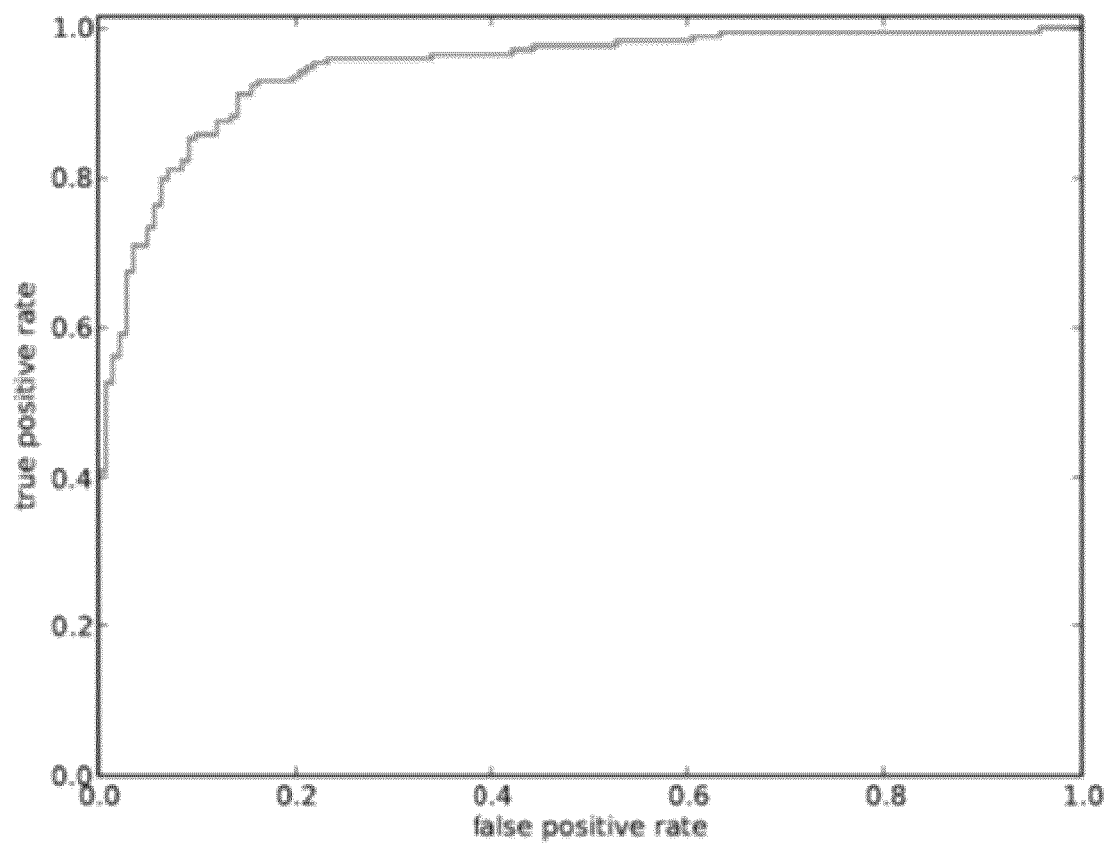
FIG. 23 shows a plot of a ROC curve for a kernel based on a system call data source.

FIG. 17 is a schematic diagram of an exemplary computing system 1700 for classifying programs using multiple data sources. In FIG. 17, the computing system 1700 includes one or more processors 1710 and computer-readable storage media 1720. The computing system 1700 can include one or more program modules such as a data source module 1730, a data source representation module 1740, a kernel module 1750, a classification module 1760, and/or other program modules. As shown in FIG. 17, the computing system 1700 includes a data source module 1730 for generating and/or storing one or more dynamic and/or static data sources for one or more programs. Also, the computing system 1700 includes a data source representation module 1740 for storing and/or generating one or more representations (e.g., adjacency matrices, feature vectors, or other representations) of one or more data sources of one or more programs. The computing system 1700 includes a kernel module 1750 that can use representations of data sources to generate one or more kernels that can be used to train a classifier such as a kernel-based classification algorithm or process (e.g., a support vector machine, a Gaussian process, or the like). Further, the computing system 1700 includes a classification module 1760 that can use one or more kernels to train a classifier such as a kernel-based classification algorithm. The classification module 1760 can also classify one or more programs using one or more classifiers.

Exemplary Alternatives

W. A method, implemented at least in part by one or more computing devices, the method comprising:
generating at least one graph representation of at least one dynamic data source of at least one classified program;
generating at least one graph representation of at least one static data source of the at least one classified program;
at least using the at least one graph representation of the at least one dynamic data source and the at least one graph representation of the at least one static data source, generating at least one kernel; and
at least using the at least one kernel, classifying an unclassified program.

X. The method of W, wherein the generating the at least one kernel comprises a graph kernel, a squared exponential kernel, a graphlet kernel, a random walk kernel, a shortest paths kernel, a spectral kernel, or a combination of one or more kernels.

Y. The method of W, wherein the at least one kernel is a combined kernel, and wherein generating the at least one kernel comprises:
generating a first kernel using the at least one graph representation of at least one dynamic data source;
generating a second kernel using the at least one graph representation of at least one static data source; and
combining at least the first and second kernel.

Z. The method of Y, wherein generating the at least one kernel further comprises generating a third kernel using at least one feature vector representation of at least one file information data source of the at least one classified program.

YY. The method of W, wherein classifying the unclassified program comprises training a kernel-based classification algorithm using the at least one kernel.

VV. A method, implemented at least in part by one or more computing devices, the method comprising:
generating at least one an adjacency matrix that represents a Markov chain graph of at least one dynamic data source of at least one program, wherein the at least one dynamic data source comprises a dynamic instruction trace or a dynamic system call trace;
generating at least one adjacency matrix that represents a Markov chain graph of at least one static data source of the at least one program, wherein the at least one static data source comprises a binary file or a disassembled binary of the at least one program;
generating a control flow graph of the at least one program;
generating a feature vector for a file information data source for the at least one program, wherein the feature vector comprises one or more features that comprise an entropy of a binary file, a size of the binary file, a packed status, a total of a number of instructions in the dynamic instruction trace plus a number of system calls in the dynamic system call trace, a number of edges in the control flow graph, or a number of vertices in the control flow graph of the at least one program; and
at least using the at least one adjacency matrix that represents the Markov chain graph of the at least one dynamic data source, the at least one an adjacency matrix that represents the Markov chain graph of the at least one static data source, the control flow graph, and the feature vector for the file information data source, classifying the at least one program as malware, wherein the classifying comprises evaluating a decision function that comprises one or more support vectors and at least one combined kernel that is generated at least by combining one or more weighted kernels.

Exemplary Results

This section includes a review of exemplary results from experimentation using implementations of malware classification, and the results are in terms of accuracy, AUC, ROC curves, and speed. This section also includes a presentation of several observations found while performing exemplary experiments.

This section includes results on an implementation of an example dataset comprising of 776 programs classified as benign and 780 programs classified as malicious. For each program in the example dataset there was a static binary and disassembled binary file, a control flow graph constructed from the disassembled binary file, collected dynamic instruction and system call traces, and a file information feature vector constructed from information gathered from all of the other data sources. In the implementation, for the binary file, disassembled file, and the two dynamic traces, kernels were built based on the Markov chain graphs; for the control flow graph a graphlet kernel was used, and for the file information feature vector, a standard squared exponential kernel (e.g., such as explained in the above section "Exemplary Malware Classification Using Data Sources") was used.

The results of the exemplary implementation show that incorporating multiple data sources can increase overall classification performance with regard to accuracy, AUC, and ROC curves. Included in this section is a report of kernel combinations (e.g., combinations besides the combination of all six data sources) which can achieve reasonably high performance in some implementations.

Again, included in this section, are results on an implementation of an exemplary dataset composed of 1,556 samples, 780 labeled malicious and 776 labeled benign. The metrics used to quantify the results are classification accuracy, AUC, the ROC curves, and the average time it takes to classify a new instance. Kernels were compared based on the individual data sources, a combined kernel based on the three purely static sources, a combined kernel based on the two purely dynamic sources, and finally a combined kernel based on all six data sources. In these respective implementation examples, the kernel weights were found using multiple kernel learning such as explained in the above section "Exemplary Malware Classification Using Data Sources".

Exemplary Machine/Tools

In the implementation of the experiments, a machine was used with quad Xeon X5570s running at 2.93 GHz and having 24 GB of memory. To perform the multiple kernel learning, the modular python interface of the Shogun Machine Learning Toolbox was used. In other implementations, a machine with an alternate setup can be used.

Exemplary Accuracy Results

Table 6 presents exemplary experimental results for kernel combinations using 10-fold cross validation and the three best performing anti-virus programs (out of 11 considered). For the anti-virus program results, the malicious dataset used was not composed of 0-day malware, but rather malware that was at least 9 months to a year old. In the exemplary implementation, all but one of the false positives found by the anti-virus programs during experimentation were confirmed to be true positive.

In the exemplary implementation results, the best performing method was the combined kernel that used all six data sources and achieved an accuracy of 98.07%. Although using purely static sources performed very well (95.95%) in the exemplary experiment, adding dynamic information significantly improved overall performance. In the results, all of the single data sources were between 84% to 89% with the single data source winner being the disassembled binary at 89.46%. In the exemplary experiment implementation, the disassembled binary was unpacked before it was disassembled. Included in the experimentation results, as shown in Table 6, are the classification accuracy, number of false positives and false negatives, and the full AUC values of 776 instances of benign classified software versus 780 instances of malware classified software. In Table 6 statistically significant winners are bolded.

TABLE 6

| Method | Accuracy (%) | FPs | FNs | AUC |
| --- | --- | --- | --- | --- |
| All Six Data Sources | 98.07% | 16 | 14 | .9978 |
| Three Static Sources | 95.95% | 37 | 26 | .9931 |
| Two Dynamic Sources | 88.75% | 88 | 87 | .9509 |
| Binary | 88.11% | 93 | 92 | .9437 |
| Disassembled Binary | 89.46% | 75 | 89 | .9465 |
| Control Flow Graph (4-graphlets) | 87.72% | 87 | 104 | .9301 |
| Dynamic Instructions | 87.34% | 92 | 105 | .9335 |
| Dynamic System Call | 87.08% | 88 | 113 | .9368 |
| File Information | 84.83% | 126 | 110 | .9111 |
| AV0 | 78.46% | 4 | 331 | n/a |
| AV1 | 75.26% | 7 | 378 | n/a |
| AV2 | 71.79% | 0 | 439 | n/a |

Exemplary ROC Curves/AUC Values

Figure 24:
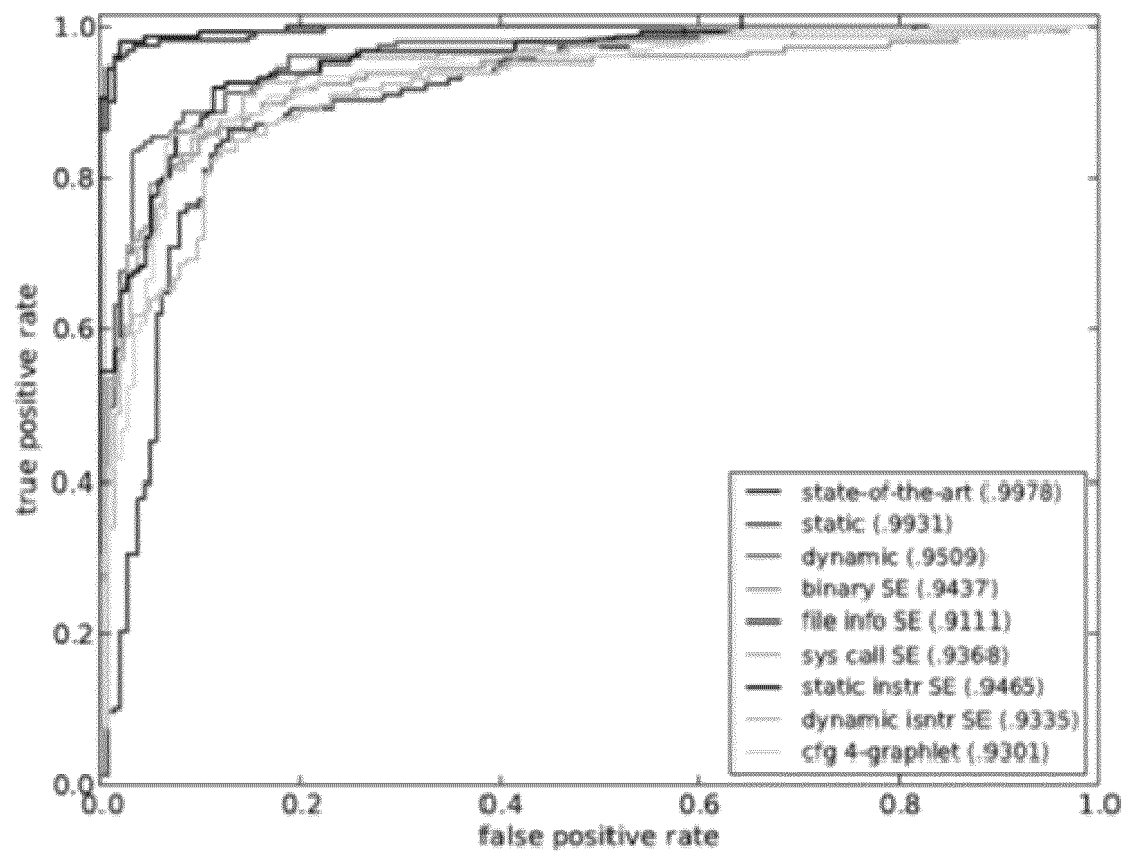
FIG. 24 shows a plot of a ROC curves for various kernels.
Figure 25:
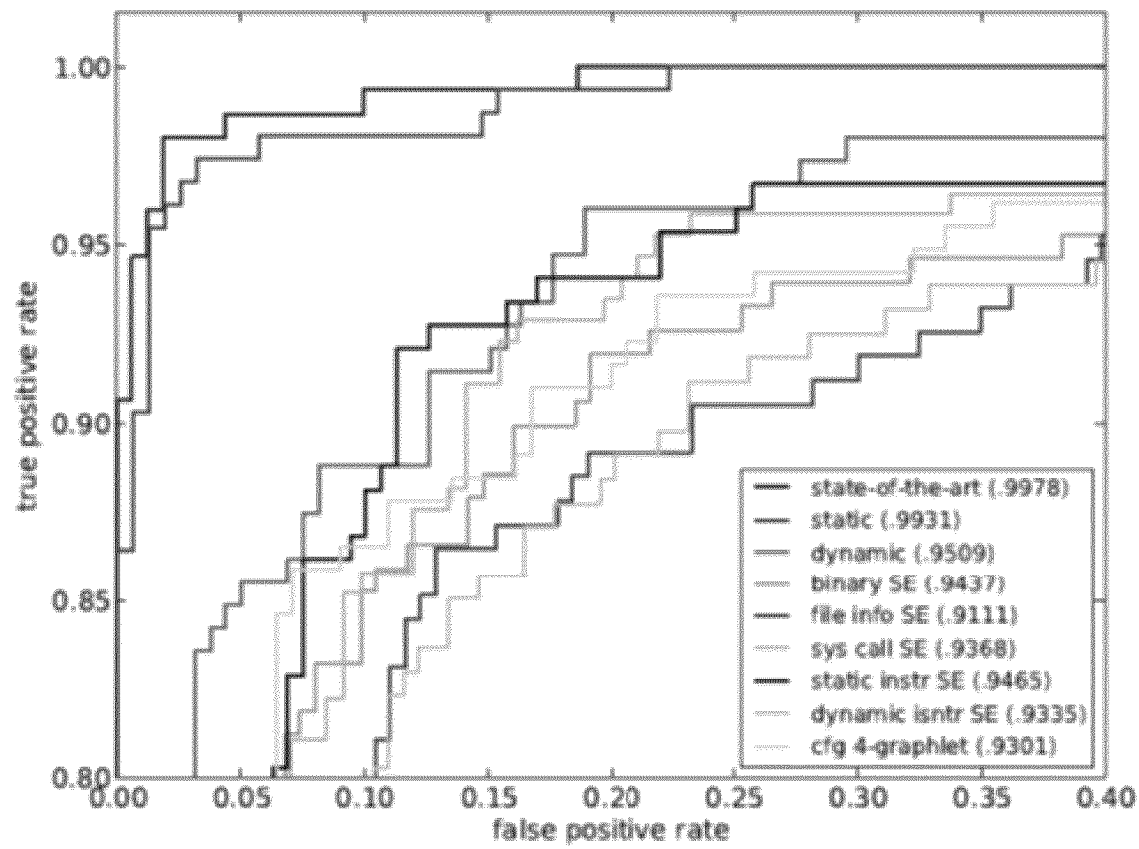
FIG. 25 shows a zoomed view of a curve plot.

For analysis of the experimentation done, to analyze the different data sources with regard to different false positive thresholds, the ROC curves and various AUC values were looked at. FIG. 18-FIG. 23 show respective plots of the ROC curves for each individual data source and FIG. 24 shows a plot of all the ROC curves together (including the combined kernels). FIG. 25 shows a zoomed version of the curve plot. For plots shown in FIG. 18-FIG. 23 the AUCs are as follows: for the plot shown in FIG. 18 0.9437, for the plot shown in FIG. 19 0.9111, for the plot shown in FIG. 20 0.9301, for the plot shown in FIG. 21 0.9335, for the plot shown in FIG. 22 0.9465, and for the plot shown in FIG. 23 0.9368. In the plot shown in FIG. 25 it can be seen that the combined kernel which includes all six data sources performs better than any single data source or the two other combined kernels for all false positive rates. If there are certain time and/or other resource constraints, the plot shown in FIG. 25 also shows the ability to achieve reasonably high results with just using the combined kernel with the three static sources. The plots shown in FIG. 24 and FIG. 25 include ROC curves for each of the six kernels generated from six respective data sources, a kernel based on all of the static data sources, a kernel based on the dynamic data sources, and for the combined kernel.

Table 7 below displays an implementation of the full AUC value, as well as the AUC values for three different false positive thresholds: 0.01, 0.05, and 0.1. In one implementation, it can be seen that using six data sources combined can achieve an AUC value of 0.9467 with a 0.1 false positive threshold.

TABLE 7

| Method | .01 | .05 | .1 | Full AUC |
| --- | --- | --- | --- | --- |
| All Six Data Sources | .9467 | .9867 | .9933 | .9978 |
| Three Static Sources | .9216 | .9608 | .9804 | .9931 |
| Two Dynamic Sources | .5000 | .8487 | .8882 | .9509 |

TABLE 7-continued

| Method | .01 | .05 | .1 | Full AUC |
|---|---|---|---|---|
| Binary | .5369 | .7919 | .8523 | .9437 |
| Disassembled Binary | .5461 | .7237 | .8684 | .9465 |
| CFG (4-graphlets) | .4167 | .6667 | .8654 | .9301 |
| Dynamic Instructions | .3401 | .6395 | .7211 | .9335 |
| Dynamic System Call | .5266 | .7337 | .8580 | .9368 |
| File Information | .0946 | .4527 | .7703 | .9111 |

Exemplary Speed Results

Because, in some implementations, computing the kernel for each dataset, finding the kernel weights for the combined kernels, and finding the support vectors for the support vector machine can be O(1) operations (for a dataset these calculations can be done once, offline), for the timing results of the experimentation, there was a focus on the average amount of time it takes to classify a new instance. Using a particular implementation, during experimentation, the time to find the kernel weights and support vectors for the kernel composed of all six data sources, averaged over 10 runs, was 0.86 seconds.

In some implementations of malware classification, given a new instance to classify, combinations of the following 1-3 can be performed (e.g., depending on whether a dynamic data source is used):

1) Run the instance in a virtual machine keeping a log of the instructions and system calls the program performs.

2) Transform the data source into one of the herein described data representations.

3) Classify the data instance such as according to Equation C.8.

In the timing results for the experimentation, the assumption of a flat 5-minutes to collect the dynamic trace data was made. Also, in the timing results for the experimentation, transforming the data to a representation can be building the Markov chain, building the control flow graph feature set (e.g., number of graphlets found with a specific structure), or collecting statistics in the case of the file information data source. In some implementations, support vector machines can find sparse a vectors, easing the computational burden of Equation C.8.

Figure 26:
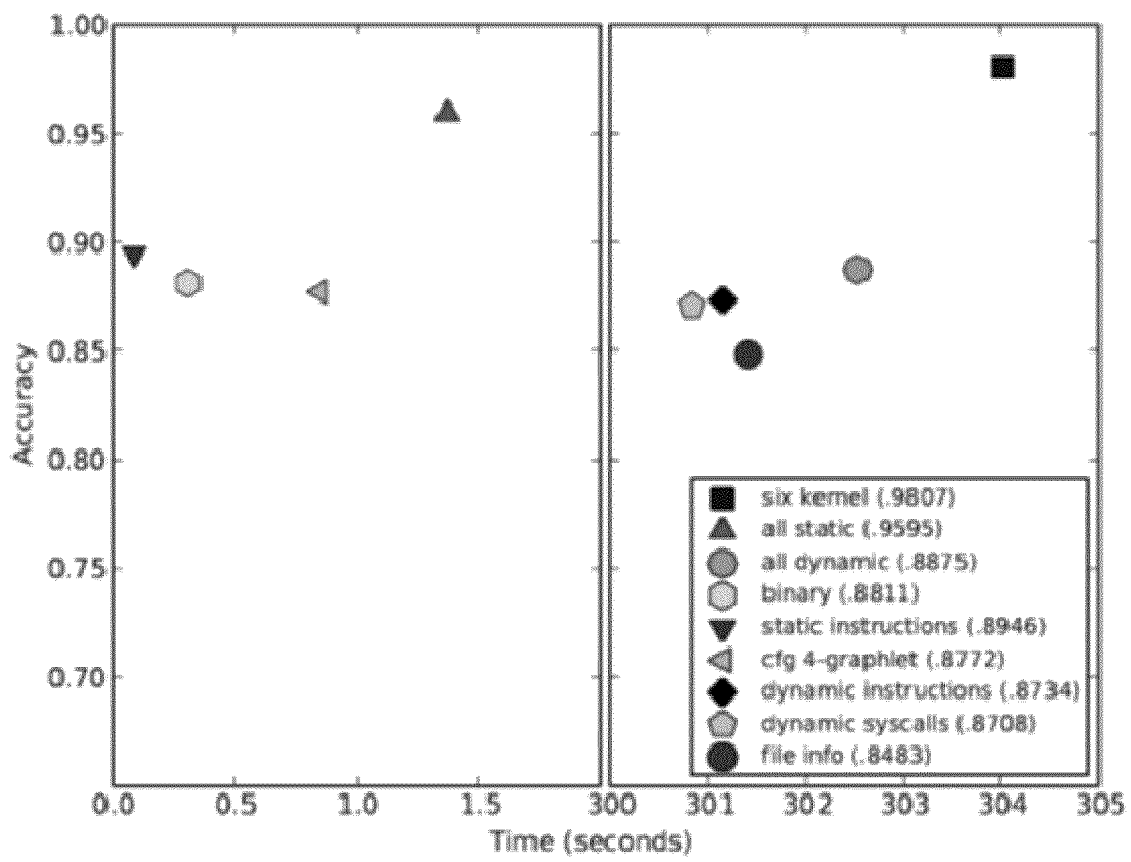
FIG. 26 is a plot of timing results.

The timing results, which are broken down into three stages, are presented in Table 8 and are shown in the plot shown in FIG. 26. The plot shown in FIG. 26 demonstrates the experimental tradeoff between accuracy and time to classify. In the plot shown in FIG. 26, time is shown in seconds and the x-axis shows the time it takes to first transform the data instance into a representation and then classify the instance for a particular implementation. These results were averaged over the entire dataset.

TABLE 8

| Method | Trace | Data Transformation | Classify | Total |
|---|---|---|---|---|
| All Six Data Sources | 300.0 s | 3.12 s | 0.21 s | 303.52 s |
| Three Static Sources | n/a | 1.18 s | 0.13 s | 1.37 s |
| Two Dynamic Sources | 300.0 s | 1.94 s | 0.06 s | 302.53 s |
| Binary | n/a | 0.26 s | 0.05 s | 0.31 s |
| Disassembled Binary | n/a | 0.13 s | 0.05 s | 0.19 s |
| CFG (4-graphlets) | n/a | .78 s | 0.06 s | 0.85 s |
| Dynamic Instructions | 300.0 s | 1.10 s | 0.04 s | 301.15 s |
| Dynamic System Call | 300.0 s | 0.82 s | 0.01 s | 300.83 s |
| File Information | 300.0 s | 1.41 s | 0.01 s | 301.41 s |

Further Observations

Due to newer malware obfuscation techniques, in the experimentation implementation a choice was made to include dynamic data sources with a static analysis approach in some implementations to improve malware classification. To further analyze static data sources, in experimentation implementations, there was a running of the combined kernel with all six data sources, a kernel with all of the static data sources, a kernel with all of the dynamic data sources, and the six separate kernels, one for each of the six different data sources 50 times, keeping track of the files that were consistently misclassified with respect to each kernel.

Table 9 below shows the percentage of files which were packed and that were consistently misclassified over 50 runs with different kernels during experimentation using implementations of malware classification. The average percentage of packed files in the entire dataset are 19.59% and 47.56% for benign and malicious files respectively. Although the dynamic traces of packed files can have an unpacking "footprint", in some implementations, a running time of at least 5 minutes for a dynamic trace, in some implementations, can be enough time for a significant number of the instructions to represent the true behavior of the program. In some implementations of malware classification, a dynamic trace can be run for less than or longer than 5 minutes to generate a data source.

TABLE 9

| Method | Benign | Malicious |
|---|---|---|
| All Six Data Sources | 0.00% | 70.00% |
| Three Static Sources | 20.00% | 36.84% |
| Two Dynamic Sources | 18.75% | 45.95% |
| Binary | 43.75% | 43.14% |
| Disassembled Binary | 10.20% | 53.85% |
| CFG (4-graphlets) | 13.89% | 55.10% |
| Dynamic Instructions | 20.00% | 38.24% |
| Dynamic System Call | 21.62% | 32.56% |
| File Information | 28.09% | 34.31% |

Table 10 shows the average entropy of files which were consistently misclassified in an experimentation implementation.

TABLE 10

| Method | Benign | Malicious |
|---|---|---|
| All Six Data Sources | 7.43 | 6.77 |
| Three Static Sources | 7.41 | 6.91 |
| Two Dynamic Sources | 6.26 | 7.50 |
| Binary | 7.42 | 7.01 |
| Disassembled Binary | 6.15 | 7.58 |
| CFG (4-graphlets) | 6.12 | 7.66 |
| Dynamic Instructions | 6.29 | 7.57 |
| Dynamic System Call | 6.41 | 7.55 |
| File Information | 7.77 | 5.98 |

In some implementations of data collection, a dynamic tracing tool that is able to evade detection from the program being traced can be used to get an accurate picture of how the program actually behaves in the wild. In some implementations, malware are able to detect if they are being run in a sandboxed environment and being traced. In some implementations of malware classification, the Intel Pin program can be used to collect data for data sources because, in some implementations, it can allow for the collection of both instructions and system calls simultaneously. In some implementations of malware classification an Ether framework can be used to collect data for data sources. Table 11 shows kernel values between two implementations of Markov chains from dynamic instruction traces of the same program, with one trace being run with an Intel Pin implementation, and one trace being run with an Ether implementation. The kernel values in the implementations reported in Table 11 were computed as shown in Equation C.2.

TABLE 11

| Malware Sample | Kernel Value |
|---|---|
| sample0 | .7719 |
| sample1 | .6424 |
| sample2 | .5864 |
| sample3 | .8392 |
| sample4 | .5399 |
| sample5 | .3725 |
| sample6 | .8171 |
| sample7 | .9010 |

Exemplary Alternatives

In one implementation of malware classification using multiple data sources, (e.g., multiple data source malware classification (MDSMC)), learning with dynamic trace data can be incorporated in malware classification, which can be used for classifying classes of malware which are packed or obfuscated in other ways. Also, in some implementations of malware classification using multiple data sources, a final combined kernel found can be used in a kernel-based clustering algorithm to look at the phylogenetics of the malware. In some implementations of malware classification using multiple data sources, the class of malware to be embedded is not restricted.

Exemplary Alternative Implementations

Because many new viruses are derived from, or are composites of, established viruses, understanding the phylogenetic structure of viruses could allow for more immediate responses and could allow researchers to understand new viruses much more quickly. In some implementations, given a kernel matrix as described herein, spectral clustering can be used to partition a dataset into groups with similar structure with regard to the data sources chosen. For spectral clustering, in one implementation, a weighted graph Laplacian, a |V|×|V| matrix can be constructed as shown in Equation C.13:

$$\mathcal{L} = \begin{cases} 1 - \frac{e_{vu}}{d_v} & \text{if } u = v, \text{ and } d_v \neq 0, \\ -\frac{e_{uv}}{\sqrt{d_u d_v}} & \text{if } u \text{ and } v \text{ are adjacent}, \\ 0 & \text{otherwise.} \end{cases} \quad \text{(C.13)}$$

In the above Equation C.13, $e_{vv}$ can be the edge weight, in which can be the entry in a kernel matrix, and $d_v$ can be the degree of the vertex, which can be the sum of the corresponding row in the kernel matrix. In one implementation, an eigendecomposition can be performed on the Laplacian and the k-smallest eigenvectors can be taken and a k-means clustering can be used with the eigenvectors as the features.

In some implementations, malware classification using multiple data sources can incorporate different data representations for each data source if a suitable kernel can be generated using the data representation. For example, an n-gram analysis can be done on the dynamic trace or static data where several values for n are used and the herein described multiple kernel learning optimization can weight the choices.

In some implementations of malware classification using multiple data sources, a Gaussian kernel (e.g., as shown in Equation C.2) can be used for the data sources. In other implementations of malware classification using multiple data sources more advanced kernels can be used that have the ability to measure different aspects of similarity of the different data sources. These kernels can include kernels based on random walks over the Markov chains, the eigen-structure of the graph Laplacians, the number of shortest paths in the graphs, and other kernels. In some implementations, a multiple kernel learning optimization problem can weight the kernels.

In some implementations, malware classification using multiple data sources can be a solution that is not cloud based or can be used as a solution that is cloud-based as machines can collect dynamic trace data.

In some implementations of malware classification, instruction and/or system call categorizations can be used to reduce the size of the vertex set of the resulting Markov chains to avoid the curse of dimensionality. In some implementations, different categorizations could prove to be better suited for different tasks. In some implementations, clustering could be easier with a categorization that creates its categories based on different instructions that are more likely to be used by different compilers. Or similarly, categories based on different instruction sets, such as SSE, MMX, AVX, or FMA, could be useful.

Exemplary Portion of a Control Flow Graph

Figure 27:
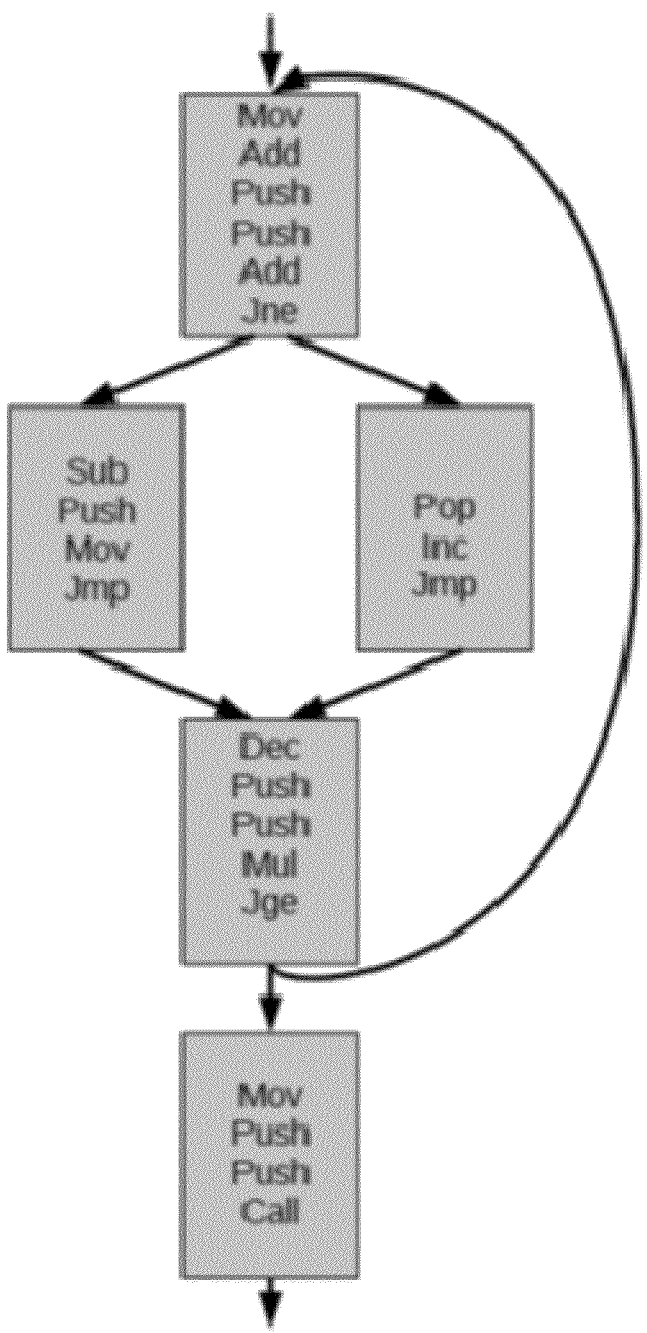
FIG. 27 shows a portion of an exemplary control flow graph demonstrating jumps.

FIG. 27 shows a portion of an exemplary control flow graph demonstrating jumps.

Exemplary Implementation of a Partial Instruction Trace Graph

Figure 28:
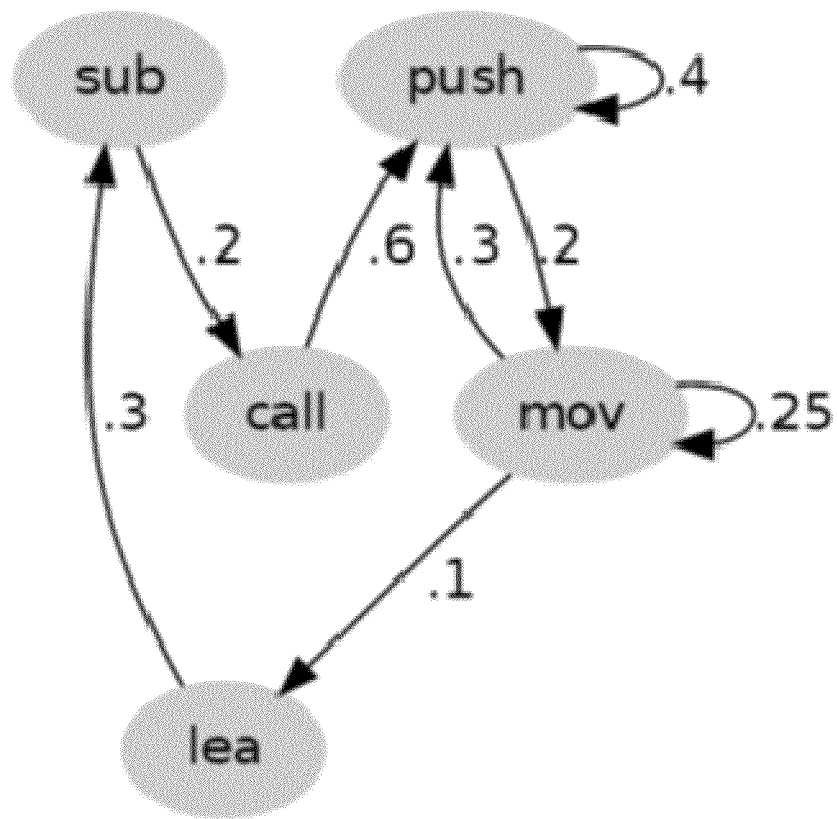
FIG. 28 shows a partial instruction trace graph.
Figure 29:
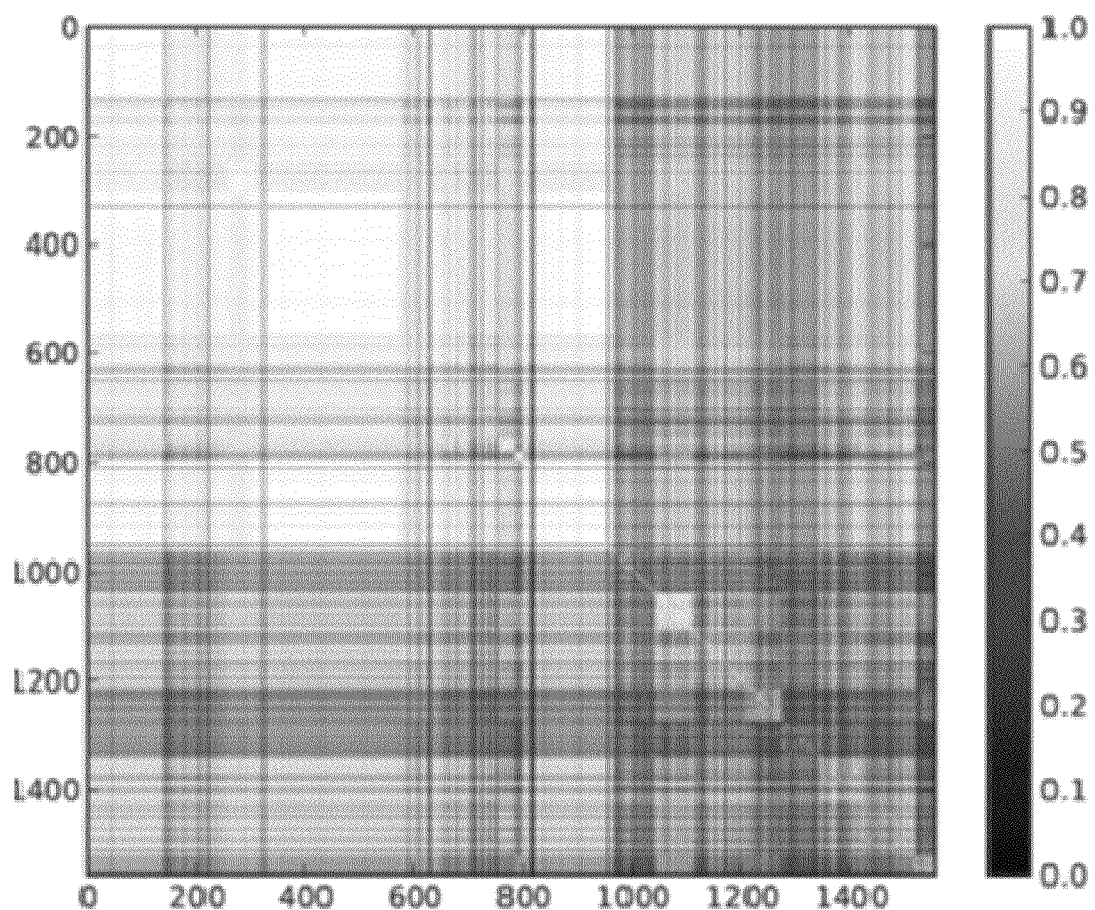
FIG. 29 shows a grayscale representation of a heat map for an implementation for a kernel based on a binary data source.
Figure 30:
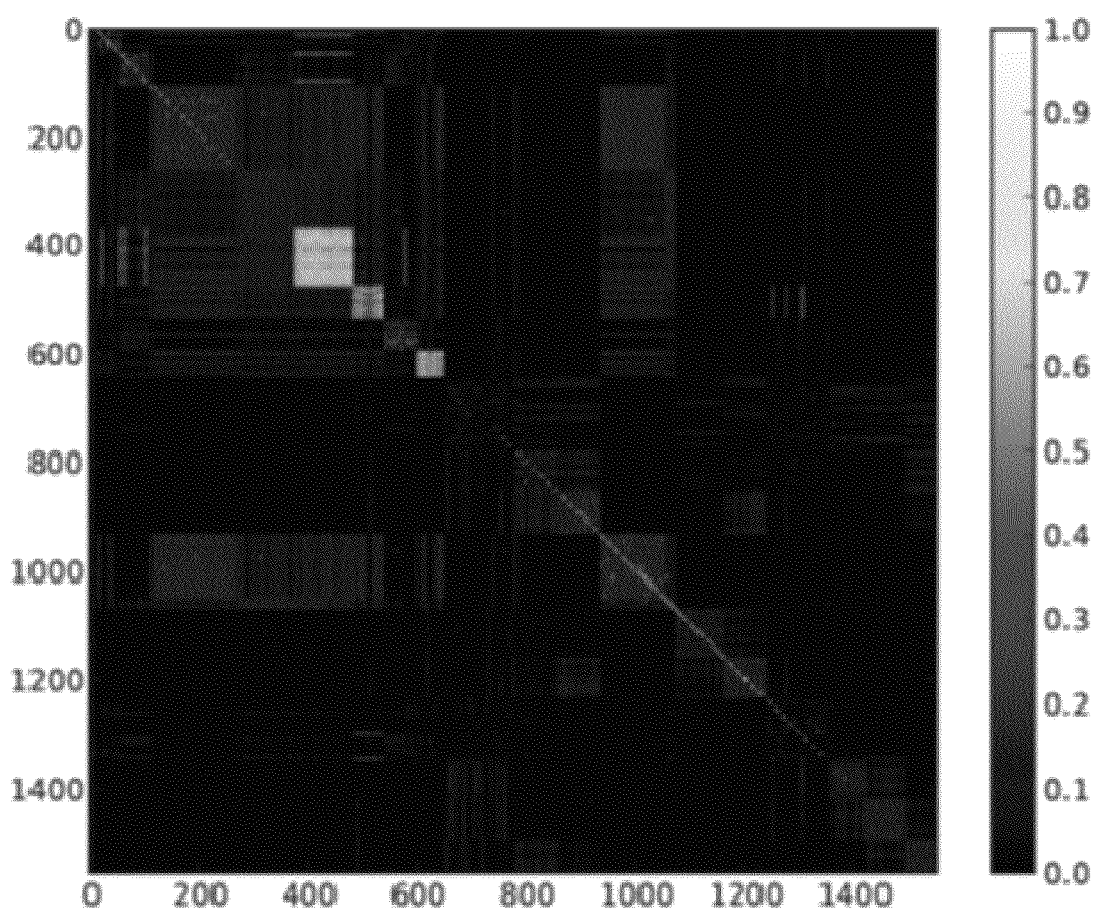
FIG. 30 shows a grayscale representation of a heat map for an implementation for a kernel based on a file information data source.
Figure 31:
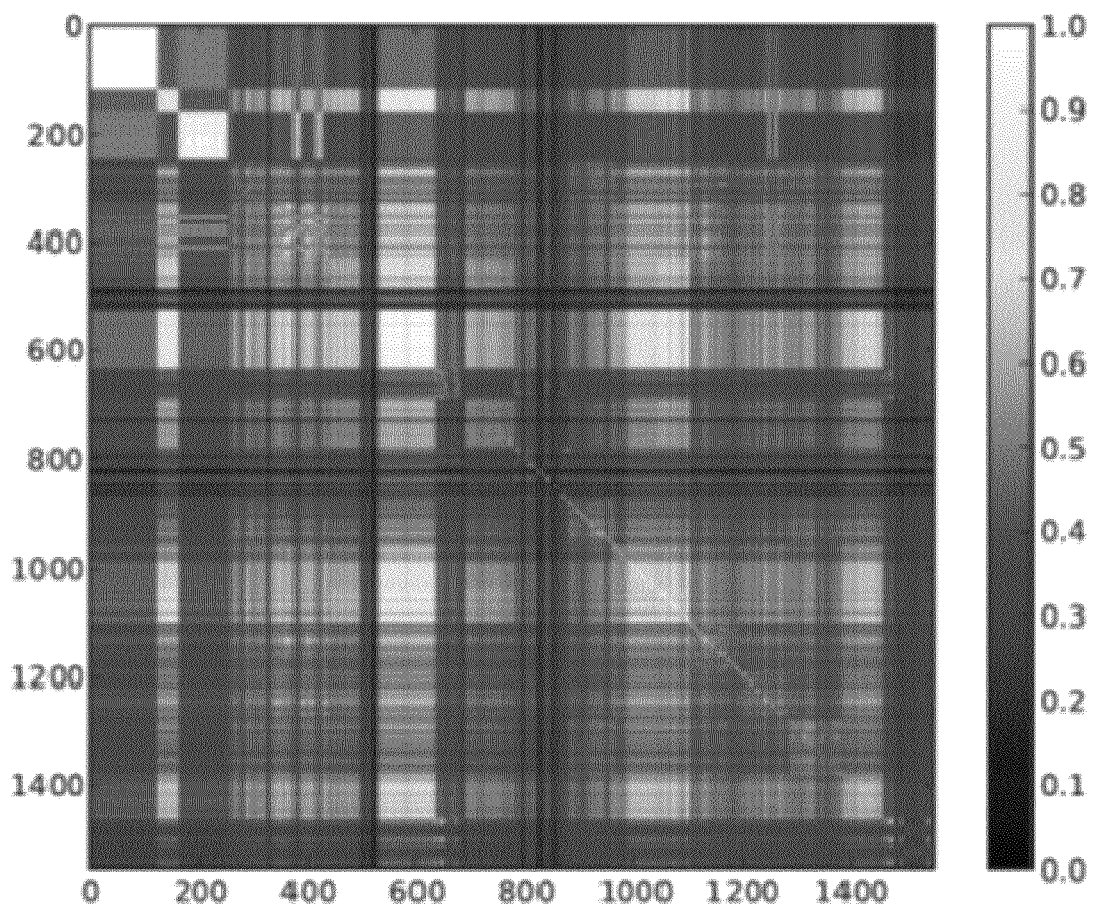
FIG. 31 shows a grayscale representation of a heat map for an implementation for a kernel based on a control flow graph data source.
Figure 32:
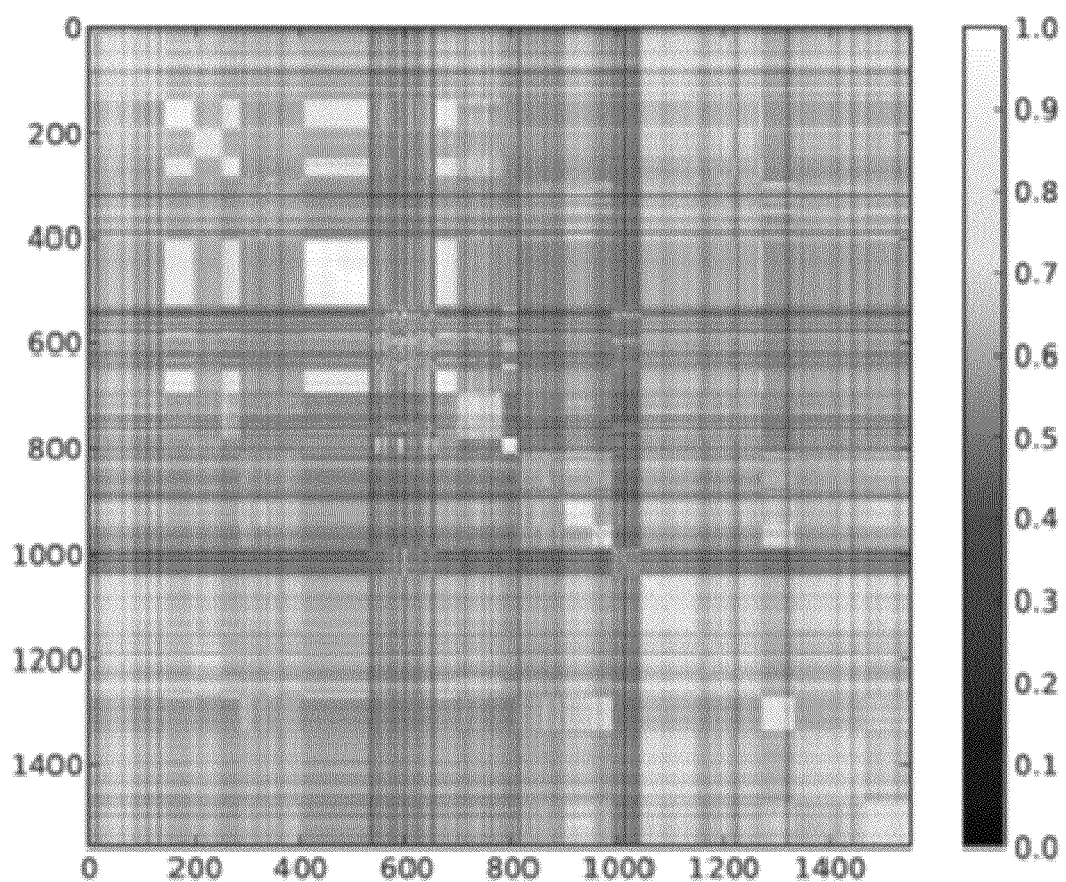
FIG. 32 shows a grayscale representation of a heat map for an implementation for a kernel based on a dynamic instruction data source.
Figure 33:
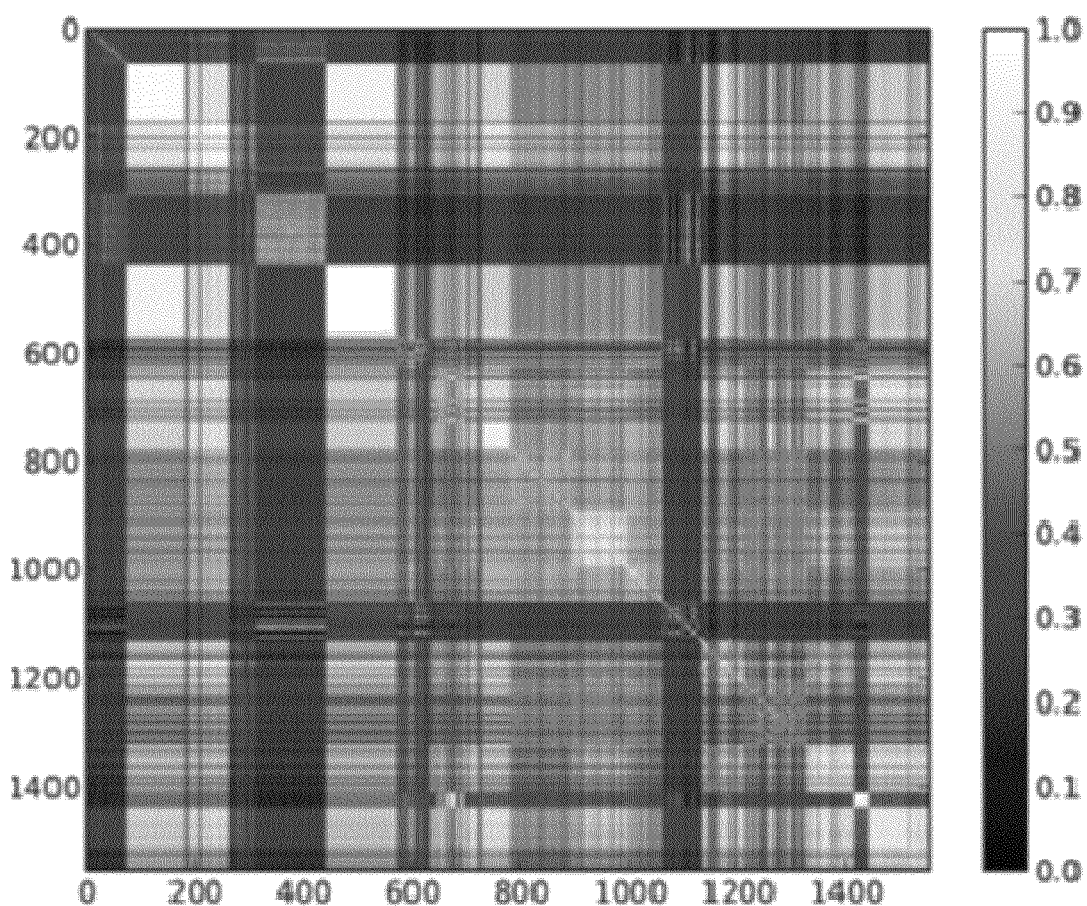
FIG. 33 shows a grayscale representation of a heat map for an implementation for a kernel based on a static instruction data source.
Figure 34:
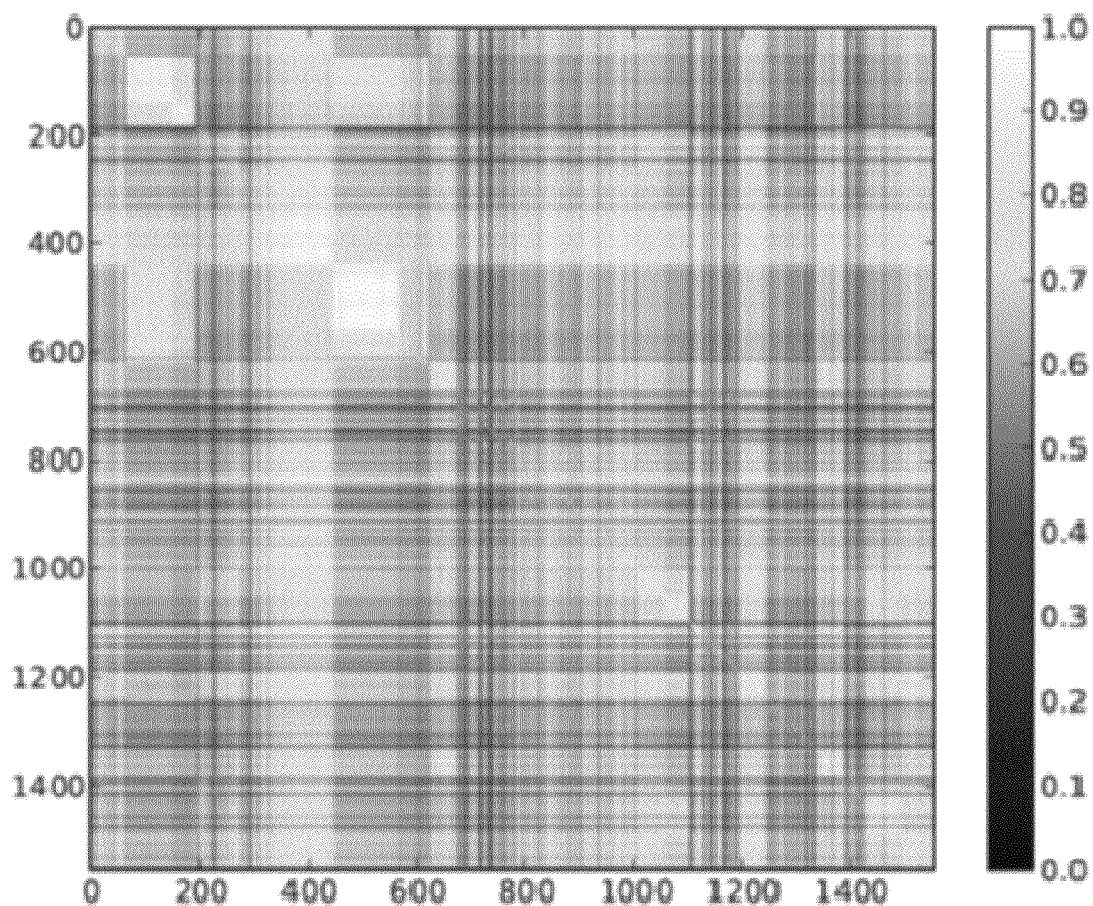
FIG. 34 shows a grayscale representation of a heat map for an implementation for a kernel based on a system call data source.

Table 12 shows a portion of instruction trace data used to generate the following fragment of a hypothetical instruction trace graph. Table 12 shows an example implementation of collected trace data. A hypothetical resulting graph representing a fragment of the Markov chain is shown in FIG. 28. In some implementations, of a Markov chain graph, all of the out-going edges can sum to 1. FIG. 28 shows a partial instruction trace graph.

TABLE 12

| call | [ebp + 0x8] |
|---|---|
| push | 0x70 |
| push | 0x010012F8 |
| call | 0x01006170 |
| push | 0x010061C0 |
| mov | eax, fs: [0x00000000] |
| push | eax |
| mov | fs: [ ], esp |
| mov | eax, [esp + 0x10] |
| mov | [esp + 0x10], ebp |
| lea | ebp, [esp + 0x10] |
| sub | esp, eax |
| . . . | . . . |

Exemplary Kernel Heat Maps

Respective of FIG. 29, FIG. 30, FIG. 31, FIG. 32, FIG. 33, and FIG. 34 show a respective heat map for a respective kernel of six individual kernels. For the heat maps shown in FIG. 29-FIG. 34, the first 780 samples (the top left block in the heatmaps) are malware categorized samples and the second 776 samples (the bottom right block) are benign categorized samples. The off diagonal blocks of the respective heat maps shown in FIG. 29-FIG. 34 show the similarities between the malware and benign categorized samples.

Figure 35:
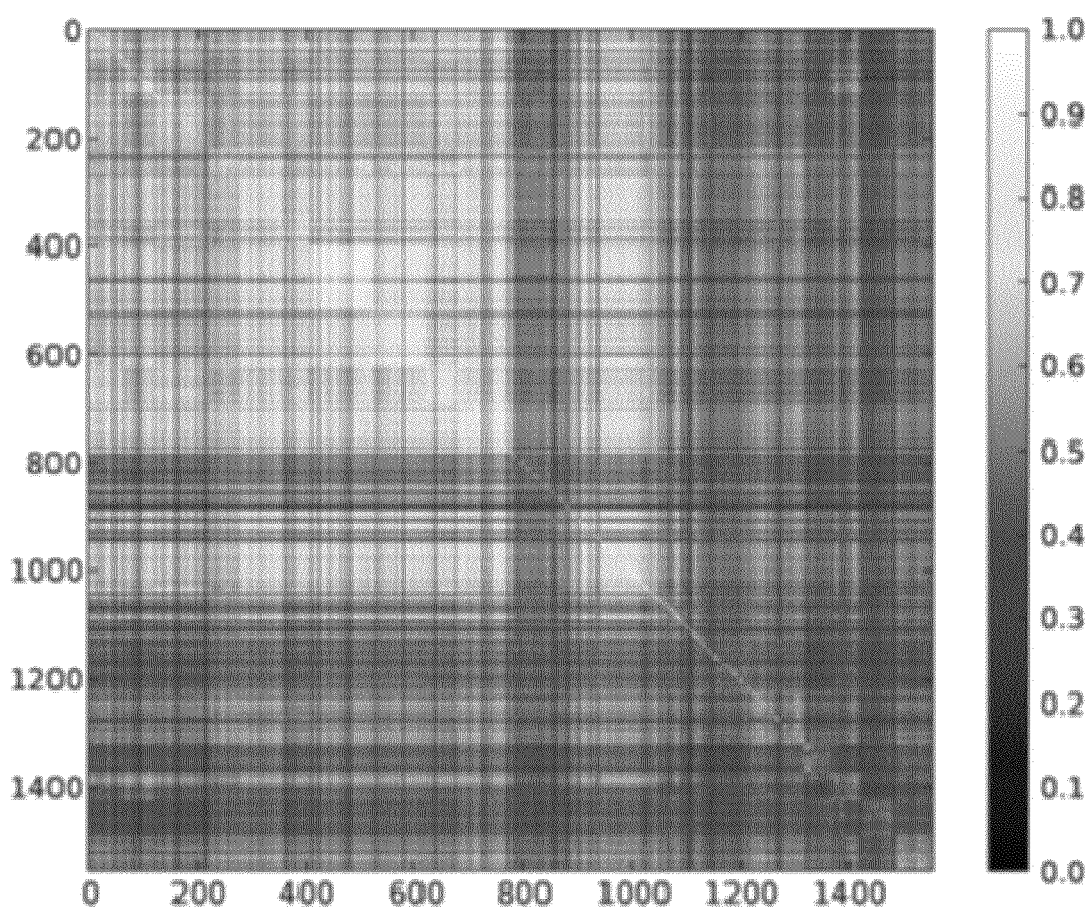
FIG. 35 shows a heat map for an implementation using six kernels combined with the weights found using multiple kernel learning.

FIG. 35 shows the heat map of a combined kernel with the weights for the individual kernels being found using multiple kernel learning (e.g., using Equation C.10). The block structure observed in these heatmaps shows that the kernels and data sources selected can discriminate between malware and benign samples. In the heat map shown in FIG. 35 it can be seen that the top left block (showing the similarity between the malware samples) has very high values compared with the rest of the image.

FIG. 35 shows a heat map for an implementation using six kernels combined with the weights found using multiple kernel learning.

Exemplary Computing Environment

Figure 36:
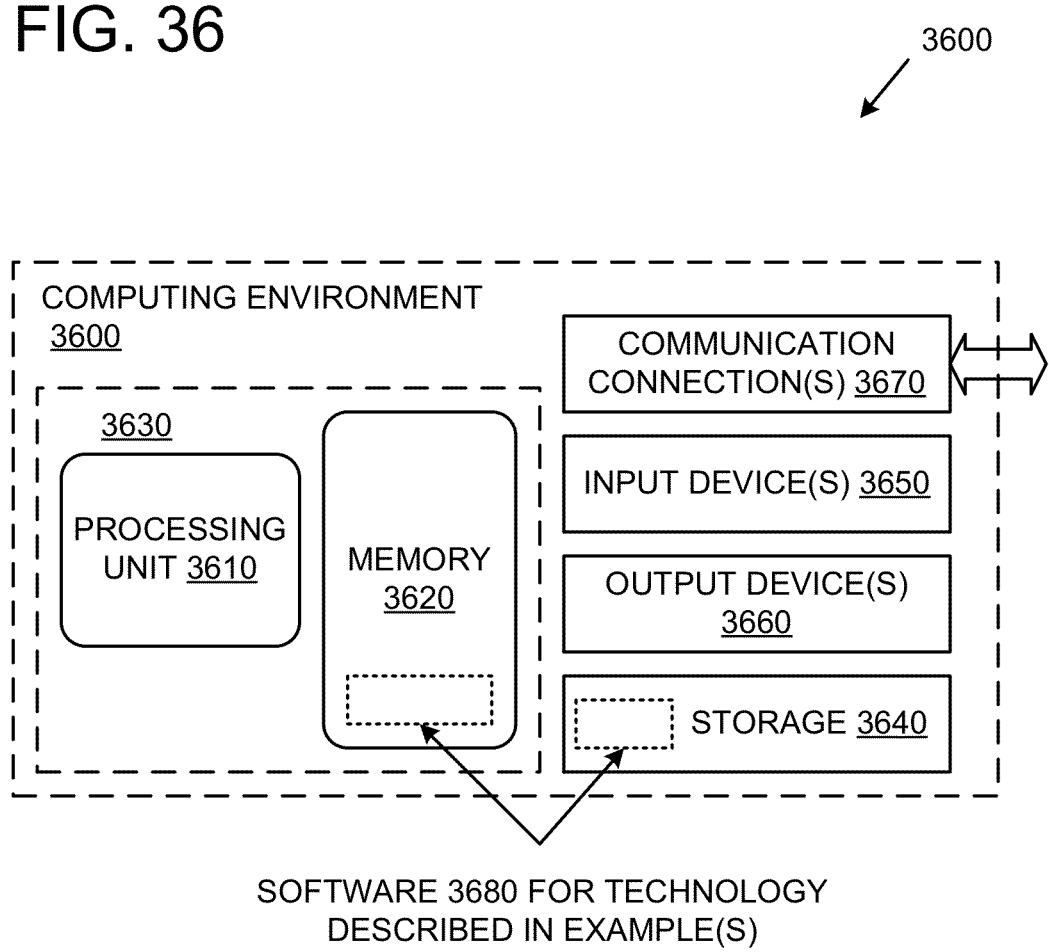
FIG. 36 is a schematic diagram illustrating a generalized example of a suitable computing environment for at least some of the disclosed embodiments.

FIG. 36 illustrates a generalized example of a suitable computing environment 3600 in which herein described embodiments, techniques, solutions, and technologies may be implemented. The computing environment 3600 is not intended to suggest any limitation as to scope of use or functionality of the technology, as the technology may be implemented in diverse general-purpose or special-purpose computing environments or computing systems. For example, the disclosed technologies may be implemented using one or more computing devices or one or more computing systems comprising a processing unit, memory, and storage storing computer-executable instructions implementing the technologies described herein. For example, computing devices can include server computers, desktop computers, laptop computers, notebook computers, netbooks, tablet computers, mobile devices, PDA devices and/or other types of computing devices (e.g., devices such as televisions, media players, or other types of entertainment devices that comprise computing capabilities such as audio/video streaming capabilities and/or network access capabilities). The disclosed technology may also be implemented with other computer system configurations, including hand held devices, multiprocessor systems, microprocessor-based or programmable consumer electronics, network PCs, minicomputers, mainframe computers, a collection of client/server systems, or the like. The disclosed technology may also be practiced in distributed computing environments where tasks are performed by remote processing devices that are linked through a communications network (e.g., a local network, non-local network, and/or the Internet). In a distributed computing environment, program modules, such as one or modules that can implement one or more of the technologies described herein, may be located in both local and/or remote memory storage devices. Additionally, the techniques, technologies, and solutions described herein can be performed in a cloud computing environment (e.g., comprising virtual machines and underlying infrastructure resources).

With reference to FIG. 36, the computing environment 3600 includes at least one central processing unit 3610 and memory 3620. In FIG. 36, this basic configuration 3630 is included within a dashed line. The central processing unit 3610 executes computer-executable instructions. In a multi-processing system, multiple processing units execute computer-executable instructions to increase processing power and as such, multiple processors can be running simultaneously. The memory 3620 may be volatile memory (e.g., registers, cache, RAM), non-volatile memory (e.g., ROM, EEPROM, flash memory, etc.), or some combination of the two. The memory 3620 stores software 3680 that can, for example, implement one or more of the technologies described herein such as for classification of malware. A computing environment may have additional features. For example, the computing environment 3600 includes storage 3640, one or more input devices 3650, one or more output devices 3660, and one or more communication connections 3670. An interconnection mechanism (not shown) such as a bus, a controller, or a network, interconnects the components of the computing environment 3600. Typically, operating system software (not shown) provides an operating environment for other software executing in the computing environment 3600, and coordinates activities of the components of the computing environment 3600.

The storage 3640 may be removable or non-removable, and includes magnetic disks, magnetic tapes or cassettes, CD-ROMs, CD-RWs, DVDs, or any other tangible storage medium which can be used to store information in a non-transitory way and which can be accessed within the computing environment 3600. The storage 3640 stores computer-executable instructions for the software 3680, which can implement technologies described herein.

The input device(s) 3650 may be a touch input device, such as a smartphone or tablet screen, a keyboard, keypad, mouse, touch screen, controller, pen, or trackball, a voice input device, a scanning device, or another device, that provides input to the computing environment 3600. For audio, the input device(s) 3650 may be a sound card or similar device that accepts audio input in analog or digital form, or a CD-ROM reader that provides audio samples to the computing environment 3600. The output device(s) 3660 may be a display, printer, speaker, CD-writer, DVD-writer, or another device that provides output from the computing environment 3600.

The communication connection(s) 3670 enable communication over a communication medium (e.g., a connecting network) to another computing entity. The communication medium conveys information such as computer-executable instructions, compressed graphics information, compressed or uncompressed video information, or other data in a modulated data signal.

Alternatives and Variations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented using computer-executable instructions stored on one or more computer-readable media (e.g., non-transitory computer-readable media or tangible computer-readable storage media, such as one or more optical media discs, volatile memory components (such as DRAM or SRAM), or nonvolatile memory components (such as hard drives)) and executed on a computing device (e.g., any commercially available computer, including smart phones or other mobile devices that include computing hardware). By way of example, computer-readable media include memory 3620 and/or storage 3640. As should be readily understood, the term computer-readable media does not include communication connections (e.g., 3670) such as modulated data signals.

Any of the computer-executable instructions for implementing the disclosed techniques as well as any data created and used during implementation of the disclosed embodiments can be stored on one or more computer-readable media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to a particular type of hardware. Certain details of suitable computers and hardware are well known and need not be set forth in detail in this disclosure.

Furthermore, any of the software-based embodiments (comprising, for example, computer-executable instructions for causing a computing device to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Exemplary System for Classifying a Program Using a Stochastic Classifier

Figure 37:
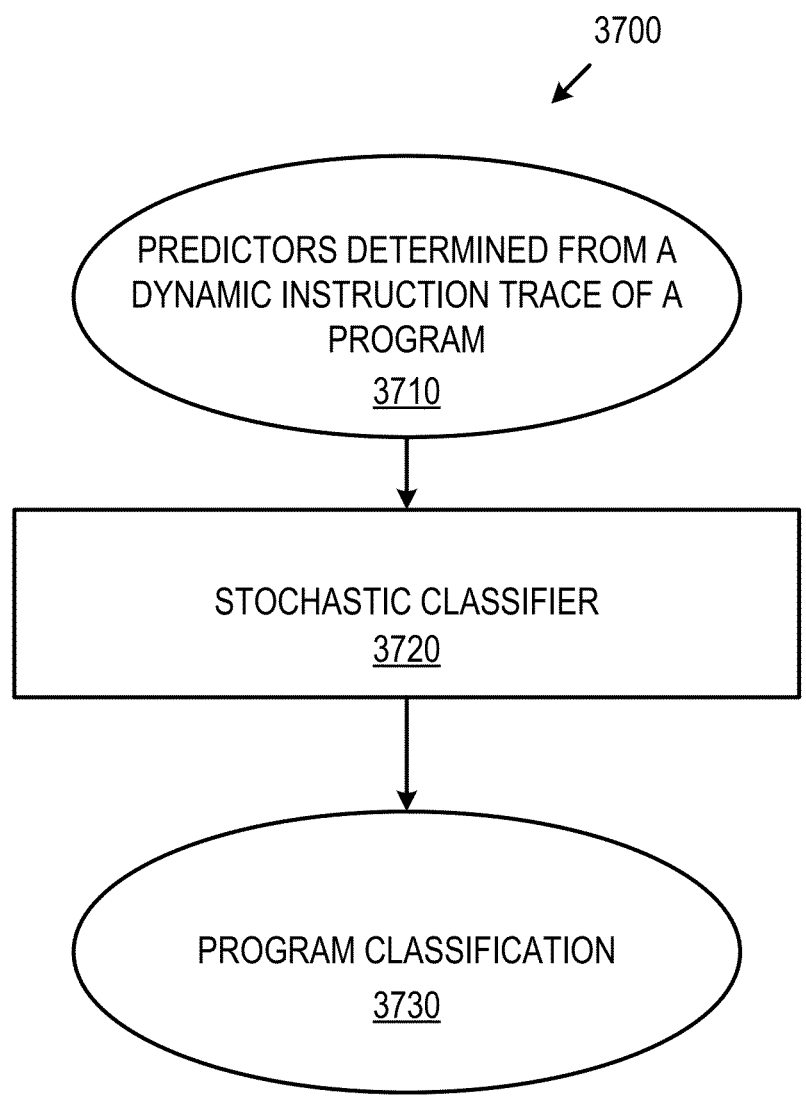
FIG. 37 is a diagram that illustrates an exemplary system for classifying a program using a statistical classifier.

FIG. 37 is a diagram that illustrates an exemplary system 3700 for classifying a program using a stochastic classifier (e.g., stochastic classification). The exemplary system 3700 of FIG. 37 includes one or more predictors 3710 that can be determined from one or more dynamic traces of one or more programs.

The one or more predictors 3710 can be used in a stochastic classifier 3720. For example, the one or more predictors can be used to fit and/or estimate a statistical model for classification used in the statistical classifier 3720. Also for example, the one or more predictors can be used to classify the program used to generate the one or more predictors.

The exemplary system 3700 can produce a program classification 3730. For example, an evaluated statistical model for classification can generate an evaluation result that can be used to determine the program classification 3730. For example, using the stochastic classifier a program can be classified as malware (e.g., a malicious program) or a benign program (e.g., non-malware).

Malware is a term that can be used to describe a variety of forms of hostile, malicious, intrusive, or annoying software or program code. Some malware can be created through simple modifications to existing malicious programs or by adding some code obfuscation techniques such as a packer. In some implementations, a packer can compress a program in a similar fashion that a compressor (e.g., Pkzip or the like) can, then the packer attaches its own decryption/loading stub which 'unpacks' the program before resuming execution normally at the program's original entry point (OEP).

Traditionally, some techniques have been used to implement antivirus scanners such as static signature scanning techniques. In some implementations, a static signature scanning technique can use a sequence of known bytes in a static data source for a program. Even though a new malware can be similar to known malware, a new malware may not be detected by signature-based antivirus programs, until the malware signature eventually works its way into a database.

Some tests (e.g., Antivirus Comparative's retrospective tests or the like) can demonstrate the effectiveness of an anti-virus software's accuracy of finding previously unknown threats. For example, an anti-virus software can be updated on a predetermined date T1. At a future date T2 (e.g., a month later or other date) the anti-virus software can be used to scan threats that have appeared after T1. Such a test can remove the ability to develop static signatures, and can provide a test of the heuristic defenses of an anti-virus software.

In one exemplary study, the highest detection rate among 12 implementations of antivirus programs considered in the study was 67%, although this exemplary antivirus software also had what was described as a large number (e.g., 25) of false alarms. However, the false detection rate for this exemplary antivirus software in the study was unknown as the number of benign programs used in the exemplary study was not reported.

Because signature based approaches to classifying malware can be susceptible to new malware, some techniques for classification of malware can revolve around n-gram analysis. In some implementations of n-gram models used for classification, two parameters can generally be associated with the n-gram models which are n, the length of the subsequences being analyzed, and L, the number of n-grams to analyze. When using implementations of n-gram models for classification, for larger values of n and L, one can run into the curse of dimensionality, where the feature space becomes too large and there is not have enough data collected to sufficiently condition the model. In some implementations, with smaller values of n and L, the feature space is too small and discriminatory power can be lost.

Figure 38:
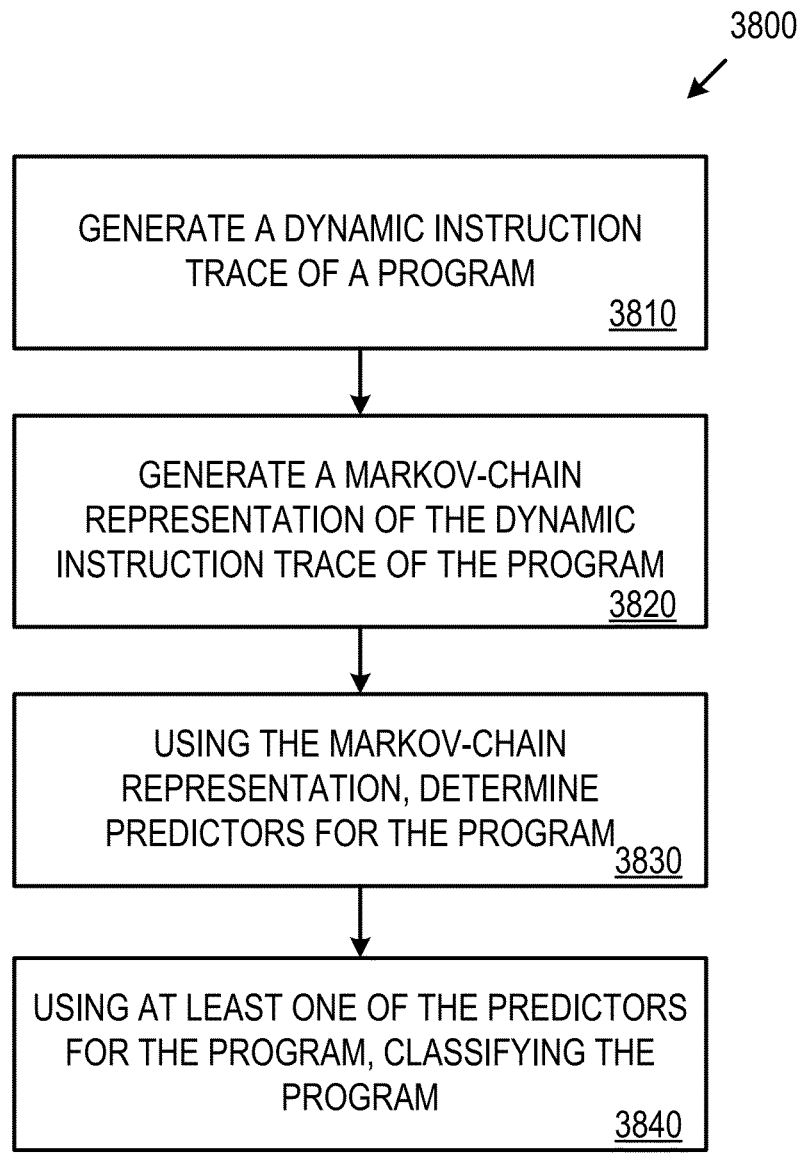
FIG. 38 is a flowchart of an exemplary method of classifying a program using a Markov-chain representation of a dynamic instruction trace.

Exemplary Method for Stochastic Classification of a Program Using a Markov-Chain Representation of a Dynamic Instruction Trace FIG. 38 is a flowchart of an exemplary method 3800 for stochastic classification of a program using a Markov-chain representation of a dynamic instruction trace. In FIG. 38, at least one dynamic instruction trace of at least one program is generated at 3810. In some implementations, such an instruction trace can be received after generation (e.g., by another tool, or otherwise). In some implementations, a dynamic instruction trace can be a record of the sequence of instructions executed by the program during an actual running of the program. Dynamic instruction traces can provide more information about the functionality of a program than a static binary, since the instructions can appear in the dynamic instruction trace in an order in which they are executed during operation of the program. In some implementations, as malware can have self-protection mechanisms designed to guard against being watched by a dynamic trace collection tool, to generate a dynamic instruction trace a program can be run in a safe environment such that the program can run as it would under normal circumstances.

At 3820, using the at least one Markov-chain representation of the at least one dynamic instruction trace of the at least one program is generated. For example, a dynamic instruction trace can be represented using a Markov-chain structure in which a transition matrix, P, has respective rows modeled as Dirichlet vectors.

At 3830, at least using the Markov-chain representation, one or more predictors for the at least one program are determined. For example, one or more estimated probabilities in a transition matrix determined as a Markov-chain representation of a dynamic instruction trace of a program can be predictors for the program.

At 3840, at least using some of the one or more predictors for the at least one program, the at least one program is classified. For example, a statistical model can be evaluated using the predictors of a program to be classified (e.g., an input program) to evaluate the statistical model to produce an evaluation result. In some implementations, the evaluation result is compared to a classification threshold to determine a classification. For example, if the evaluation result for the program is determined to be greater than a classification threshold then the program can be classified as malware. In some implementations, if the evaluation result for a program is determined to be less than a classification threshold then the program can be classified as non-malware.

In some implementations, stochastic classification can classify malware with high accuracy for a fixed false discovery rate (e.g., 0.001 or the like). For example, a logistic regression framework using penalized splines can be used as a statistical model for the classification of malware. In some implementations of stochastic classification, an estimation of a large number of parameters for a statistical model for classification can be performed with a Relaxed Adaptive Elastic Net procedure, which can include a combination of ideas from one or more of a Relaxed LASSO estimation, an Adaptive LASSO estimation, and an Elastic Net estimation.

In some implementations, when a program is identified or classified as malware or is a possible malware, clustering of the program instance can be done with other known malware samples, which can stream-line a reverse engineering process. Reverse engineering of a malicious program can be the process of determining the program's functionality to better understand the nature and source of the malicious intrusion. In some implementations, clustering of malware programs can be accomplished using a probability change measure, where a distance is based in part on how much change occurs in a probabilistic surface when moving from one malicious program to another in covariate space.

Exemplary Dynamic Trace Data

In any of the examples herein, dynamic instruction trace data can be used in stochastic classification and/or clustering of malware. A dynamic instruction trace can include a listing of processor instructions called during an execution of the program in the sequence that the processor instructions are called during the execution of a program. This is in contrast to a disassembled binary static trace which can include a list of instructions of a program listed in the order the instructions appear in a static binary file of the program. A dynamic instruction trace can be a different measure of a program's behavior than static traces, since code packers can obfuscate functionality from the analysis of static traces. In some implementations, instructions included in a dynamic instruction trace can be listed in the order that they were actually executed, as opposed to the order they appear in the binary for the program. Some of the instructions that appear in a static trace may not be executed during some executions of the program.

In some implementations, a modified version of the Ether Malware Analysis framework can be used to perform data collection for stochastic classification and/or clustering of malware. For example, Ether can be used to generate one or more dynamic instruction traces of one or more programs (e.g., malware programs, and/or non-malware programs). In an exemplary implementation, Ether can be a set of extensions on top of a Xen virtual machine. Ether can use a tactic of zero modification to be able to track and analyze a running system. Zero modifications can preserve the sterility of the infected system, and can limit the techniques that malware authors can use to detect if malware is being analyzed. In some implementations, increasing the complexity of detection of the analysis system by malware can make for a more robust analysis system. In the collecting of dynamic instruction traces, the built in functionality of Ether can safeguard against a process altering its behavior while being watched.

In some implementations of collecting data for a program, in addition to a dynamic instruction trace of the program one or more other data can be generated for the program and used in stochastic classification. For example, other data for the program can include information about whether a packer is present (e.g., a packed status), information regarding system calls (e.g., a dynamic system call trace), a file name, a file location, a binary file, a disassembled file, information about whether the program accesses the registry, file characteristics (e.g., an entropy of a program file), a static instruction trace, or the like. The data collected for a program can be used as features of the program and can be used in generating predictors for stochastic classification of malware or other programs.

In some implementations, a point in a dynamic instruction trace where a packer finishes executing instructions can be an original entry point (OEP). In some implementations, at the OEP in the dynamic instruction trace, the program can execute instructions related to the actual functionality of the program. In some implementations, the portion of the dynamic instruction trace related to the packer can be removed. For example, a dynamic instruction trace can include packer instructions or not, and a binary predictor can be included in the set of predictors for the program to indicate that the dynamic trace includes a packer or does not include a packer.

In some implementations, the instruction sequence of a dynamic instruction trace can be represented using a Markov chain. In some implementations of determining a Markov-chain representation of a dynamic instruction trace, the instruction sequence of the dynamic instruction trace can be converted into a transition matrix Z where:

$Z_{jk}$=number of direct transitions from instruction $j$ to instruction $k$.

In some implementations, $Z_{jk}$=the number of direct transitions from instructions in a classification j to instructions in a classification k.

Estimated transition probabilities $\hat{P}$ can be obtained from counts Z, where:

$P_{jk}=Pr\{$next instruction is $k|$current instruction is $j\}$.

In some implementations, estimated transition probabilities $\hat{P}$ can be obtained from counts Z, where:

$P_{jk}=Pr\{$next instruction is in classification $k|$current instruction is in classification $j\}$.

One or more of the elements of the transition matrix $\hat{P}$ can be used as one or more predictors for the program. For example, the predictors can be used to classify a program with malicious behavior. The $Z_{jk}$ can be 2-grams, while the estimated can be a scaled version of the 2-grams. For example, $P_{jk}$ can be the relative frequency of going from state j to state k given that the process is now in state j. These quantities ($Z_{jk}$ and $P_{jk}$) can be different, since not all states are visited with similar frequencies. Elements of an estimated $P_{jk}$ from dynamic instruction traces (e.g., with the state space consisting of Intel instructions observed in the sample) can be used as features in a support vector machine. In some implementations, sometimes informative transitions j→k may occur from a state j that is rarely visited overall, but when it is visited, it tends to produce the j→k transition prominently. Such situations can be measured differently using $P_{jk}$ versus $Z_{jk}$.

In some implementations, there can be hundreds of instructions commonly used from a processor instruction set (e.g., the Intel processor instruction set or the like), and thousands of distinct processor instructions overall. In some implementations, using a several thousand by several thousand matrix of transitions, that can result in millions of predictors can make estimation difficult. In some implementations, some instructions perform the same or similar tasks (e.g., an addition operation, a subtraction operation, or other like processor operation). Grouping processor instructions together can produce faster estimation and better explanatory power. For example, grouping instructions together that perform similar tasks can aid in faster estimation.

In some implementations, one or more categorizations of processor instructions (e.g., Intel processor instructions or the like) can be developed. The categorizations can range from course groupings to more fine groupings. For example, a first exemplary categorization can group Intel processor instructions into 8 classes which can produce up to 64 predictors. The classes of this first exemplary categorization can group instructions into one or more groups related to "math", "logic", "priv", "branch", "memory", "stack", "nop", or "other" (e.g., a group for instructions that are not grouped in other groups). Also for example, a second exemplary categorization can group Intel processor instructions into 56 classes which can produce up to 3136 predictors. The classes of this second exemplary categorization can group Intel processor instructions into groups related to "asc", "add", "and", "priv", "bit", "call", "mem_other", "math_other", "move", "cmp", "dcl", "dec", "div", "stack_other", "mul", "nop", "sub", "inc", "jmpc", "jmp", "lea", "or", "load", "loop", "mov", "neg", "not", "wait", "pop", "push", "xor", "ret", "set", "rep_add", "rep_and", "rep_bit", "rep_cmp", "rep_dec", "rep_mul", "rep_ine", "rep_jmpc", "rep_jmp", "rep_lea", "rep_mov", "rep_neg", "rep_nop", "rep_not", "rep_or", "rep_pop", "rep_push", "rep_sub", "rep_other", "rep_mem_other", "rep_xor", "rep_ret", or "other" (e.g., a group for instructions that are not grouped in other groups).

Additionally for example, a third exemplary categorization can group Intel processor instructions into 86 classes which can produce up to 7396 predictors. The classes of this third exemplary categorization can group Intel processor instructions into groups related to Python Library "pydasm" categories for Intel instructions. Further for example, a fourth exemplary categorization can group Intel processor instructions into 122 classes which can produce up to 14884 predictors. The classes of this fourth exemplary categorization can group Intel processor instructions into groups related to Python Library "pydasm" categories for Intel instructions, where rep instruction-x is given its own class distinct from instruction-x.

In some implementations of stochastic classification, a data set can be used that includes dynamic instruction traces from a number (e.g., 543 or other number) of malicious and a number (e.g., 339 or other number) of benign programs, for a total number (e.g., 882 or other number) of observations. In some implementations, a sample of benign programs can be obtained from a malware vendor's clean data set or other clean data set, and can include Microsoft Office programs, popular games, or the like. In some implementations, a sample of malicious software can be obtained by obtaining a sample of programs from one or more internet sources. For example, a malicious sample can be obtained from a repository that collects malware instances in conjunction with several institutions. Data sets can be obtained from public sources, private sources, or can be purchased. Some providers of data sets can obtain data sets or samples of malware through user contributions, capture via mwcollectors and other honey pots, discovery on compromised systems, and sharing with various institutions.

In some implementations of stochastic classification, observations can be obtained from dynamic instruction traces generated from respective program runs of a threshold length of time (e.g., at least 5 minutes or other threshold length of time). In some implementations, programs with less than a threshold number (e.g., 2000 or other threshold number) of instructions executed during a threshold amount of time (e.g., five minutes or other threshold amount of time) can be removed from a data set. Removing programs with less than a threshold amount of instructions can remove some programs with processes that remain fairly idle, waiting for user interaction. Since such programs can produce short traces and are not representative of the kind of programs that require scanning, such programs can be removed from a data set of programs.

Exemplary Statistical Model for Classification

In any of the examples herein, stochastic classification of programs can determine and use a statistical model in the classification of a program.

In some implementations of stochastic classification, one or more estimated transition probabilities (e.g., elements) $\hat{P}$ determined from a Markov-chain representation can be used as predictors. In some implementations of determining a statistical model for use in stochastic classification, predictors can be screened out to improve performance and to allow certain transitions to demonstrate their effect to classification. In some implementations of generating a statistical model, uncertainty in $\hat{P}$ can be explicitly accounted for. For example, for online classification purposes, uncertainty in $\hat{P}$ can have a large impact on a classification decision until a sufficiently long trace can be obtained. While accounting for the uncertainty in $\hat{P}$ can be done for online analysis, it also can be done for offline analysis, as deciding how long to run a program (e.g., the length of a trace to obtain in order to make a decision) can be useful in a decision framework. In some implementations of stochastic classification, uncertainty in $\hat{P}$ is not explicitly accounted for.

Exemplary Logistic Spline Regression Model

In some implementations of stochastic classification, a statistical model for classification can be determined by fitting and/or estimating a statistical classification model using observations from a data set of programs. In some implementations of stochastic classification, for a given categorization of processor instructions (e.g., one of the exemplary categorizations given in the above section "Exemplary Dynamic Trace Data", or other categorizations) with c instruction categories, let $Z_i$ be the transition counts between instruction categories for the i-th observation. Also, let $B_i$ be the indicator of maliciousness, where $B_i=1$ if the i-th sample is malicious, and $B_i=0$ otherwise. Additionally, for the initial model fit discussion in this section, $\hat{P}_i$ can be the posterior mean (i.e., $E(P_i|Z_i)$), assuming symmetric Dirichlet ($\lambda$) for respective rows of $P_i$. For example, $\lambda=0.1$ can be used.

In the below section "Exemplary Online Analysis of Programs" an exemplary approach to explicitly account for uncertainty in $P_i$ when making decisions is described. In some implementations of stochastic classification, an assumption can be that a training set for a statistical model has observations where the traces are long enough to make the uncertainty in the precise value of $P_i$ somewhat negligible for the purposes of model estimation. This can be verified intuitively through the results as shown included in the below section "Exemplary Online Analysis of Programs," where in some implementations probability estimates can become fairly precise after about 10,000 instructions.

In some implementations, of stochastic classification, the predictors used to model the $B_i$ can be as follows as shown in D.1:

$$x_i=[\log \text{it}(\hat{P}_{i,1,1}), \log \text{it}(\hat{P}_{i,1,2}), \ldots, \log \text{it}(\hat{P}_{i,c,c-1}), \log \text{it}(\hat{P}_{i,c,c})]', i=1, \ldots, n, \quad \text{(D.1)}$$

where $\hat{P}_{i,j,k}$ is the (j, k)-th entry of the $\hat{P}_i$ matrix, and respective components of the $x_i$ are scaled to have sample mean 0 and sample variance 1, across $i=1, \ldots, n$. The scaling of the predictors to a comparable range can be done for penalized regression methods.

The following model shown by D.2 can be used:

$$logit[Pr(B=1)] = f_\beta(x) = \beta_0 + \sum_{s=1}^{c^2} \sum_{l=1}^{K+1} \beta_{s,l} \phi_{s,l}(x_s), \quad \text{(D.2)}$$

where the basis functions, $\phi_{s,l}, \ldots \phi_{s,K+1}$ form a linear spline with K knots at equally spaced quantiles of $x_s$, $s=1, \ldots, c^2$ (and $c^2$ is the number of elements in the $\hat{P}$ matrix).

Pairwise products of the $\phi_{s,l}(x)$ can also be included to create a two-way interaction spline for $f(x)$. A compromise, which can be more flexible than the additive model in (D.2) but not as cumbersome as the full two-way interaction spline, is to include multiplicative interaction terms into the additive model to generate a statistical model for classification of malware.

In some implementations of stochastic classification, a statistical model can be used. For example, a statistical model for classification can be a logistic spline regression model which can be called a logistic spline model. In some implementations of stochastic classification, the parameters of the exemplary implementation of a statistical model shown at (3) can be estimated and the statistical model can be used in stochastic classification of malware, non-malware (e.g., benign programs) or other programs. An exemplary implementation of a logistic spline regression model for classification is as follows shown in D.3:

$$logit[Pr(B=1)] = \quad \text{(D.3)}$$

$$f_\beta(x) = \beta_0 + \sum_{s=1}^{c^2} \sum_{l=1}^{K+1} \beta_{s,s,l} \phi_{s,s,k}(x_s) + \sum_{s=1}^{c^2-1} \sum_{t=s+1}^{c^2} \sum_{l=1}^{K+1} \beta_{s,t,l} \phi_{s,t,l}(x_s x_t)$$

$$logit[Pr(B=1)] =$$

$$f_\beta(x) = \beta_0 + \sum_{s=1}^{c^2} \sum_{l=1}^{K+1} \beta_{s,s,l} \phi_{s,s,k}(x_s) + \sum_{s=1}^{c^2-1} \sum_{t=s+1}^{c^2} \sum_{l=1}^{K+1} \beta_{s,t,l} \phi_{s,t,l}(x_s x_t),$$

where the basis functions, $\phi_{s,t,l}, \ldots \phi_{s,t,K+1}$ form a linear spline with K knots at equally spaced quantiles of $x_s x_t$ for $s \neq t$ (and at equally spaced quantiles of $x_s$ for $s=t$). The statistical model shown at (D.3) can be implemented with a K set to a value (e.g., 5 or other value) to produce classification results. The statistical model shown at (D.3) has potentially a large number of parameters ($\beta$s), so some estimation procedure can be done in order to estimate the parameters of the statistical model.

Exemplary Estimation of Parameters for a Statistical Model for Classification

In some implementations, to estimate the parameters of a statistical model for classification (e.g., the exemplary statistical model show at (D.3)), a combination of an Elastic Net, Relaxed LASSO, and Adaptive LASSO estimation procedures can be used. In some implementations, an Elastic Net estimation procedure can be efficient and useful for high dimensional predictor problems (e.g., where p>>n). This is in part because it can ignore many predictors. For example, it can set one or more of the $\beta_{s,t,l}=0$.

The Elastic Net, Relaxed LASSO, and Adaptive LASSO procedures, are reviewed below, and can be generalized for use in stochastic classification.

In some implementations, a data likelihood can be as follows:

$$L(\beta) = \prod_{i=1}^{n} [logit^{-1}(f_\beta(x_i))]^{I_{B_i=1}} [1 - logit^{-1}(f_\beta(x_i))]^{I_{B_i=0}}$$

In some implementations, an Elastic Net estimator can be a combination of ridge regression and LASSO. For example, an Elastic Net estimation can find the $\beta$ that minimizes $$-\log L(\beta) + \lambda \left\{ \rho \sum_{s=1}^{c^2} \sum_{t=s}^{c^2} \sum_{l=1}^{K+1} \beta_{s,t,l}^2 + (1-\rho) \sum_{s=1}^{c^2} \sum_{t=s}^{c^2} \sum_{l=1}^{K+1} |\beta_{s,t,l}| \right\}, \quad \text{(D.4)}$$

for given tuning parameters $\lambda>0$ and $\rho \in [0, 1]$. For the linear spline model of (D.3), the penalty on $\beta_{s,t,l}^2$ and $|\beta_{s,t,l}|$ corresponds to a penalty on the overall trend and the change in slope at the knots (i.e., encourages "smoothness"). In some implementations, the tuning parameters $\lambda$ and $\rho$ can be chosen using 10-fold cross validation (CV). Elastic Net estimation can obtain fits to many values of $\lambda$ at the computational cost of a single least squares fit (i.e., $O(p^2)$) using a Least Angle Regression (LARS) algorithm.

Relaxed Lasso and Adaptive LASSO estimations are procedures that can counteract the over-shrinking that occurs to nonzero coefficients when using a LASSO procedure in high dimensions. In some implementations, a Relaxed LASSO estimation can be thought of as a two-stage procedure, where the LASSO procedure (e.g., the Elastic Net estimator with $\rho=0$) is applied with $\lambda=\lambda_1$, then the LASSO is applied again to only the nonzero coefficients with $\lambda=\lambda_2$, where typically $\lambda_1 = \lambda_2$.

In some implementations, an Adaptive LASSO estimation can be a two stage procedure where an initial estimate of the parameters, $\beta_{s,t,l}$, is obtained via unregularized MLEs or via ridge regression (if p>n). In the second step of the Adaptive LASSO estimation, the LASSO is applied with a penalty that has each term weighted by the reciprocal of initial estimates.

In some implementations of stochastic classification, a statistical model can be determined in part by estimating one or more parameters for the statistical model. For example, the parameters (e.g., the coefficients) of the logistic spline model shown in (D.3) can be estimated. In some implementations, parameters for a statistical model for classification can be estimated using a Relaxed Adaptive Elastic Net estimation. In some implementations of estimating parameters using a Relaxed Adaptive Elastic Net estimation, predictors can be screened for importance using a linear logistic model. For example, the predictors, $x_s$, can be screened for importance using the linear logistic model shown as follows:

$$f_1(x) = \alpha_0 + \Sigma_s \alpha_s x_s,$$

with $\alpha$ estimated using an Elastic Net estimation such as shown at (D.4) above with $\lambda=\lambda_1$ and $\rho$ a set to a value, (e.g., 0.5 or other number). In some implementations, $\rho$ and or $\lambda$ can be set using CV. Screening predictors for importance can determine a set of active predictors. For example, the predictors, $x_s$, can be screened and the $x_s$ with $\alpha_s \neq 0$ can be active predictors. Also, screening predictors for importance can produce a set of estimated parameters. For example, using an Elastic Net estimation to estimate parameters for the linear logistic model can produce the estimated parameters $\alpha_s$, for corresponding predictors, $x_s$.

In some implementations of estimating parameters for a statistical model using a Relaxed Adaptive Elastic Net estimation, one or more parameters of the statistical model can be estimated using an Elastic Net estimation. For example, the parameters of the logistic spline regression model as shown at (D.3) can be estimated using an Elastic Net estimation such as shown at (D.4) above with $\lambda = \lambda_2$ and $\rho$ a set to a value, (e.g., 0.5 or other number). In some implementations, $\rho$ and/or $\lambda$ can be set using CV. In some implementations, the estimated parameters of the statistical model for classification that have been estimated using an Elastic Net estimation can be initial estimates for the parameters (e.g., $\hat{\beta}_{s,t,l}$) of the statistical model for classification. In some implementations, a statistical model for classification can be fit using active predictors. For example, parameters for active predictors can be estimated by an estimation procedure, such as an Elastic Net estimation or Adaptive elastic net estimation. In some implementations, a statistical model for classification is not fit using active parameters.

In some implementations of estimating parameters for a statistical model using a Relaxed Adaptive Elastic Net estimation, one or more estimated parameters, $\hat{\beta}$, for the statistical model can be estimated using an Adaptive Elastic Net estimation. For example, an Adaptive Elastic Net estimation with $\lambda = \lambda_3$ and $\rho = \rho_3$ can determine $\hat{\beta}$ given by the minimizer of $$\log L(\beta) + \lambda_3 \left\{ \rho_3 \sum_{s=1}^{c^2} \sum_{t=s}^{c^2} \sum_{l=1}^{K+1} \left( \frac{\beta_{s,t,l}}{\tilde{\beta}_{s,t,l}} \right)^2 + (1-\rho_3) \sum_{s=1}^{c^2} \sum_{t=s}^{c^2} \sum_{l=1}^{K+1} \left| \frac{\beta_{s,t,l}}{\tilde{\beta}_{s,t,l}} \right| \right\}. \quad (C.5)$$

In some implementations, the tuning parameters $\lambda_1$, $\lambda_2$, $\lambda_3$, and/or $\rho_3$ can be chosen via cross validation. Also, $\tilde{\beta}_{s,t,l}$, can be initial estimates such as initial estimates generated by fitting a logistic spline regression model using an Elastic Net estimation.

In some implementations of estimating parameters of a statistical model for classification, there can be over 9 million parameters if the second exemplary categorization of processor instructions discussed herein is used, and there can be over 200 million predictors if the exemplary fourth categorization of processor instructions discussed herein is used. In some implementations, these procedures for estimating parameters for a statistical model can be used in combination to determine estimated parameters for a statistical model. In some implementations, overall 10-fold CV classification rates of ~96% can be achieved with the Elastic Net, Adaptive LASSO, and Relaxed LASSO, respectively, when used alone to fit the model in (D.3). Whereas, in some implementations, overall 10-fold CV accuracies of ~99% (e.g., as shown in the below section "Exemplary Classification Results") can be achieved using a combined method as discussed herein.

Exemplary Prior Correction for Sample Bias

In some implementations of stochastic classification of programs, prior correction for sample bias can be done. Prior correction for sample bias can involve computing the usual logistic regression fit and correcting the estimates based on prior information about the proportion of malware in the population of interest $\pi_1$ and the observed proportion of malware in the sample (or sampling probability), $\bar{B}$. In some implementations, knowledge of $\pi_1$ can come from some prior knowledge, such as expert solicitation or previous data. Provided the estimates of the regression coefficients (i.e., $\beta_{s,t,l}$, $j<k$, $l=1 \ldots, M$ in (D.5)) are consistent, then the following corrected estimate is consistent for $\beta_0$, $$\tilde{\beta}_0 = \hat{\beta}_0 - \log\left[ \left( \frac{1-\pi_1}{\pi_1} \right) \left( \frac{\bar{B}}{1-\bar{B}} \right) \right]. \quad (D.6)$$

Prior correction can have no effect on the exemplary classification accuracy results discussed in the below section "Exemplary Classification Results", since it can be a monotonic transformation, so there can be an equivalent threshold to produce the same classifications either way. However, in some implementations, the estimated probability of maliciousness for a given program can provide a measure of belief of the maliciousness of the program on a scale that reflects the appropriate prior probability that the code is malicious. For example, if $\pi_1$ can somehow be specified for the given network on which the program will be executed, then prior correction as shown in (D.6) can be used.

Exemplary Method of Determining a Statistical Model for Classification

Figure 39:
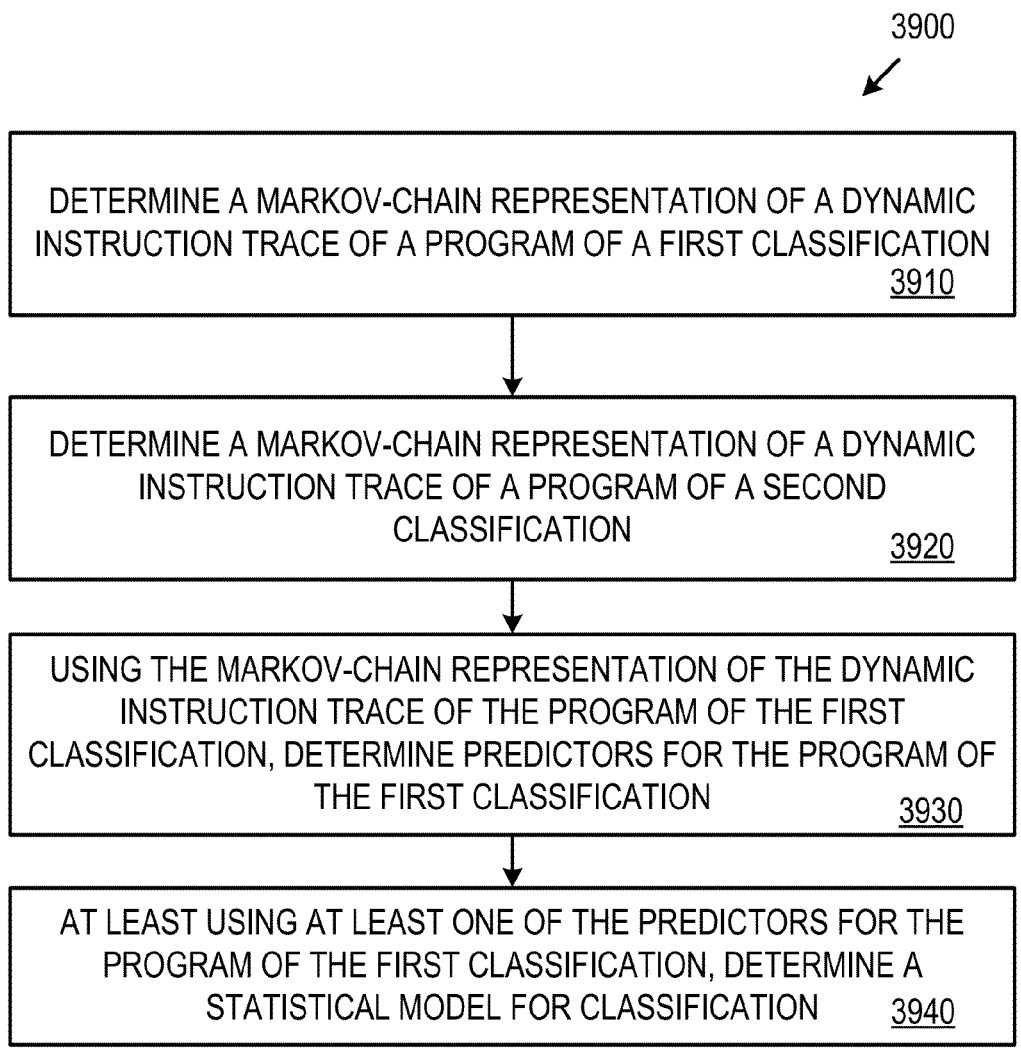
FIG. 39 is a flowchart of an exemplary method of determining a statistical model for classification.

FIG. 39 is a flowchart of an exemplary method 3900 of determining a statistical model for classification. In FIG. 39, at least one Markov-chain representation of at least one dynamic instruction trace of at least one program of a first classification is determined at 3910.

At 3920, a Markov-chain representation of at least one dynamic instruction trace of at least one program of a second classification is determined.

At 3930, at least using the Markov-chain representation of the at least one dynamic instruction trace of the at least one program of the first classification, one or more predictors for the program of the first classification are determined.

At 3940, at least using some of the one or more predictors for the program of the first classification, a statistical model for classification is determined. For example, active parameters for one or more programs of a data set can be used to fit a statistical model that is estimated using an estimation procedure such as a Relaxed Adaptive Elastic Net estimation or an Elastic Net Estimation.

Figure 40:
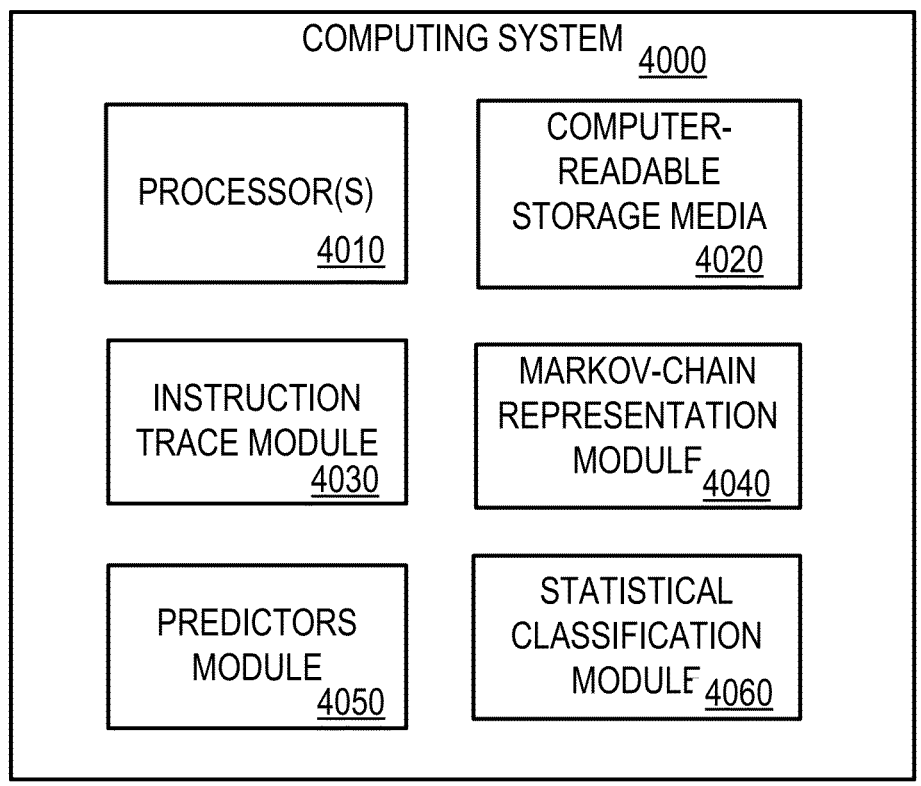
FIG. 40 is a schematic diagram of an exemplary system for classifying a program using a statistical classification model.

Exemplary System for Classifying a Program Using a Statistical Classification Model FIG. 40 is a schematic diagram of an exemplary computing system 4000 for the stochastic classification of a program using a statistical classification model. In FIG. 40, the computing system 4000 includes one or more processors 4010 and computer-readable storage media 4020. The computing system 4000 also includes a dynamic instruction trace module 4030 for generating one or more dynamic instruction traces of one or more programs. The computing system 4000 further includes a Markov-chain representation module 4040 for generating one or more Markov-chain representations of one or more dynamic instruction traces of one or more programs. Additionally, the computing system 4000 includes a predictors module 4050 for determining one or more predictors for one or more programs. Also, the computing system

4000 includes a statistical classification module 4060 for determining a statistical classification model for classification, and/or for classifying a program using stochastic classification that uses a statistical classification model.

Exemplary Implementation Variations

AA. A method, implemented at least in part by one or more computing devices, the method comprising:

generating a dynamic instruction trace of a program;

generating a Markov-chain representation of the dynamic instruction trace of the program;

at least using the Markov-chain representation, determining one or more predictors for the program; and at least using at least one of the one or more predictors for the program, classifying the program.

BB. One or more computer-readable media storing computer-executable instructions which when executed cause a computing device to perform the method of AA.

CC. The method of AA, wherein the classifying the program comprises:

evaluating a statistical model using at least one of the one or more predictors for the program; and wherein the evaluating the statistical model produces an evaluation result.

DD. The method of CC, wherein the classifying the program further comprises comparing the evaluation result to a classification threshold.

EE. The method of DD, wherein the comparing comprises determining that the evaluation result exceeds the classification threshold; and based on the determining that the evaluation result exceeds the classification threshold, the program is classified as a malicious program.

FF. The method of AA, wherein the determining the one or more predictors for the program comprises:

using the Markov-chain representation of the instruction trace of the program, determining one or more estimated transition probabilities; and determining at least one log it of at least one of the one or more estimated transition probabilities.

GG. The method of FF, wherein the at least one of the one or more estimated transition probabilities is estimated using a posterior mean estimation.

HH. The method of AA, further comprising classifying the program as malware or non-malware.

II. The method of DD, wherein the classification threshold is set to a value based on a false discovery rate.

JJ. The method of AA, further comprising determining one or more additional predictors for the program, wherein the one or more additional predictors comprise a binary predictor.

KK. The method of AA, further comprising:

clustering a plurality of malicious programs into at least one cluster, wherein the program is a malicious program of the plurality of malicious programs; and wherein the clustering comprises using a similarity measure which at least measures an accumulated probability change.

LL. The method of KK, wherein the accumulated probability change measures an accumulated probability change along a length of a line connecting at least two points in Euclidean space; and wherein the clustering the plurality of malicious programs into the at least one cluster comprises developing the at least one cluster at least using the accumulated probability change measure in a hierarchical clustering procedure.

MM. A method, implemented at least in part by one or more computing devices, the method comprising:

determining at least one Markov-chain representation of at least one dynamic instruction trace of at least one program of a first classification;

determining at least one Markov-chain representation of at least one dynamic instruction trace of at least one program of a second classification;

using the at least one Markov-chain representation of the at least one dynamic instruction trace of the at least one program of the first classification, determining one or more predictors for the at least one program of the first classification;

at least using some of the one or more predictors for the at least one program of the first classification, determining a statistical model for classification.

NN. The method of MM, further comprising, at least using the statistical model for classification, classifying an input program as being within the first classification or the second classification.

OO. The method of MM, wherein the determining the statistical model for classification comprises:

determining one or more parameters for the statistical model, wherein the determining the one or more parameters comprises estimating one or more parameters for a linear logistic model using an Elastic Net estimation.

PP. The method of OO, wherein the determining the statistical model for classification comprises:

determining one or more active predictors, wherein the one or more active predictors comprise predictors of the linear logistic model that have corresponding estimated parameters that are not equal to zero.

QQ. The method of PP, wherein the determining the one or more parameters for the statistical model further comprises:

using at least some of the one or more active predictors, determining one or more parameters for an interaction spline model using an Elastic Net estimation.

RR. The method of QQ, wherein the one or more parameters for an interaction spline model determined using an Elastic Net estimation comprise one or more initial parameter estimates; and the determining the one or more parameters for the statistical model further comprises:

using at least some of the one or more initial parameter estimates, determining one or more parameters for an interaction spline model using an Adaptive Elastic Net estimation.

SS. The method of MM, wherein the statistical model for classification comprises an interaction spline regression model that comprises one or more parameters estimated using a Relaxed Adaptive Elastic Net estimation.

TT. A computing system comprising one or more processors and one or more computer-readable storage media storing computer executable instructions that cause the computing system to perform a method, the method comprising:

determining at least one Markov-chain representation of at least one instruction trace of at least one program of a first classification;

determining at least one Markov-chain representation of at least one instruction trace of at least one program of a second classification;

using the at least one Markov-chain representation of the at least one instruction trace of the at least one program of the first classification, determining one or more predictors for the at least one program of the first classification;

at least using some of the one or more predictors for the at least one program of the first classification, determining a statistical model for classification.

UU. A method, implemented at least in part by one or more computing devices, the method comprising:

receiving a dynamic instruction trace of a program, wherein the dynamic instruction trace is generated at least by executing the program to generate a list of one or more processor instructions executed during the executing of the program;

generating a Markov-chain representation of the dynamic instruction trace of the program, wherein generating a Markov-chain representation of the dynamic instruction trace of the program comprises:

determining one or more classes of processor instructions;

wherein at least one vertex of the Markov-chain representation represents at least one of the one or more classes of processor instructions;

wherein at least one edge of the Markov-chain representation represents an estimated transition probability estimated using a posterior mean estimation;

wherein the Markov-chain representation comprises a transition matrix; determining one or more predictors for the program, wherein the one or more predictors comprise:

at least one predictor comprising at least one of the one or more estimated transition probabilities; and at least one binary predictor;

classifying the program, wherein the classifying the program comprises:

evaluating a statistical model using the one or more predictors for the program, wherein the evaluating the statistical model produces an evaluation result;

comparing the evaluation result to a classification threshold set to a value based on a false discovery rate;

based on the comparing, determining that the evaluation result exceeds the classification threshold; and based on the determining that the evaluation result exceeds the classification threshold, determining that the program is within a malicious program classification.

Exemplary Classification Results

For some implementations of stochastic classification, the estimated probability that a program is malicious (e.g., $\hat{Pr}(B=1|x)$) can be given as an evaluation result determined from an evaluated statistical model for classification. For example, the estimated probability that a program is malicious can be given by evaluating the logistic spline model shown in (D.3) with $\beta_{s,t,i}$ replaced by respective estimates and using predictors generated from the program. In some implementations, a program can be classified as malicious if the evaluation result (e.g., estimated probability that the program is malicious) is greater than a classification threshold. For example, the i-th observation is classified as malicious or as within a malicious program classification if $\hat{Pr}(B=1|x_i) > \tau$ for some threshold $\tau$. In some implementations, a classification threshold can be set to a value based on a false discovery rate (FDR). For example, a classification threshold can be selected to produce an acceptable FDR.

Exemplary Out of Sample Accuracy

This section describes exemplary results of an examination of the classification accuracy of implementations of stochastic classification performed using various processor instruction categorizations, with and without the packer removed. In the exemplary implementations, if the packer was removed from the trace, then a binary predictor (packer existence or not) was added to the covariate vector x. The 10-fold CV overall accuracy results for these exemplary implementations of covariate scenarios are provided in Table 13. Overall, there is little difference between the results with or without the packer removed, with possibly the exception of results for Categorization 2 as shown in Table 13.

According to the exemplary results, it seems that the effect of the packer (which produces relatively few instructions relative to the remainder of the program) can be washed out by the rest of the instructions. However, in some implementations of stochastic classification, this could have more of an impact for shorter traces, particularly when collecting traces and analyzing traces early on in real time. As shown in Table 13, Categorizations 2, 3, and 4 are generally not much different from each other, but they perform better than Categorization 1. In the remainder of the exemplary results shown, the exemplary implementation of the Categorization 2 data with packer removed was used.

TABLE 13

Exemplary overall out-of-sample accuracy calculated using implementations using 10-fold CV by category and packer (removed or not) using an implementation of a logistic spline regression model with parameters estimated using a Relaxed Adaptive Net estimation.

|  | Cat 1 | Cat 2 | Cat 3 | Cat 4 |
|---|---|---|---|---|
| w/packer | 0.923 | 0.986 | 0.991 | 0.991 |
|  | (0.009) | (0.004) | (0.003) | (0.003) |
| w/o packer | 0.923 | 0.993 | 0.989 | 0.992 |
|  | (0.009) | (0.003) | (0.004) | (0.003) |

In the exemplary results shown in Table 14, an implementation of a logistic spline regression with Relaxed Adaptive Elastic Net estimation is compared to various other classification techniques using categorization 2 with packer removed. The competing technique implementations shown in Table 14 are (i) an implementation of a linear logistic regression model estimated with Elastic Net, (ii) an implementation of a support vector machine (SVM) (e.g., a SVM provided by the Python package shogun), (iii) an implementation of a mixture discriminant analysis (MDA) routine (e.g., using a R package mda) using two components on the set of covariates with nonzero coefficients from the linear logistic regression elastic net, and (iv) implementations of three signature based antivirus programs with updates recent to the time of comparison. In some implementations, the predictor screening used in conjunction with the MDA method can be used in order to avoid numerical issues with the procedure that occurred when using predictors.

In the experiments conducted to generate the results in Table 14, a number of mixture components (e.g., two) were chosen to produce the best CV (e.g., 10-fold CV) accuracy. In the experiments conducted, the implementations of anti-virus software packages used can use signatures (i.e., blacklists) and whitelists as well as heuristics to determine if a program is malicious. The other implementations of classification techniques shown in the Table 14 do not use signatures or white lists, but, in some implementations, these can be incorporated into these techniques. As shown in Table 14, the Spline Logistic implementation performed well on the implementation of a data set, and can possibly be a promising addition to anti-virus software.

TABLE 14

Comparison of exemplary classification results using various techniques. The logistic spline, logistic linear, SVM, and MDA implementations used Categorization 2 with packer removed covariates, and had results calculated using 10-fold CV (same 10 folds were used for each method).

| Detection Technique | Overall Accuracy | Malware Accuracy | | |
|---|---|---|---|---|
| | | 1% FDR[1] | 0.3% FDR[2] | ~0% FDR[3] |
| Spline Logistic (Cat 2) | 0.993 | 0.989 | 0.858 | |
| Linear Logistic (Cat 2) | 0.930 | 0.564 | 0.328 | |
| SVM (Cat 2) | 0.932 | 0.862 | 0.558 | |
| MDA (Cat 2) | 0.920 | 0.538 | 0.394 | |
| Antivirus 1 | 0.733 | | | 0.632 |
| Antivirus 2 | 0.537 | | | 0.363 |
| Antivirus 3 | 0.496 | | | 0.259 |

[1] three out of 339 benign programs incorrectly considered malicious
[2] one out of 339 benign programs incorrectly considered malicious
[3] In the implementations, there were some false positives from signature-based detection techniques due to fuzzy matching heuristics (e.g., Antivirus 1 had one false detection in this dataset), but the FDR for these implementations of signature-based technique is unknown.

Figure 41:
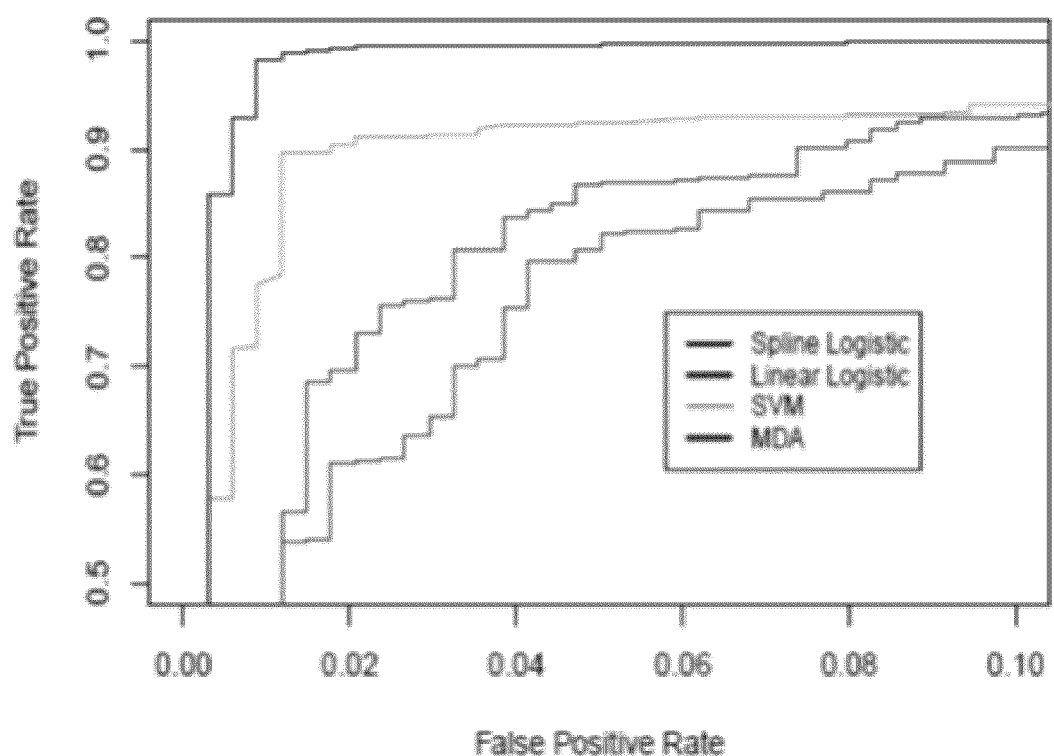
FIG. 41 is plot of various ROC curves.

FIG. 41 shows a plot which displays the ROC curves for the various competing implementations of classification techniques in Table 14. In plot shown in FIG. 41 information about the antivirus programs shown in Table 14 is excluded since there is no thresholding parameter with which to vary the false positive rate. It can be seen from Table 14 and the plot shown in FIG. 41 that the implementation of a logistic spline model with Relaxed Adaptive Elastic Net estimation provided better results than the other implementations of techniques for classification. In the results shown in the plot shown in FIG. 41, the implementation of a logistic spline model is shown as having an estimated out-of-sample overall error rate of 0.007 (e.g., an accuracy of 99.3%) which is 10 times smaller than any of the other implementations of classification techniques. FIG. 41 shows a plot which includes the ROC Curves for the implementations of classification techniques shown in Table 14.

Exemplary Online Analysis of Programs

This section includes a description of how stochastic classification can be used in an online classification setting. In some implementations, stochastic classification can be used in a sandbox type on-line application. For example, stochastic classification can be inserted into an email/http inspection system to filter for spam and malware, which can allow for a more robust approach to analyzing new threats in real time. Also, this section includes a description of how stochastic classification can be used in clustering analysis of malware.

Exemplary Online Detection of Malware Using Stochastic Classification

In some implementations of stochastic classification, the predictors used in a statistical model, such as a logistic spline model, can be the elements of a probability transition matrix P, which can be observed (e.g., estimated) with error (e.g., measurement error). In some implementations, measurement error can be substantial for a dynamic instruction trace with a small number of instructions. In some implementations of online classification, measurement error can be explicitly accounted for. For example, in some implementations of stochastic classification, before a classification decision is made, a determination can be made to select a length of a dynamic instruction trace to be used in the classification.

In some implementations of stochastic classification, respective rows of P can be further modeled as independent symmetric Dirichlet ($\lambda$) vectors a priori, which can be a conjugate prior for P in a Markov-chain model. Thus, in some implementations, for a trace $T_{l:m}$ with m instructions observed thus far, the probability of being Malicious, $Pr(B=1) = \log it^{-1}(\hat{f}(P))$, can have variability (e.g., due to the uncertainty in P) that can decrease as m increases (e.g., as a longer dynamic instruction trace is obtained). In some implementations, if a given process produces a trace $T_{l:m}$, the distribution of $Pr(B=1)$ can be simulated by generating draws from the posterior of P to produce uncertainty bands and a posterior mean estimate $E[Pr(B=1)|T_{l:m}]$.

This can be thought of as an empirical Bayes approach, as f can be replaced with an estimate $\hat{f}$, while the uncertainty in P is treated. In some implementations, this can be a good compromise, as the uncertainty in $Pr(B=1)$ can be dominated by uncertainty in P early on in a trace. The plot shown in FIG. 42 and the plot shown in FIG. 43 demonstrate an implementation, of this approach on the first malicious and benign processes in the sample, respectively, using a prior correction of $\pi_1=0.01$. In the implementations shown in the plot shown in FIG. 42 and the plot shown in FIG. 43, there is a lot of uncertainty in either case initially, until about 10,000 instructions are collected. By about 30,000 instructions the $Pr(B=1)$ for the implementations of the malicious and benign processes shown in the plot shown in FIG. 42 and the plot shown in FIG. 43 are tightly distributed near one and zero respectively. In some implementations, online decision making using stochastic classification can classify a program as malicious or benign according to $Pr(B=1) > \tau$. In some implementations, a credibility threshold $\tau$ can be set so that a number of alarms can be admitted over a period of time (e.g., a number of tolerable alarms per day). In some exemplary implementations, $\tau$ can be set to a value that allows a credible interval (e.g., the 95% or other credible interval) to be narrow enough (e.g., <0.1).

Figure 42:
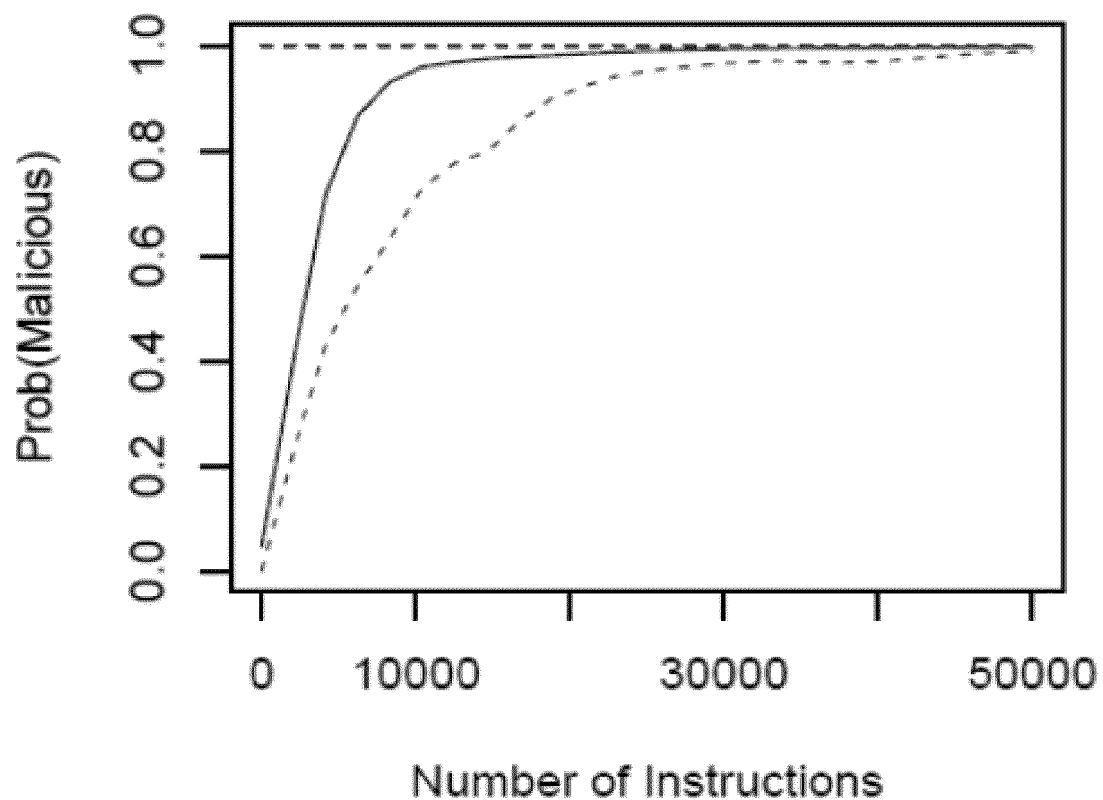
FIG. 42 is a plot showing a posterior mean of the probability of malware given the instruction sequence for a malicious sample as a function of number of instructions.
Figure 43:
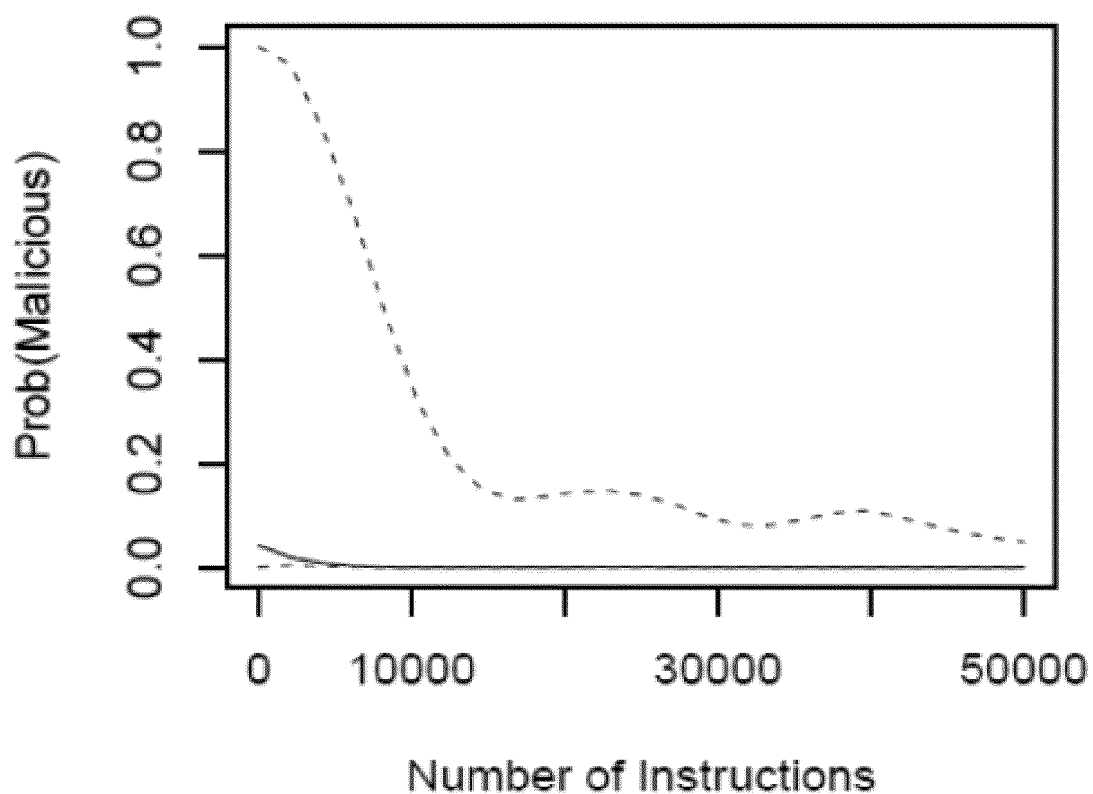
FIG. 43 is a plot showing a posterior mean of the probability of malware given the instruction sequence for a benign sample as a function of number of instructions.

The plot shown in FIG. 42 shows a posterior mean of the probability of malware given the instruction sequence for a malicious sample as a function of number of instructions. The plot shown in FIG. 43 shows a posterior mean of the probability of malware given the instruction sequence for a benign sample as a function of number of instructions. In the plot shown in FIG. 42 and the plot shown in FIG. 43 the 95% credible intervals, reflecting uncertainty, are shown by the dashed lines.

Exemplary Post Detection Analysis

Some malicious programs can be reverse engineered to determine the functionality and origin of the programs. Reverse engineering of programs can be done in order to know how to respond and/or how to better prevent future infections into computer networks. In some implementations, reverse engineering processes can be fairly sophisticated, requiring many hours of effort from a highly trained individual. In some implementations, the reverse engineering process can be streamlined by useful information provided about the program. In some implementations, clustering of malicious programs can be done to provide useful information about the program. For example, when an instance of malware is detected, it can be clustered into a self-similar group, where perhaps some of the group members have already been reverse engineered by an analyst. The analyst can then use these previous efforts to more quickly understand the nature and functionality, origin, and other information of the newly identified malicious program.

In some implementations, clustering of malware can be done using a probability change measure which can be a similarity measure which can take advantage of an estimated probability $\hat{P}r(B=1|x)$ of being malicious such as an estimated probability determined using stochastic classification. In some implementations, a probability change measure can then be used in a hierarchical clustering procedure to develop clusters and identify neighbors for a given instance of malware.

In some implementations of classification, the predictor space can be of very high dimension (e.g., 3136 predictors or other number of predictors). However, in some implementations, there can be relatively few important predictors to the total number. Also, predictors can vary in their influence. In some implementations, if two observations are close together with respect to their values of important predictors (e.g., one or more predictors that are useful for classifying a program as malware or non-malware), then the observations can be considered neighbors. In some implementations, the observations can be considered neighbors regardless of respective values for predictors (e.g., less informative predictors) other than important predictors. In some implementations, a spline logistic regression model estimated using an estimation procedure, such as the Relaxed Adaptive Elastic Net procedure described herein, can contain pertinent information about predictor importance an can be used for classification in this setting. A spline logistic regression model can be used to determine a measure of similarity between observations.

In some implementations, a similarity measure such as a probability change measure, can operate on predictor variable space and can measure the accumulated change in probability of malware. For example, the similarity measure can measure the accumulated change in probability of malware when moving in a straight line from one point in predictor variable space to another point. As shown in the plot shown in FIG. 44, for example, a probability change measure can measure the accumulated change in probability of malware when moving in a straight line from one point ($x_1$) in predictor variable space to another point ($x_2$). In some implementations, a probability change measure can be smaller for observations that have little change in the probability surface between them (e.g., $x_1$ and $x_2$), than for observations with substantial change (e.g., $x_1$ and $x_3$), even if there is no difference in Euclidean or Mahalanobis distances.

In some implementations of a probability change measure, the accumulated probability change along a length of a line connecting points (e.g., points $x_1$ and $x_2$) in Euclidean space can be determined using the following line integral as shown at D.7:

$$d(x_1, x_2) = \|x_1 - x_2\| \left\{ \int_0^1 \left| \frac{\partial}{\partial \lambda} \hat{P}r(B=1 | B=1x = \lambda x_1 + (1-\lambda)x_2) \right|^\rho d\lambda \right\}^{1/\rho}, \quad (D.7)$$

where $\|x_1 - x_2\|$ can be the standard Euclidean norm. In some implementations, such as the implementations used in the analysis presented below, $\rho=1$ can be used. In some implementations, the accumulated probability change determined using the line integral shown at (D.7) can be efficiently calculated with a simple quadrature approximation across $\lambda$ on the consecutive differences of $\hat{P}r(B=1|x=\lambda x_1+(1-\lambda)x_2)$.

Figure 44:
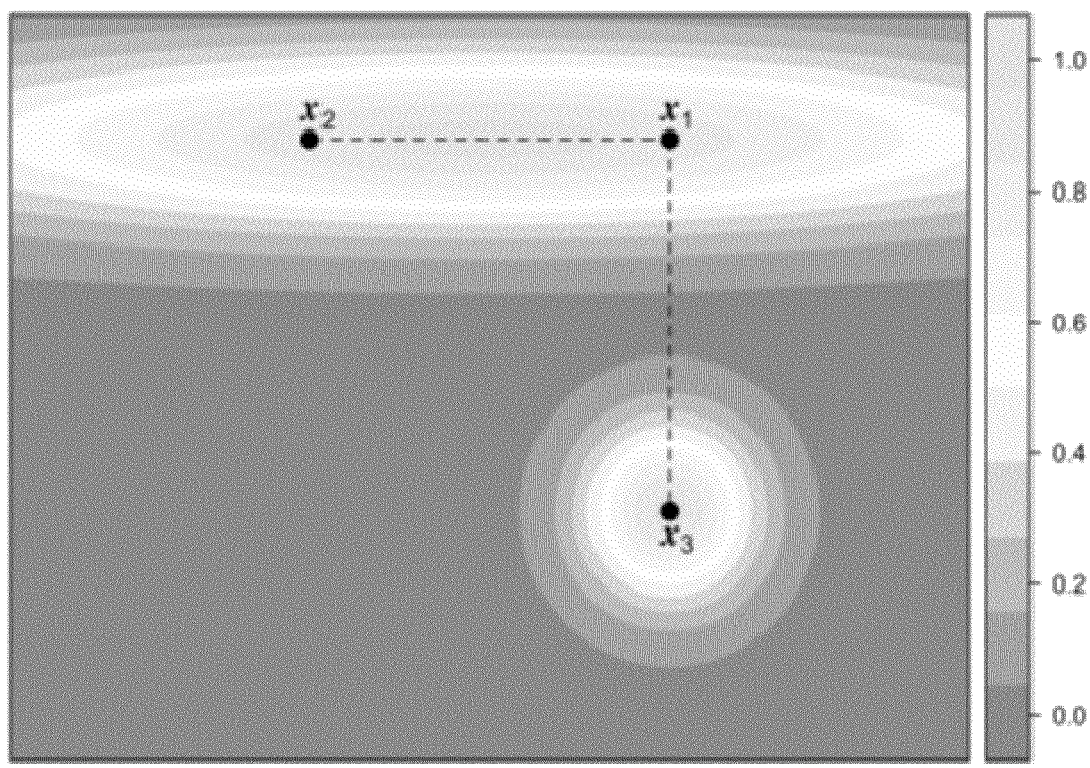
FIG. 44 is a plot that shows an exemplary implementation of a conceptual probability surface over on exemplary implementation of a predictor space.

The plot shown in FIG. 44 shows an exemplary implementation of a conceptual probability surface over on exemplary implementation of a predictor space. In the plot shown in FIG. 44, the Euclidean distance (or Mahalonobis distance if the two predictor dimensions had the same variance) from x1 to x2 is the same as that from x1 to x3. However, the line integral in (D.7) along the respective dashed lines can be different, leading to a larger probability change measure in (D.7) for (x1; x3), than that for (x1; x2).

Figure 45:
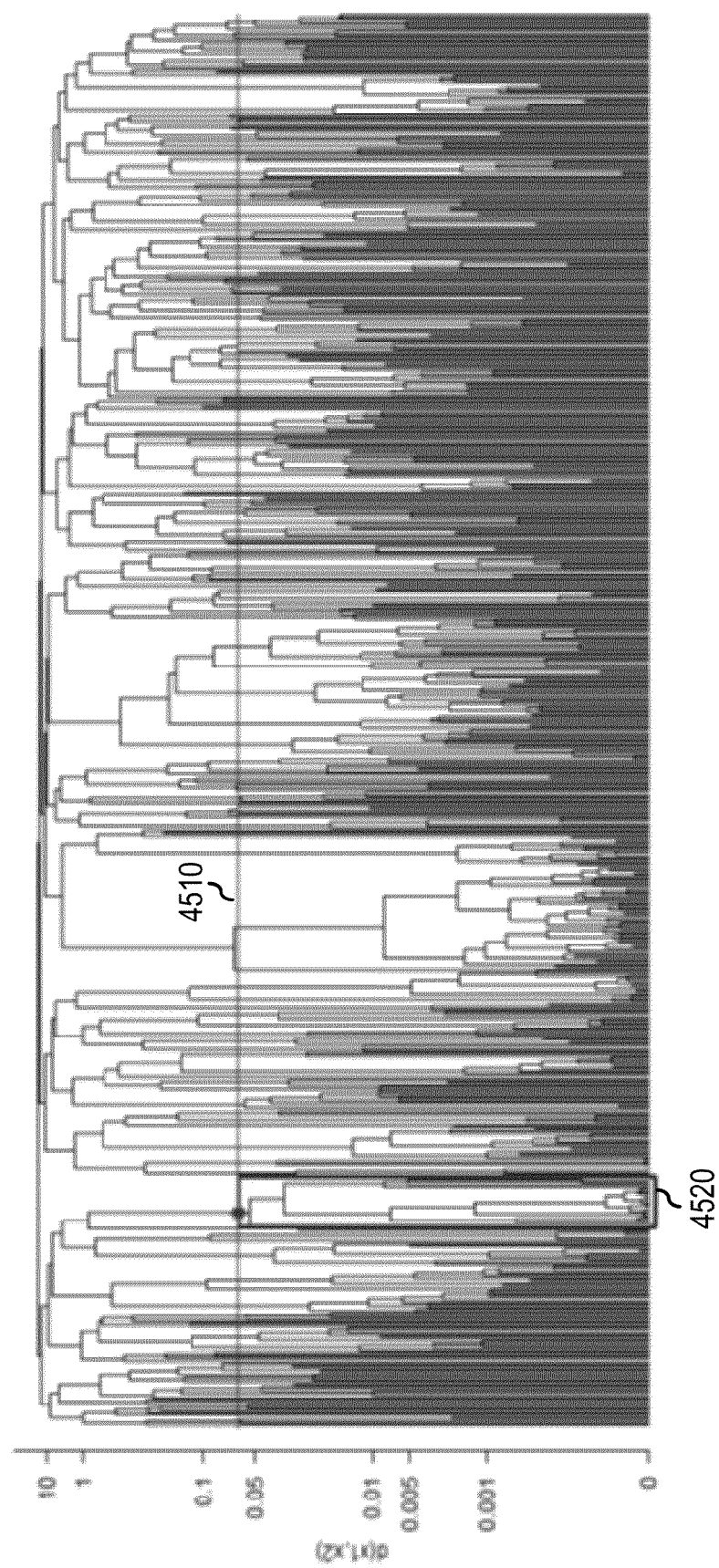
FIG. 45 shows an exemplary dendrogram that can result from using Ward's hierarchical clustering method with a similarity measure using a line integral.

FIG. 45 shows an exemplary implementation of a dendrogram that can result from using Ward's hierarchical clustering method with a similarity measure using the line integral as shown in (D.7) to cluster 543 malicious observations. In the exemplary implementation of a dendrogram shown in FIG. 45, for reference, a horizontal line 4510 is drawn at a cutpoint determined by the fifth percentile of the pairwise distances. According to this cutpoint, the cluster belonging to the exemplary malware observation in the plot shown in FIG. 42 is outlined as shown at 4520 and includes 19 members. In some implementations, a program can be classified as malicious and a few of its closest neighbors can be identified that have been reverse engineered previously to aid in the reverse engineering of the newly suspected malicious program. In some implementations, a clustered malware can have no close neighbors. In some implementations, a threshold percentile (e.g., a fifth percentile or other percentile) of the distances can be used to decide if the neighboring observations are close enough to be potentially useful (e.g., useful to an analyst).

In some implementations, a dynamic instruction trace can be visualized with software (e.g., the Visualization of Executables for Reversing and Analysis (VERA) software or the like) in a manner that aids in the reverse engineering process. Some software (e.g., VERA or the like) can generate traces logging the address of respective instructions. Addresses can then be used to form the vertices of a graph. In some implementations, observed transitions of a dynamic instruction trace from one address to another can generate an edge between the two vertices that represent the instructions. In some implementations, multiple executions of the same transitions between addresses can result in a darker line, indicating a loop.

Figure 46:
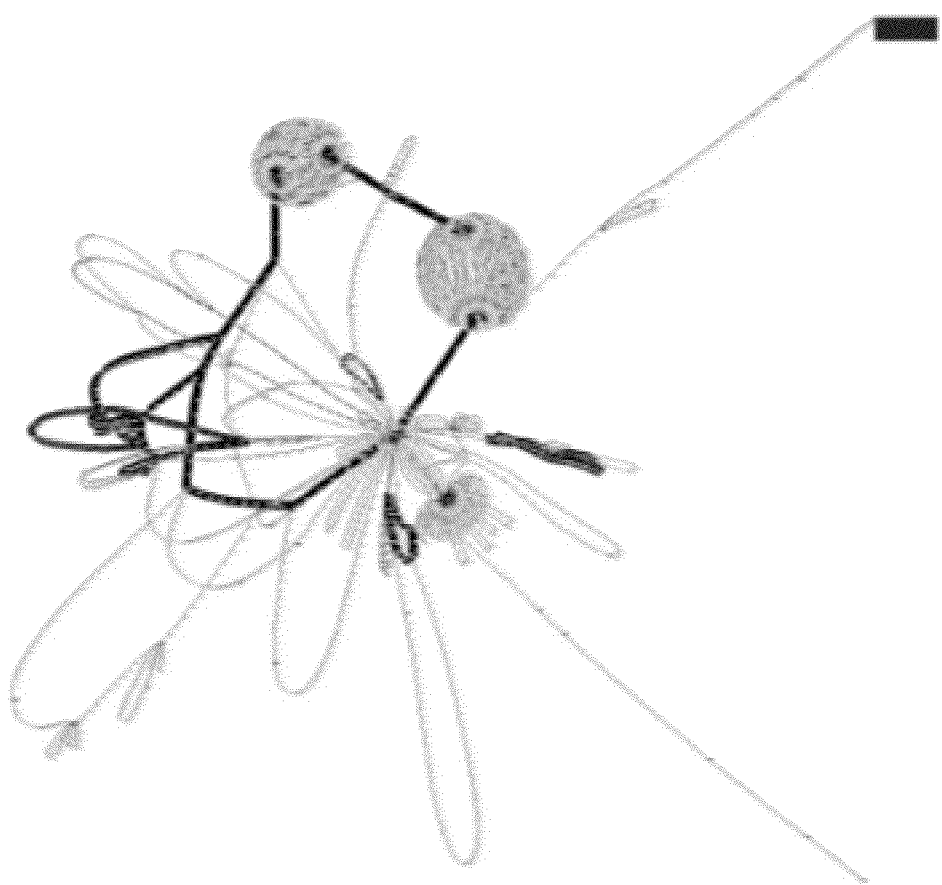
FIG. 46 shows a functionality plot of the dynamic instruction trace of an observed suspected malware.
Figure 47:
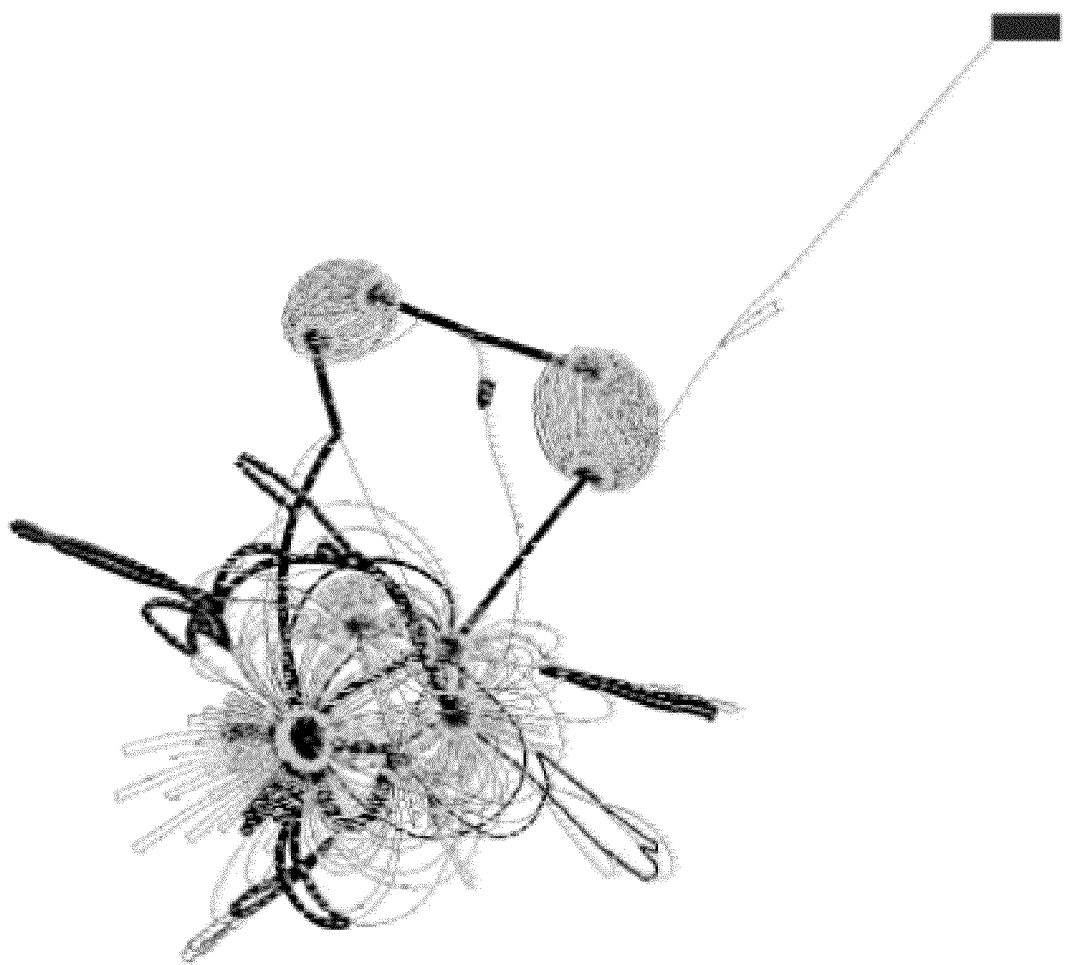
FIG. 47 shows a functionality plot of the dynamic instruction trace of a nearest neighbor to an observed suspected malware.

A resulting graph can then be arranged, for example a graph can be arranged using the Open Graph Display Framework Fast Multipole Layout Algorithm, which can generate graphs such as the graphs shown in FIG. 46 and FIG. 47. FIG. 46 and FIG. 47 show graphs (e.g., VERA graphs) of the exemplary suspected malicious program that was used to determine the plot shown in FIG. 42 and its nearest neighbor according to a probability change measure, respectively. In some implementations, an analyst can then observe a graph and identify structures in the graph. Similar programs, as shown in FIG. 46 and FIG. 47, can result in similar graph features.

The rectangle in the upper right hand corner in the respective graphs shown in FIG. 46 and FIG. 47 show the starting address of execution. In the graph shown in FIG. 46 and the graph shown in FIG. 47, the instructions proceeding from the upper-right to lower-left are the initialization areas of the loop. In some implementations, Windows executables have initialization code, or preamble, appended to each program, which is referred to as the "initterm" by some Windows compilers. In some implementations, after the initterm code executes, two spheres can be observed in the respective graphs shown in FIG. 46 and FIG. 47. In the exemplary implementation of the two samples tested, the colocation across two samples is indicative of a common feature set. Other similarities between the two samples can be seen in the graphs shown in FIG. 46 and FIG. 47, such as loops and switch statements that are similarly located in the graphs. The two graphs shown in FIG. 46 and FIG. 47 are different due to a generational difference, verified by manual reverse engineering, between the two samples. For the exemplary implementation samples used for the graphs shown in FIG. 46 and FIG. 47, given that both exemplary samples possess similar execution features, the two samples both share a similar code base and thus can be related. The graphs shown in FIG. 46 and FIG. 47 show functionality plots of the dynamic instruction trace obtained with software (e.g., with the VERA software) of the exemplary suspected malware observation observed in the plot shown in FIG. 42 and its nearest neighbor according to the probability change measure.

Exemplary Further Considerations

In some implementations of stochastic classification, flexible classification can be done cautiously when using many predictors. For example, a Relaxed Adaptive Elastic Net can be a useful framework for adding flexibility with splines. In some implementations, a Relaxed Adaptive Elastic Net estimation can avoid over-fitting to obtain accuracy. In some implementations of stochastic classification, a statistical model based classification can be used that represents a dynamic instruction trace as a Markov chain, and assumes a mixture of Dirichlet distributions for the rows of a transition matrix P. In some implementations of stochastic classification, the malware samples are detected or classified as malware, and then the detected or identified malware samples can be clustered. In some implementations of stochastic classification, additional features (e.g., static trace, file entropy, system calls) of a program can be used to perform classification. In some implementations, stochastic classification can be used for online application in a sandbox at a perimeter of a network. In some implementations, stochastic classification can run quickly on a given trace (e.g., once the statistical model is estimated which can be done offline).

Exemplary Visualization of an Exemplary Data Set

Figure 48:
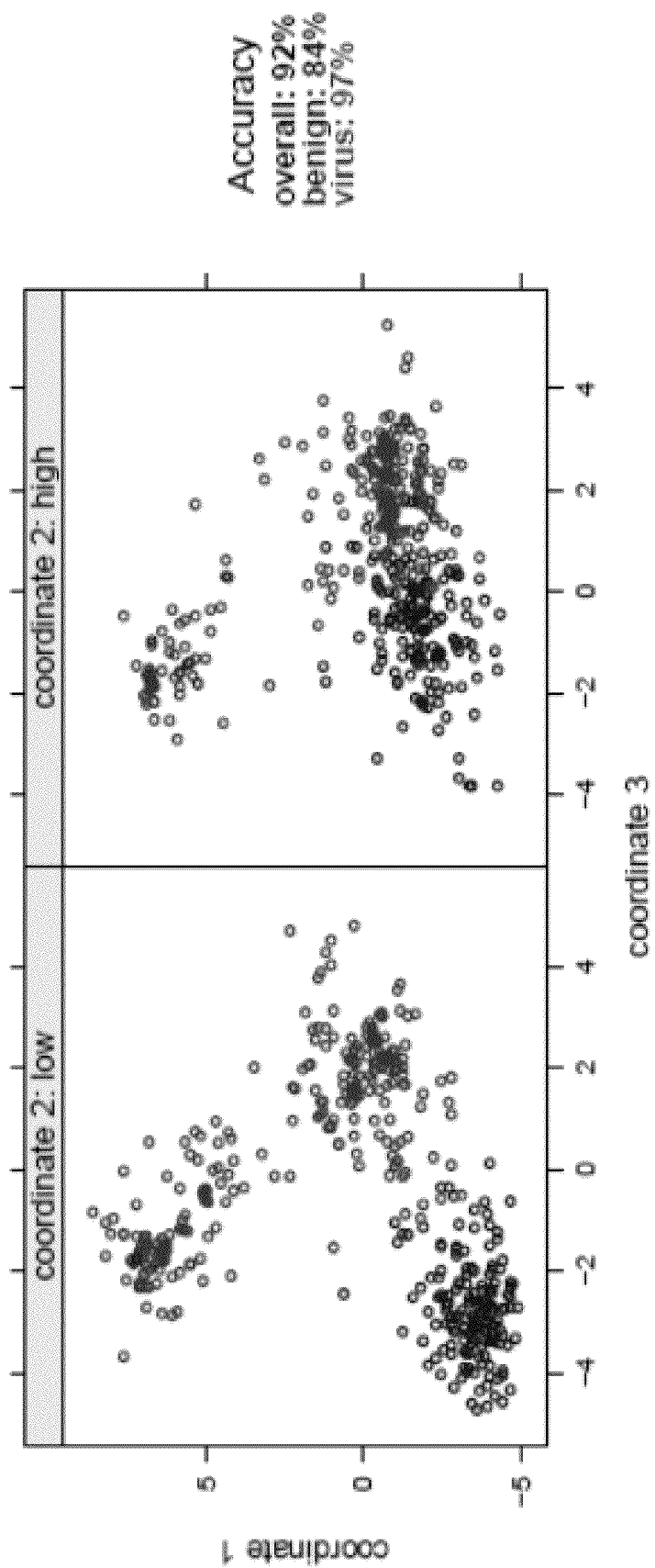
FIG. 48 displays a plot of benign and malicious samples on reduced dimension axes for three dimensions.

As a first pass at visualizing an exemplary data set of programs and to get a feeling for how well the malicious samples separate out from the benign samples, a dimension reduction normal mixture model can be fit to the log it of the transition probabilities resulting from a categorization such as the exemplary second categorization of processor instructions discussed. For this analysis, the estimated transition probabilities $\hat{P}_i$, for the i-th observation can be taken to be the posterior mean (i.e., $\hat{P}_i = E(P_i|Z_i)$), assuming symmetric Dirichlet (e.g., 0.1) for respective rows of $P_i$. In some implementations, a logistic regression using an Elastic Net estimation, can be first used to screen for active predictors among the 56×56=3136 candidate predictors. Also an R package mda can then be used to fit the normal mixture model with two components on K linear combinations of the remaining active predictors. The number of linear combinations (e.g., dimensions) and their coefficients can be estimated along with the mixture parameters. FIG. 48 displays a plot of the benign and malicious samples on the reduced dimension axes for the resulting three dimensions.

The accuracy numbers reported in the plot of FIG. 48 were obtained via 10-fold CV of the normal component mixture model. The shown accuracy (e.g., ~92% overall) can give a baseline performance metric with which to compare to implementations of stochastic classification using a statistical model such as described herein.

Figure 49:
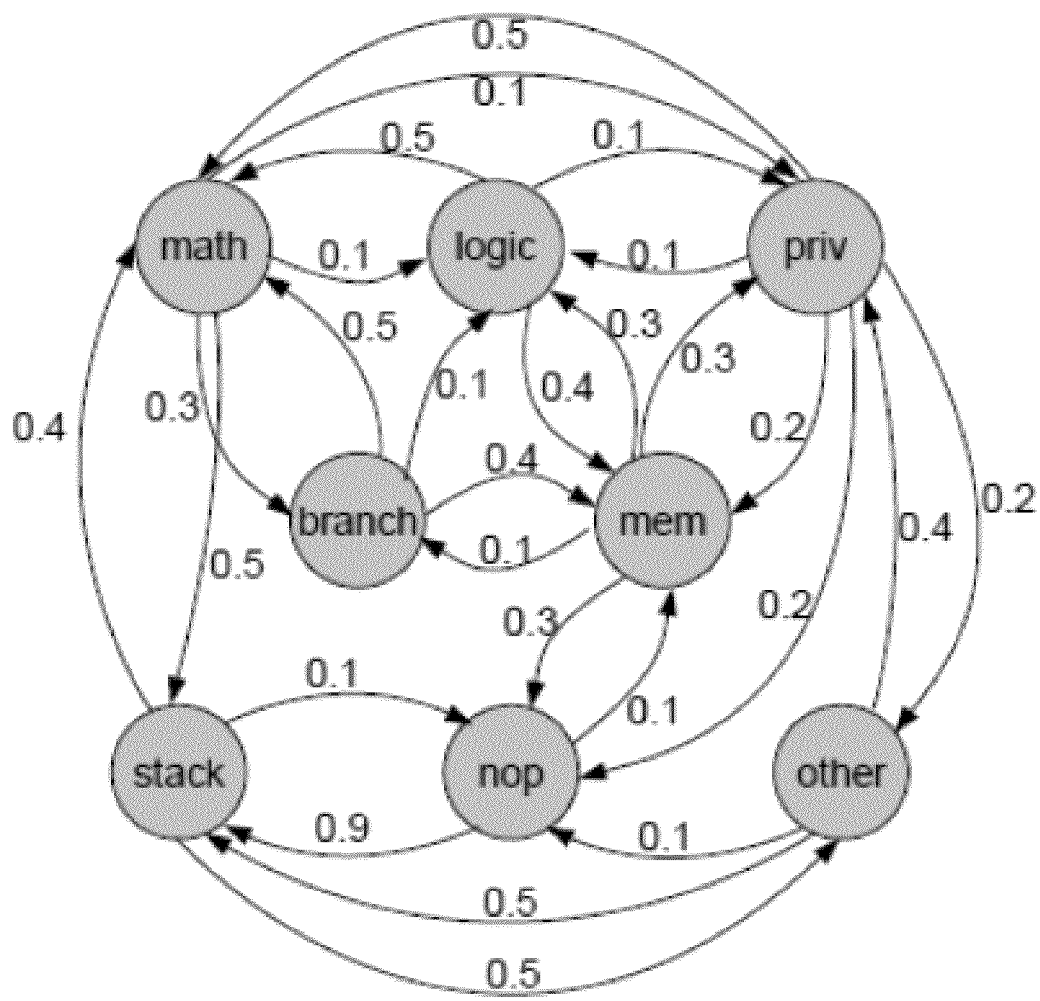
FIG. 49 shows an exemplary Markov-chain graph which displays a conceptualization of a Markov-chain transition probability representation of a dynamic instruction trace.

Exemplary Dynamic Instruction Trace Data and Resulting Markov-Chain Representation FIG. 49 shows an exemplary Markov-chain graph which displays a conceptualization of the Markov-chain Transition Probability Representation of a Dynamic Instruction Trace.

The exemplary Markov-chain graph shown in FIG. 49 has eight nodes corresponding to the eight categories discussed for the first exemplary categorization of Intel processor instructions. The edges of the Markov-chain graph correspond to transition probabilities from one instruction category to the next for the given program. In this example, the location that each instruction acted on in memory is not used in the analysis of transition probabilities or nodes, since the locations are not consistent from one execution of the program to another.

The following partial dynamic instruction trace shown in Table 15 shows the first several lines for a dynamic instruction trace output. The following partial dynamic instruction trace shown in FIG. 49 includes an instruction listed with an associated location acted on in memory. In some implementations, the information regarding the associated location acted on in memory is not used to generate predictors or transition probabilities.

TABLE 15

| Instr | Address |
| --- | --- |
| lea | ecx, [ecx] |
| sub | esp, 0x3C |
| sub | esp, 0x3C |
| mov | ebx, eax |
| mov | ebp, esp |
| add | ebx, 0x00410F1F |
| lea | eax, [ebp+] |
| mov | esp + 0x14], ecx |
| sub | eax, ecx |
| mov | [ebp+], edi |
| sub | edx, esi |
| or | edi, 0x0040A24E |
| xchg | [ebp+], esi |

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims and their equivalents. We therefore claim as our invention all that comes within the scope of these claims and their equivalents.

We claim:

1. A method of automated classification of at least one program as malware or non-malware, implemented at least in part by one or more computing devices, the method comprising:

generating, by the one or more computing devices, at least one graph representation of at least one dynamic data source of the at least one program;

generating at least one graph representation of at least one static data source of the at least one program; and at least using the at least one graph representation of the at least one dynamic data source and the at least one graph representation of the at least one static data source, classifying the at least one program as malware or non-malware, wherein the classifying comprises using a kernel-based classification algorithm and combining the at least one graph representation of the at least one dynamic data source and the at least one graph representation of the at least one static data source via multiple kernel learning.

2. The method of claim 1, wherein the at least one graph representation of the at least one dynamic data source or the at least one graph representation of the at least one static data source is based on a Markov chain graph.

3. The method of claim 2, wherein the at least one graph representation of the at least one dynamic data source or the at least one graph representation of the at least one static data source comprises an adjacency matrix that represents the Markov chain graph.

4. The method of claim 1, wherein the at least one static data source comprises a binary file of the at least one program, a disassembled binary of the at least one program, or a control flow graph of the at least one program.

5. The method of claim 4, wherein the at least one static data source comprises a control flow graph of the at least one program; and
    the at least one graph representation of the control flow graph comprises the control flow graph of the program; and
    wherein at least using the control flow graph comprises generating at least one normalized probability vector.

6. The method of claim 1, wherein the at least one dynamic data source comprises a dynamic instruction trace or a dynamic system call trace.

7. The method of claim 1, further comprising:
    generating at least one feature vector representation of at least one file information data source of the at least one program; and
    classifying the at least one program further based at least on the at least one feature vector representation of the at least one file information data source.

8. The method of claim 7, wherein the at least one file information data source is based on one or more selected from the group consisting of:
    an entropy of a binary file, a size of the binary file, a packed status, a number of instructions in a disassembled binary, a number of edges in a control flow graph, a number of vertices in the control flow graph, a number of dynamic instructions, and a number of dynamic system calls.

9. The method of claim 1, wherein classifying the at least one program comprises generating at least one kernel.

10. The method of claim 9, wherein the at least one kernel comprises a graph kernel, a squared exponential kernel, a graphlet kernel, a random walk kernel, a shortest paths kernel, a spectral kernel, or a combination of two or more kernels.

11. The method of claim 9, further comprising determining a weight of the at least one kernel.

12. The method of claim 9, wherein classifying the program further comprises training a classifier using the at least one kernel.

13. The method of claim 1, wherein the kernel-based classification algorithm comprises a support vector machine or a Gaussian process.

14. The method of claim 1, wherein the generating the at least one graph representation of at least one dynamic data source comprises grouping system calls into categories; and
    using the categories as vertices in a Markov chain graph.

15. A computing system comprising one or more processors and one or more non-transitory computer-readable media storing computer executable instructions that cause the computing system to perform the following steps comprising:
    generating at least one graph representation of at least one dynamic instruction trace of at least one program;
    generating at least one graph representation of at least one static data source of the at least one program; and
    at least using the at least one graph representation of the at least one dynamic instruction trace and the at least one graph representation of the at least one static data source, classifying the at least one program as malware or non-malware, wherein the classifying comprises using a kernel-based classification algorithm and combining the at least one graph representation of the at least one dynamic instruction trace and the at least one graph representation of the at least one static data source via multiple kernel learning.

16. The system of claim 15, wherein the at least one graph representation of the at least one dynamic instruction trace or the at least one graph representation of the at least one static data source is based on a Markov chain graph.

17. The system of claim 15, wherein the at least one static data source comprises a binary file of the at least one program, a disassembled binary of the at least one program, or a control flow graph of the at least one program.

18. A method of automatically classifying a program as malware or non-malware, the method comprising:
    generating, by a hardware processor, a first adjacency matrix representing a Markov chain graph of a dynamic data source of the program, wherein the dynamic data source comprises a dynamic instruction trace or a dynamic system call trace;
    generating a second adjacency matrix representing a Markov chain graph of a static data source of the program, wherein the static data source comprises a binary file or a disassembled binary of the program;
    generating a control flow graph of the program;
    generating a feature vector for a file information data source for the program, wherein the feature vector comprises one or more features that comprise an entropy of a binary file, a size of the binary file, a packed status, a total of a number of instructions in the dynamic instruction trace plus a number of system calls in the dynamic system call trace, a number of edges in the control flow graph, or a number of vertices in the control flow graph of the program; and
    classifying the program as malware or non-malware using a kernel-based classification algorithm and using at least the first adjacency matrix, the second adjacency matrix, the control flow graph, and the feature vector for the file information data source.

19. The method of claim 18, wherein classifying the program as malware or non-malware comprises evaluating a decision function comprising one or more support vectors and at least one combined kernel that is generated by combining one or more weighted kernels.

* * * * *